(12) United States Patent
Kraning et al.

(10) Patent No.: US 11,588,857 B2
(45) Date of Patent: Feb. 21, 2023

(54) NETWORK ASSET LIFECYCLE MANAGEMENT

(71) Applicant: Palo Alto Networks, Inc., Santa Clara, CA (US)

(72) Inventors: Matthew Kraning, San Francisco, CA (US); Gregory Toto, Piedmont, CA (US); Gregory Heon, San Francisco, CA (US); Haley Sayres, Belvedere Tiburon, CA (US); Peter Sorrentino, Washington, DC (US)

(73) Assignee: Palo Alto Networks, Inc., Santa Clara, CA (US)

( * ) Notice: Subject to any disclaimer, the term of this patent is extended or adjusted under 35 U.S.C. 154(b) by 304 days.

(21) Appl. No.: 17/037,107

(22) Filed: Sep. 29, 2020

(65) Prior Publication Data

US 2021/0105304 A1   Apr. 8, 2021

Related U.S. Application Data

(60) Provisional application No. 62/911,078, filed on Oct. 4, 2019, provisional application No. 62/911,077, filed
(Continued)

(51) Int. Cl.
*H04L 9/40* (2022.01)
*G06F 16/23* (2019.01)
(Continued)

(52) U.S. Cl.
CPC .......... *H04L 63/20* (2013.01); *G06F 16/2379* (2019.01); *G06Q 10/0635* (2013.01);
(Continued)

(58) Field of Classification Search
CPC ......... H04L 63/20; H04L 41/50; H04L 43/12; H04L 63/0236; H04L 63/1425;
(Continued)

(56) References Cited

U.S. PATENT DOCUMENTS

| 8,990,392 | B1* | 3/2015 | Stamos | .................... H04L 43/10 709/224 |
| 2014/0162601 | A1* | 6/2014 | Kim | ...................... H04W 8/005 455/411 |

(Continued)

OTHER PUBLICATIONS

Ellison et al. "Evaluating and Mitigating Software Supply Chain Security Risks", Technical Note CMU/SEI-2010-TN-016, May 2010, 50 pages (Year: 2010).*

(Continued)

*Primary Examiner* — Oleg Korsak
(74) *Attorney, Agent, or Firm* — Gilliam IP PLLC

(57) ABSTRACT

Systems and methods for network asset lifecycle management are described. Network assets may include ephemeral Internet-accessible assets such as IP addresses, domain names, digital certificates, and cloud infrastructure accounts. A set of addresses associated with a computer network such as the Internet are scanned. Response data is received from one or more network systems connected to the computer network and processed to identify one or more network assets associated with an entity such as an enterprise organization. Asset data indicative of the identified network assets are then stored to build a record of the network assets associated with the entity.

32 Claims, 28 Drawing Sheets

Related U.S. Application Data on Oct. 4, 2019, provisional application No. 62/911,076, filed on Oct. 4, 2019.

(51) Int. Cl.
| | | |
|---|---|---|
| *G06Q 10/105* | (2023.01) | |
| *G06Q 30/018* | (2023.01) | |
| *G06Q 10/20* | (2023.01) | |
| *H04L 41/50* | (2022.01) | |
| *G06Q 10/0635* | (2023.01) | |
| *G06Q 50/18* | (2012.01) | |
| *H04L 43/12* | (2022.01) | |
| *G06Q 50/28* | (2012.01) | |

(52) U.S. Cl.
CPC ........... *G06Q 10/105* (2013.01); *G06Q 10/20* (2013.01); *G06Q 30/0185* (2013.01); *G06Q 50/18* (2013.01); *G06Q 50/28* (2013.01); *H04L 41/50* (2013.01); *H04L 43/12* (2013.01); *H04L 63/0236* (2013.01); *H04L 63/1425* (2013.01)

(58) Field of Classification Search
CPC ............ G06F 16/2379; G06Q 10/0635; G06Q 10/105; G06Q 10/20; G06Q 30/0185; G06Q 50/18; G06Q 50/28
See application file for complete search history.

(56) References Cited

U.S. PATENT DOCUMENTS

2018/0219919 A1* 8/2018 Crabtree ................ H04L 63/20
2019/0258953 A1* 8/2019 Lang ..................... G06N 3/0454

OTHER PUBLICATIONS

Wang "Knowledge Set of Attack Surface and Cybersecurity Rating for Firms in a Supply Chain", (Nov. 3, 2017), SSRN, 23 pages (Year: 2017).*

* cited by examiner

NETWORK ASSET LIFECYCLE MANAGEMENT

CROSS-REFERENCE TO RELATED APPLICATIONS

This application claims the priority benefit of U.S. Provisional Patent Application No. 62/911,076, filed Oct. 4, 2019, entitled "NETWORK ASSET LIFECYCLE MANAGEMENT," U.S. Provisional Patent Application No. 62/911,077, filed Oct. 4, 2019, entitled "NETWORK ASSET GOVERNANCE," and U.S. Provisional Patent Application No. 62/911,078, filed Oct. 4, 2019, entitled "SUPPLY CHAIN NETWORK SECURITY," all of which are incorporated herein by reference in their entireties.

BACKGROUND

Various computing devices (e.g., computers, mobile devices, server systems, client systems, internet-of-things devices, etc.) can communicate over a network such as the Internet. Internet-connected devices and systems commonly include one or more publicly addressable communication ports, allowing other Internet-connected devices and systems to query the Internet connected devices and systems. Some devices allow a range of connection types (e.g., hypertext transfer protocol (HTTP) connections, hypertext transfer protocol-secure (HTTPS) connections, file transfer protocol (FTP) connections, file transfer protocol-secure (FTPS) connections, telnet connections, secure socket shell (SSH) connections, etc.) over the one or more publicly accessible ports. Internet-connected devices and systems can comprise a wide range of different types of hardware devices running a wide range of software including a wide range of configuration options, creating a myriad of possibilities for security vulnerabilities.

SUMMARY

In some embodiments, a computer system scans a set of publicly routable addresses associated with a computer network or set of computer networks that are external to a specified entity. The computer system receives response data from one or more of the network systems connected to the computer network based on the scanning. The computer system then processes the response data to identify a network asset associated with the specified entity and stores asset data indicated of the identified network asset in a network asset database.

In other embodiments, the network asset identified based on the response data is an ephemeral Internet-accessible network asset such as any of an Internet Protocol (IP) address, a range of IP addresses, a domain name, a digital certificate, or a cloud infrastructure account.

In other embodiments, the computer network or set of computer networks includes Internet-accessible systems that are external to the specified entity. In such embodiments, the scanning includes, for each Internet-accessible system, providing a payload to all accessible network systems on all accessible pots of the Internet-accessible system, determining that a response is received from one or more of the accessible network systems, and scanning each accessible network system from which a response is received using a follow-up probe based at least in part on the response received.

In other embodiments, the computer system processes the response data to further identify a related entity that is responsible for the identified network asset. In such embodiments, the asset data is further indicative of the related entity. In embodiments where the specified entity is an enterprise organization, the related entity may be any of an individual or department associated with the enterprise organization.

In other embodiments, the computer system processes the response data to further identify a service that is implemented using the identified network asset. In such embodiments, the asset data is further indicative of the identified service.

In other embodiments, the computer system processes the response data to further identify entity data that is stored or processed using the identified network asset. In such embodiments, the asset data is further indicative of or includes the entity data.

In other embodiments, the computer system processes the response data to further identify a network system used to implement the network asset. In such embodiments, the asset data is further indicative of the network system.

In other embodiments, the computer system processes the response data to further identify a registration record associated with the identified network asset. In such embodiments, the asset data is further indicative of the registration record.

In other embodiments, the computer system continually updates the network asset database as additional network assets associated with the specified entity are identified.

In other embodiments, the computer system receives network information associated with the specified entity from a stored network information database. In such embodiments, the computer system identifies the network asset by processing the response data and the network information from the network information database.

In other embodiments, the computer system receives a registration record from a third-party registration service. In such embodiments, the computer system identifies the network asset by processing the response data and the registration record received from the third-party registration service.

In other embodiments, the computer system processes the response data to identify the network asset by: accessing a fingerprint associated with the specified entity, comparing the fingerprint with the response data to determine that the response data is from a network system associated with the entity, and extracting an identifier from the response data that is indicative of the network asset.

In other embodiments, the computer system determines, based on the asset data, that a registration associated with the network asset, and owned by the specified entity, will expire. In response to determining that the registration will expire, the computer system performs an automated action to preserve the registration associated with the network asset before the registration expires.

In other embodiments, the automated action performed by the computer system includes any of: generating a ticket indicative of the expiration of the registration and inputting the ticket into an asset management system, generating a notification indicative of the expiration of the registration, or transmitting automatically a renewal request to a registration service to renew the registration.

In other embodiments, the computer system accesses a policy rule associated with the specified entity. Then the computer system determines that a property and/or activity associated with the identified network asset violates the policy rule. In response to determining that the policy rule is violated, the computer system performs an automated action to remedy the policy rule violation.

In other embodiments, the automated action performed by the computer system includes any of: generating a ticket indicative of the policy rule violation and inputting the ticket into an asset management system, generating a notification indicative of the policy rule violation and causing the notification to be presented to a user, or adjusting automatically the property and/or activity associated with the identified network asset to remedy the policy rule violation.

In other embodiments, the computer system can adjust automatically the property and/or activity associated with the identified network asset by: configuring a firewall setting associated with the identified network asset, blocking a service implemented using the identified network asset, and/or removing data that is stored or processed using the identified network asset.

In other embodiments, the computer system determines a type of automated action to perform to remedy the policy rule violation based on the asset data.

In other embodiments, the computer system determines a type of automated action to perform to remedy the policy rule violation based on any of: a type of the network asset, a related entity that is responsible for the network asset, or a type of relationship between the entity and the related entity.

In other embodiments, the computer system processes the response data to identify a combined attack surface associated with multiple entities that are part of a supply chain. The computer system then enables at least a first entity of the multiple entities to access a first view of the combined attack surface.

In other embodiments, the first view of the combined attack surface obfuscates the identities of any of the plurality of entities associated with the supply chain that do not have a contractual relationship with the first entity.

In other embodiments, the computer system continually updates the first view of the combined attack surface as additional response data are received and processed.

In other embodiments, the computer system receives, from the first entity, an identifier indicative of a second entity that is a supplier to the first entity. In such embodiments, the identified combined attack surface is based at least in part on the received identifier.

In other embodiments, the computer system receives netflow data indicative of network traffic communicated over the computer network. The computer system then processes the response data and the netflow data to detect a security event associated with one or more of the entities in the supply chain and performs an automated action to mitigate the risk presented by the security event.

In other embodiments, the security event detected by the computer system includes any of: a vulnerable network system residing on an internal computer network associated with any of the entities in the supply chain, a communication by a network system residing on an internal computer network associated with any of the entities in the supply chain to a vulnerable network system that resides outside the internal computer network, a communication by a network system residing on an internal computer network associated with any of the entities in the supply chain that has not been involved in any communications for a specified period of time, or a communication by a network system residing on an internal computer network associated with any of the entities in the supply chain with a new and/or ephemeral service.

In other embodiments, the automated action performed by the computer system to mitigate the risk presented by the security event includes causing a network system associated with the detected security event to be reconfigured.

In other embodiments, the automated action performed by the computer system to mitigate the risk presented by the security event includes transmitting a notification indicative of the security event for delivery to one or more of the entities in the supply chain.

In other embodiments, the computer system determines that the security event is associated with a second entity that is a supplier to the first entity and that has a contractual relationship with the first entity. In such embodiments, the computer system configures a notification to the first entity to indicate that the security event is associated with the second entity.

In some embodiments, the computer system determines that the security event is associated with a second entity that is a supplier to a third entity where the third entity is a supplier to the first entity and where the third entity has a contractual relationship with the first entity. In such embodiments, the computer system configures a notification to the first entity to indicate that the security event is associated with a supplier to the third entity while obfuscating the identity of the second entity.

In other embodiments, the computer system receives contract data indicative of a contractual obligation of a second entity to the first entity, where the second entity is a supplier to the first entity. The computer system then detects, based on the combined attack surface and contract data, a breach of the contractual obligation and performs an automated action to remedy the breach of the contractual obligation.

In other embodiments, the computer system detects the breach of the contractual obligation by detecting, based on the combined attack surface, a security event associated with a second entity or a third entity that supplies the second entity and determining, based on the contract data, that the detected security event represents a breach of the contractual obligation.

In other embodiments, the computer system detects the breach of the contractual obligation by monitoring, based on the combined attack surface, a network system associated with the second entity, comparing the activity of the network system to a condition specified by the contractual obligation, and determining, that the condition is satisfied based on the comparison. In such embodiments, a breach of the contractual obligation is detected in response to determining that the condition is satisfied.

In other embodiments, the computer system performs the automated action to remedy the breach of the contractual obligation by causing a network system associated with second entity to be reconfigured to remedy the breach of the contractual obligation.

In other embodiments, the computer system performs the automated action to remedy the breach of the contractual obligation by transmitting a notification indicative of the detected breach for delivery to any of the first entity or the second entity.

In other embodiments, the computer system enables a second entity to access a second view of the combined attack surface that is different than the first view of the combined attack surface.

In other embodiments, the computer system receives a receives a request from the first entity to enable a second to access the first view of the combined attack surface. The computer system then enables the second entity to access the first view of the combined attack surface in response to the request.

DETAILED DESCRIPTION

Network Asset Management—Overview

Figure 1:
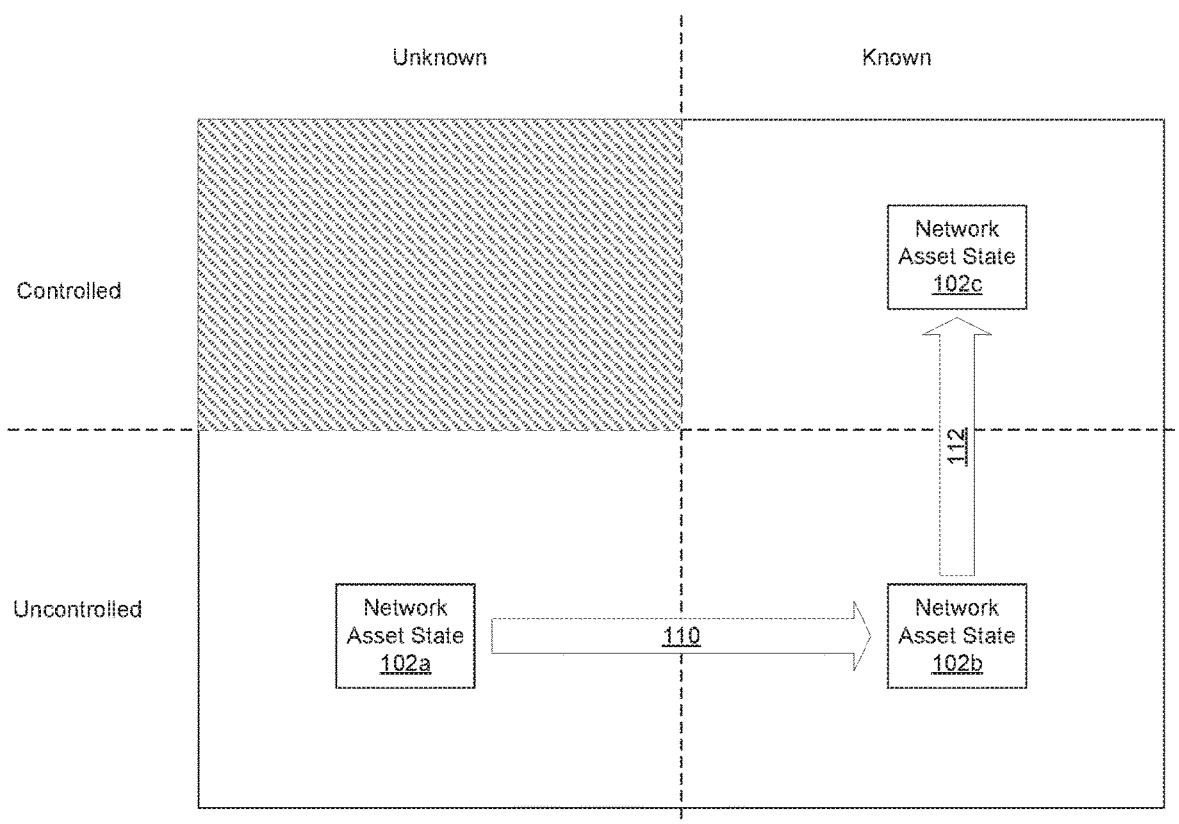
FIG. 1 shows a diagram that illustrates a concept for network asset lifecycle management.

Existing asset management systems typically rely on manual entry of asset information. For example, an IT manager may implement an asset management system to track the various hardware and software assets associated with a given entity such as an enterprise organization. As new hardware and software assets are procured, the IT manager must manually enter information associated with each asset into an asset management system database to effectively track and control the asset. Existing asset management systems can be effective to an extent, but have significant drawbacks in many respects. First, asset management systems that rely on manual entry of asset information tend to be very local in nature (i.e., entered by a single point of responsibility) which can lead to substantial gaps, especially in large organizations where the work and use of such assets is inherently distributed. Second, existing asset management systems tend to have a limited view of what constitutes an asset. As previously mentioned, IT assets are generally considered to include computing hardware (e.g., personal computers, phones, server devices, etc.) and/or software that is implemented on the computing hardware. This limited view of assets does not include other more ephemeral network assets such as IP addresses (and associated registrations), domain names (and associated registrations), digital certificates, cloud accounts, etc. that can nevertheless be critically important to an organization's successful operation. Third, asset management systems that rely on manual entry of asset information are prone to outdated information since they reply on manual updates. While it may not be difficult to keep information up to date when managing small numbers of tangible assets such as computers, an asset management regime can quickly fall apart when managing large numbers of assets across large complex organizations particularly when managing more ephemeral network assets such as IP addresses, domain names, digital certificates, cloud accounts, etc. that may change state over time. Ineffective management of assets, including network assets, can present significant security and business operation risks to entities such as enterprise organizations.

Introduced herein is a technique for network asset lifecycle management that addresses the aforementioned challenges and limitations of existing solutions. In an example embodiment, network assets associated with an entity are identified through a discovery process that involves scanning one or more communications networks. In some embodiments, the asset discovery process includes scanning a set of addresses (e.g., IP addresses) using the network, receiving replies from network systems connected to the network based on the scanning, and identifying one or more network assets associated with an entity based on the data included in the responses. These processes can be continually repeated to build a global and continually updated record of all the network assets associated with an entity. In this way, the network assets associated with an entity can be managed for the lifecycle of such assets. In some embodiments, management can include performing automated actions and workflows to, for example, avoid expiration of registrations associated with assets and/or to prevent and/or remedy policy and/or regulatory violations associated with the use of such network assets.

In some embodiments, the introduced technique can be implemented without relying on the scanning of internal network systems that are known to an entity and without requiring the installation of scanning software on any of the entity's internal systems. Such systems that rely on the scanning of systems that are internal to a given entity may have significant visibility gaps, for example, where a department fails to log a new device connected to the internal network, fails to install the necessary scanning software, etc. In other words, the introduced technique can be implemented to discover network assets associated with the entity by scanning network systems that are external to the entity and that are communicatively coupled to a publicly accessible network such as the Internet.

A "network asset" can include ephemeral assets such as IP addresses, domain names, digital certificates, cloud accounts, etc. In some cases, these assets may be referred to as "Internet assets" where the assets are Internet-accessible and publicly scannable. In certain contexts, network assets can be understood to be foundational digital artifacts that are associated with the effective operation of an entity such as an enterprise organization.

In some embodiments, network assets may be or include associated registrations. Consider for example, IP addresses and/or domain names. In the case of IP addresses and domain names, the actual portion that a given entity may own is a registration over a particular IP address or range of addresses. Note, in the context of IP addresses, the registration would be for a publicly routable IP address (i.e., an IP address that is not covered under the Internet Engineering Task Force Request for Comment (RFC) 1918 (for IPv4) or RFC 4193 (for IPv6), colloquially referred to as "internal IP addresses"). The registration itself may be recorded by a central authority such as the American Registry for Internet Numbers (ARIN) and stored in a centralized database of registrations. In any case, a network asset in the form of a registration may expire, for example, if an entity holding the registration does not pay dues to renew the registration.

Other network assets may include digital certificates such as an encryption key that is used for secure communications over public networks such as the Internet. For example, Public Key Infrastructure (PKI) certificate can be used to cryptographically link ownership of a public key to an entity that owns it. Such digital certificates can include, for example, the public key being certified, identifying information about the entity that owns the public key, metadata relating to the digital certificate, a digital signature of the public key created by the issuer of the certificate, etc. As with IP addresses and domain names, certain digital certificates may be issued and distributed by certificate authorities that act as trusted third parties, i.e., trusted by the owner of the digital certificate and a party relying on the digital certificate.

Other network assets may include cloud infrastructure accounts that are held by a given entity, but that otherwise rely on computing infrastructure that is owned and managed by a third-party service provider. For example, cloud computing services such as Amazon Web Services (AWS) and Microsoft Azure may provide cloud computing products such as cloud-based storage, cloud-based computing, etc. to an entity. These cloud computing products are typically organized into units that, depending on the type of product, may be referred to as buckets, or containers, or instances. These cloud computing units may be owned by the entity in the sense that the computing resources associated with the unit are guaranteed to the entity, but otherwise may be implemented across one or more physical machines that are not known or visible to the entity.

Any one or more of the aforementioned network assets may similarly be associated with various derivative properties. Derivative properties associated with a given network asset may include, for example, information associated with an entity or related entity that is responsible for the network asset, a registration or certificate authority that issued the network asset, a cloud provider that offered the network asset, services that are implemented using the network asset, data that is stored and/or processed using the network asset, etc.

The collection of information associated with identified network assets and any associated derivative properties is referred to herein as "asset data." Asset data may include the asset itself (e.g., a registration or a digital certificate), an asset identifier (e.g., an IP address, a domain name, etc.), an entity identifier (e.g., a name) associated with a related entity (e.g., an individual) that is responsible for the network asset, a resource identifier (e.g., a cloud instance UID) associated with the network asset, credentials needed to access the network asset, and any other such data or metadata associated with a network asset. The stored collection of asset data associated with a given entity may be referred to herein as a "network asset database" or a "global record of network assets."

The above-mentioned network assets are just examples provided for illustrative purposes and are not to be construed as limiting. Other types of network assets may similarly be identified and managed using the introduced technique. Further, while the term "network asset" is used herein to refer to various ephemeral network-facing assets, the term shall be understood to also encompass more tangible assets such as computing hardware.

FIG. 1 shows a diagram that illustrates, at a high level, a concept for network asset lifecycle management. As shown in FIG. 1, a network asset can exist in various states from the point of view of a given entity such as an enterprise organization. For example, a given network asset may exist in a first state 102a in which the asset is unknown to the entity as well as uncontrolled by the entity. The network asset can also exist in a second state 102b in which the asset is known to the entity, but not otherwise controlled. Finally, the network asset can exist in a third state 102c in which the asset is known to the entity and effectively managed or controlled by the entity. A goal of the introduced technique for network asset lifecycle management is to move various assets from the first state 102a to the second state 102b and eventually to the third state 102c.

"Unknown," in this context, refers to the fact that the given asset 102a is unknown to the entity from a global frame of reference, but does not necessarily mean that the asset is unknown to anyone. Consider for example, a large multinational enterprise that has a branch in a particular country in Asia. That branch may independently, and without the knowledge of a central IT department of the enterprise, spin off its own Digital Subscriber Line (DSL) link. In this example, the DSL link would of course be known to certain individuals in the Asian branch of the enterprise, but would not otherwise be known from a global point of view to the enterprise as an entity. The Asian branch could then start operating servers off the DSL link and implementing various services and/or storing various customer data using the servers. This activity may be in flagrant violation of a policy of the enterprise, but the enterprise would be unable to detect or remedy the violation because the various network assets associated with the server and/or DSL link would be unknown globally to the enterprise. Again, this lack of visibility at a global scale highlights the inherent limitation of an asset management system that would rely on manual entry of asset information. In the above example, unless someone at the Asian branch enters the necessary asset information, any one or more network assets associated with the new DSL link and/or server (e.g., IP addresses, domain names, digital certificates, etc.) would be invisible to a central IT department of the enterprise. The policy violating activity would therefore continue because any globally applied policy governance workflows or audits would not detect the activity, thereby exposing the enterprise to significant security and/or business risk.

Knowledge of the existence of a network asset is a prerequisite to controlling or managing that network asset. Accordingly, a first step 110 of the introduced technique is to move a given network asset from the first state 102a to the second state 102b where the asset is known, but not necessarily controlled. Step 110 is also referred to herein as network asset discovery. As will be described in more detail, in some embodiments, network asset discovery may include scanning a network (e.g., the entire Internet) to identify one or more network assets associated with an enterprise and storing asset data based on the scanning. This step 110 can be performed continually to build a global record of the network assets associated with an entity.

Once the network assets are known, a second step 112 can be performed to effectively control the network assets from global perspective. As will be described in more detail, step 112 can be performed by implementing various workflows. The types of governance workflows implemented will depend on a number of factors including policies underlying the governance of the network assets, the type of network asset to be controlled (e.g., IP address vs. digital certificate), the types of entities and related entities associated with the network asset, and the relationships between the entities and related entities associated with the network asset.

Figure 2:
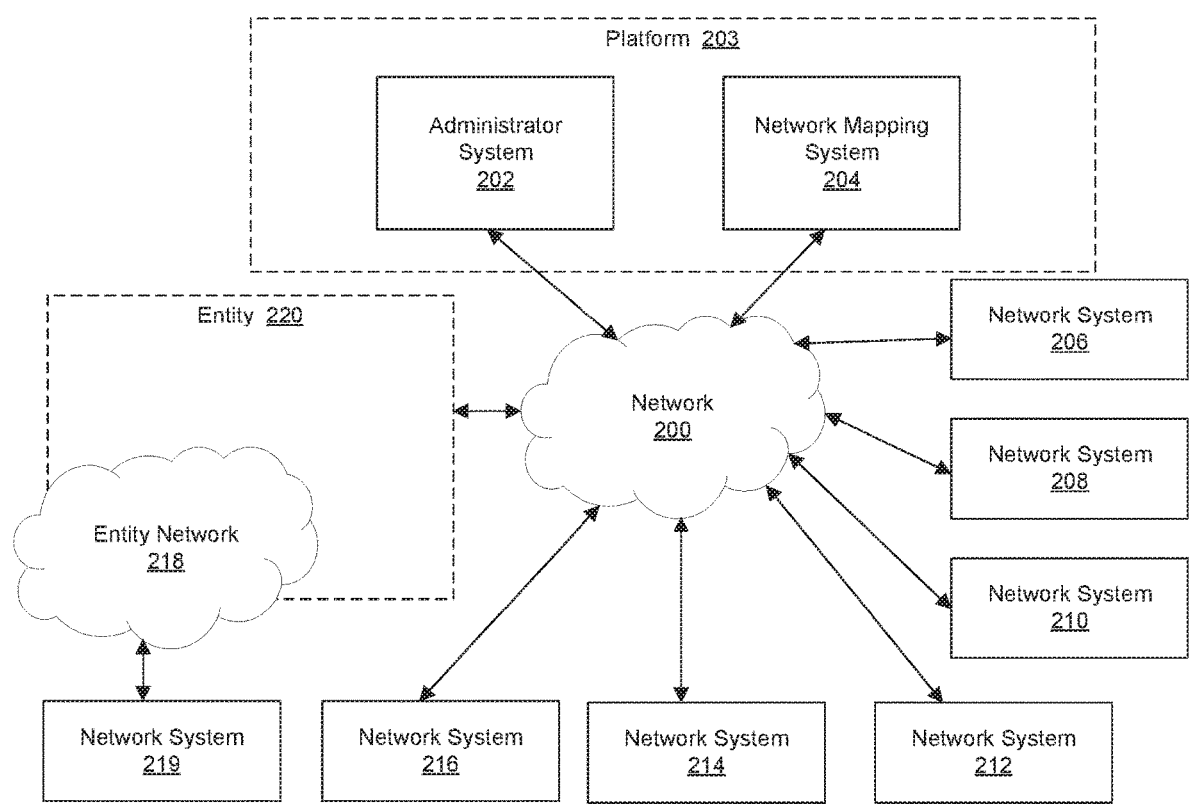
FIG. 2 is a block diagram illustrating an embodiment of a networked computing environment in which certain embodiments of the introduced technique can be implemented.

FIG. 2 is a block diagram illustrating an embodiment of a networked computing environment in which certain embodiments of the introduced technique for network asset management can be implemented. In some embodiments, the networked computing environment of FIG. 2 comprises a system for scanning a network such as the Internet to detect, identify, or otherwise discover one or more network assets.

The example networked computing environment depicted in FIG. 2 includes a network 200 over which various network-connected computing systems are capable of communicating. Network 200 can include a single distinct network or can include a collection of distinct networks operating wholly or partially in conjunction to provide connectivity between network-connected computing systems. For example, network 200 may include one or more of a wired or wireless local area network (LAN), a wired or wireless wide area network (WAN), a cellular data network, or any other appropriate communication network. Further, the one or more networks can include open networks (e.g., the Internet) and/or private networks (e.g., an intranet and/or the extranet). Communication between network-connected computing systems over network 200 may be over any known communication protocol or model such as the Internet Protocol Suite (i.e., TCP/IP), the Open System Interconnections (OSI) model, the User Datagram Protocol (UDP), the File Transfer Protocol (FTP), etc.

A platform 203 configured to perform one or more functions associated with the introduced technique can include an administrator system 202 and network mapping system 204 that are communicatively coupled to network 200. Administrator system 202 comprises a system for an administrator to, for example, access applications on an application system, access data on a database system, indicate to network mapping system 204 to perform a network mapping process, receive data from network mapping system 204, configure a network system (e.g., network system 206) to receive data from a network mapping system 204, or for any other appropriate purpose. In some embodiments, administrator system 202 comprises a processor and a memory and an associated interface through which an administrator user can provide inputs and receive outputs.

Network mapping system 204 is a system for scanning a network, for example, to map the network and discover network assets that are connected to the network. The network mapping system 204 may include a processor and memory with instructions for scanning data associated with various systems connected to network 200, for example, in response to a command from the administrator system 202. In some embodiments, the network mapping system 204 is configured to scan data associated with a set of network systems (e.g., network system 106, network system 208, network system 210, network system 212, network system 214, and network system 216) that are connected to network 200. In some embodiments, scanning data associated with a set of network systems may include analyzing previously stored data associated with the set of network systems. In some embodiments, scanning data associated with a set of network systems may include transmitting (e.g., via network 200) some type of payload data to one or more network systems of the set of network systems, receiving (e.g., via network 200) a response from the one or more network systems, and analyzing the response in the event that a response is received.

Each network system of FIG. 2 (e.g., network system 206, 208, etc.) may represent a network-connected (e.g., Internet-connected) device or system such as a desktop computer, a laptop computer, a server computer, a tablet computer, a smartphone, a router, a switch, a firewall device, an internet-of-things (IOT) device, or any other type of computing device capable of communicating over network 200. In some embodiments, each network system of FIG. 2 is associated with an address such as an Internet Protocol (IP) address.

The network mapping system 204 can be implemented to scan the network 200 to discover network assets that are associated with an entity 220. The entity 220 may represent an enterprise organization (as previously mentioned) or may represent other types of entities such as government organizations, educational organizations, network service providers, individuals, or any other types of entities. In some embodiments, an entity 220 may employ services of the platform 203, for example, to discover the various network assets associated with entity 220. In other words, in some embodiments, platform 203 may represent a service provider that provides various services such as network mapping and asset discovery to multiple clients including entity 220. Accordingly, although not depicted in FIG. 2, multiple other entities may similarly connect to network 200 to access services provided by platform 203.

Notably, the network mapping system 204 can perform network mapping and/or asset discovery by scanning a network that is external to the entity 220 such as network 200. In other words, network mapping and/or asset discovery map be performed by accessing one or more network systems that are connected to the external network 200 (i.e., network systems 206, 208, 210, 212, 214, and/or 216) as opposed to scanning network systems 219 that are connected to an internal private entity network 218. In this example, network 200 may represent the Internet, while entity network 220 may represent an intranet or some other local area network. In some embodiments, the entity network 218 may be communicatively coupled to external network 200, but may be protected from external access by a firewall. In some embodiments, access can be provided to the network mapping system 204 to also scan one or more internal private networks such as entity network 220; however, the introduced technique does not rely on this access. Accordingly, the network mapping and/or asset discovery can be performed without requiring access to internal entity networks, without requiring software be installed on network systems associated with entity 220, and without requiring hardware to be connected to an internal network 218 of the entity. As a result, the introduced technique provides better coverage than traditional on-premises solutions and avoids visibility gaps.

The number of network systems depicted in FIG. 2 is an example provided for illustrative purposes and is not to be construed as limiting. In various embodiments, the number of network systems that can be scanned by the network mapping system 204 may range from as few as 1 to in the billions. In some embodiments, the number of networks systems that can be scanned by the network mapping system 204 is only limited by the total number of systems and/or devices connected to a publicly accessible network such as the Internet at any given moment.

Further, although depicted in FIG. 2 as a single system, the network mapping system 104 may actually comprise multiple network mapping systems or be one of multiple network mapping systems that are not depicted in FIG. 2. For example, in order to scan addresses more efficiently, a plurality of network mapping systems can be instructed to scan the addresses of the various network systems connected to network 200.

Figure 3:
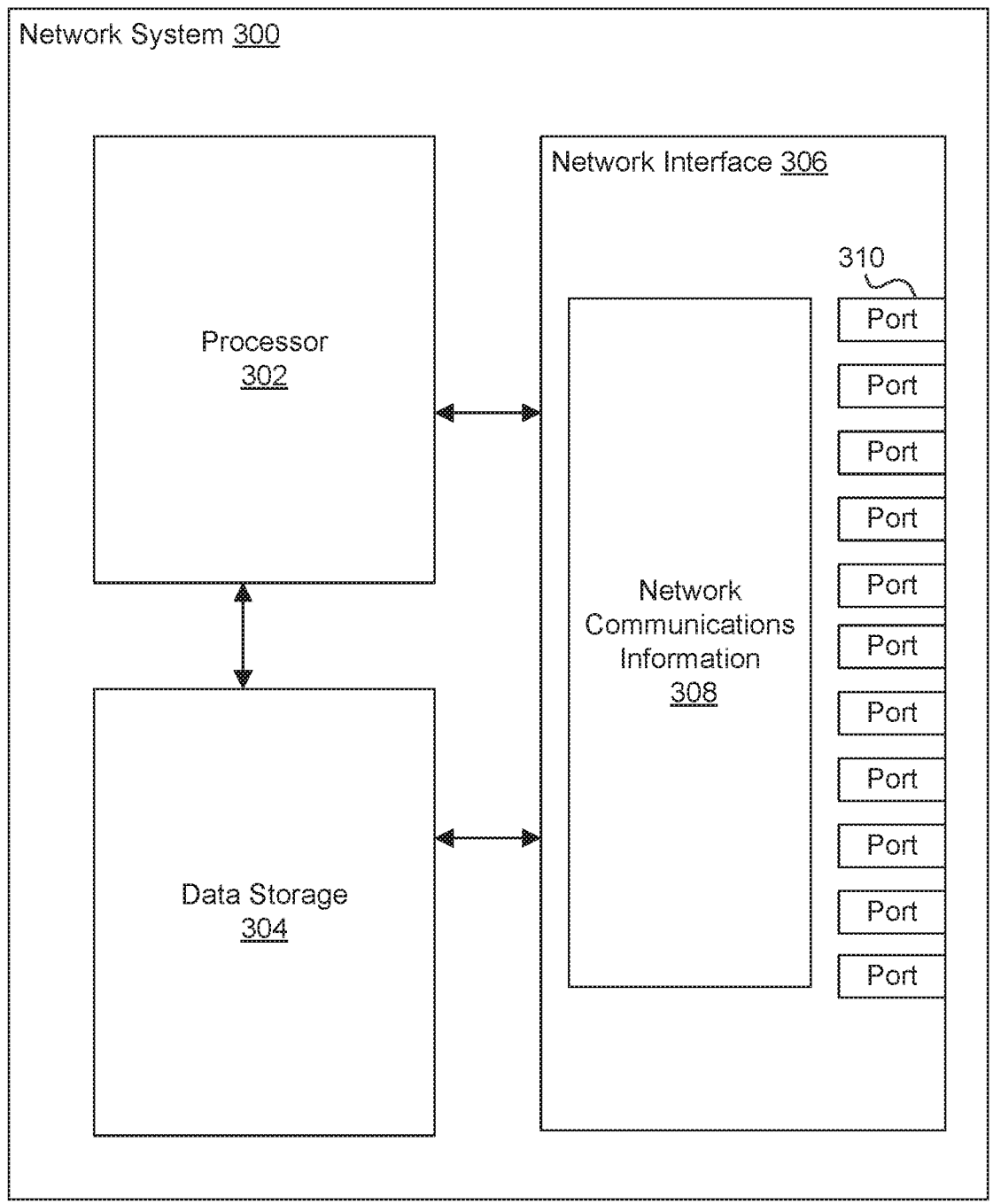
FIG. 3 is a block diagram illustrating an embodiment of a network system.

FIG. 3 is a block diagram illustrating an embodiment of a network system 300. In some embodiments, network system 300 is a network system of FIG. 2 (e.g., network system 206, network system 208, network system 210, network system 212, network system 214, network system 216, network system 218, or network system 220). In the example shown, network system 300 includes a processor 302, data storage 304, and a network interface 306. As previously mentioned, the network system 300 may be any type of computing system or device capable of communicating over a network such as the Internet. For example, network system 300 may be, or be part of, a desktop computer, a laptop computer, a server computer, a tablet computer, a smartphone, a router, a switch, a firewall device, an internet-of-things (IOT) device, or any other type of computing system or device capable of communicating over network 200.

In various embodiments, processor 302 of network system 300 is configured to execute instructions, for example, to receive data, process data, transmit data, respond to commands, etc. Processor 302 may include programmable circuitry and/or hardwired non-programmable circuitry. For example, programmable circuitry may include one or more general purpose microprocessors such as central processing units (CPUs) or graphical processing units (GPUs). Programmable circuitry may also include special-purpose processors such as application-specific integrated circuits (ASICs), programmable logic devices (PLDs), field-programmable gate arrays (FPGAs), etc. In some embodiments, processor 302 may represent a single processing unit, while in other embodiments, processor 302 may represent a cluster of multiple processing units.

In various embodiments, data storage 304 is configured for storing various types of data including instructions for processor 302, configuration information, or any other appropriate digital information. In various embodiments, data storage 304 comprises one or more of a volatile memory, a non-volatile memory, a magnetic memory, an optical memory, a phase-change memory, a semiconductor memory, a disc memory, a tape memory, or any other appropriate memory. Data storage 304, including any volatile and/or non-volatile memory, may be generally referred to as "machine-readable media" or "storage media."

Network interface 306 is configured for communicating with a network such as network 200. In the example shown, network interface 306 includes network communications information 308 and a plurality of ports 310. In various embodiments, network communications information 308 includes network communications software, network communications firmware, network communications settings, network communications data, or any other appropriate network communications information that is utilized for communication over a computer network. The plurality of ports 310 can include physical ports (e.g., plugs for connecting cables to network system 300) and/or virtual ports (e.g., virtual communications channels identified by a virtual port number). In some embodiments, network interface 306 may include or be associated with a network address such as an IP address. In some embodiments, this network address is assigned by an external network addressing authority.

In some embodiments, communication with network system 300 is specified by indicating the network address of network 300 along with a port number. In some embodiments, some ports of network interface 306 are configured for communication (e.g., comprising open ports) and some are configured to not respond to communication. In some embodiments, open port configuration information can be stored in network communications information 308. In some embodiments, some ports are associated with one or more specific communications services (e.g., HTTP, file transfer protocol (FTP), SSH, etc.). In some embodiments, configuration information associating services with ports is stored in network communications information 308. In some embodiments, network communications information 308 includes encryption information (e.g., a public SSH key, a certificate, etc.). In some embodiments, network communications information 308 includes a network system name or other identifier such as a hostname, a domain name, a set of hostnames, a hostname pattern, etc. In some embodiments, network communications information 308 includes text information associated with a service or a set of services (e.g., a welcome text, a connection refused text, a service not supported text, a file not found text, or any other appropriate text information). In some embodiments, network interface 306 includes a set of network hardware (e.g., a modem) running a set of communications software that has been configured according to a set of communications specifications.

Figure 4:
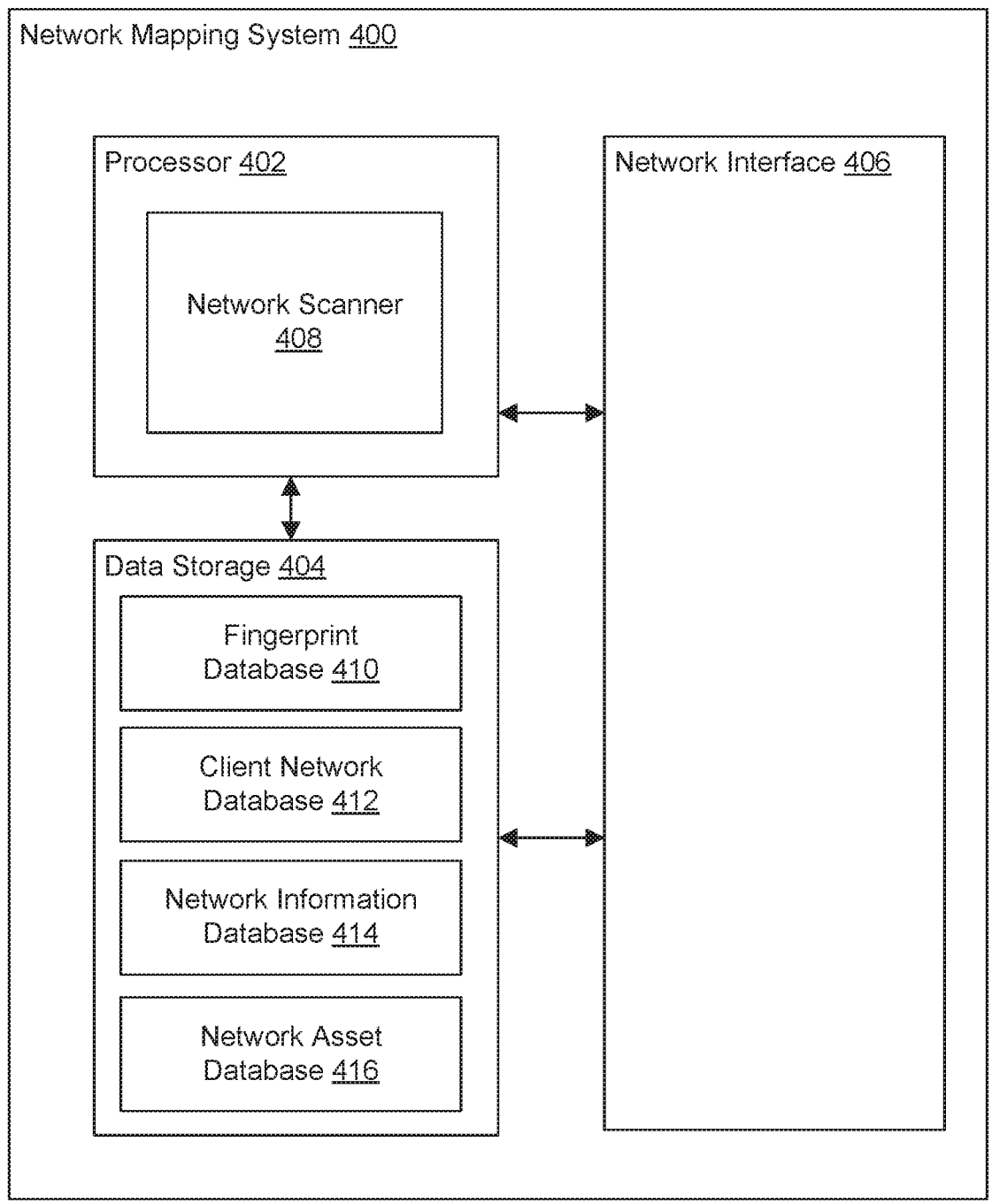
FIG. 4 is a block diagram illustrating an embodiment of a network mapping system.

FIG. 4 is a block diagram illustrating an embodiment of a network mapping system 400. In some embodiments, network mapping system 400 is the network mapping system 204 of FIG. 2. In some embodiments, network mapping system 400 is a server computer or server computer system. In the example shown, network mapping system 400 includes a processor 402, data storage 404, and network interface 406.

In various embodiments, processor 402 of network mapping system 400 is configured to execute instructions, for example, to receive data, process data, transmit data, respond to commands, etc. Processor 402 may include programmable circuitry and/or hardwired non-programmable circuitry. For example, programmable circuitry may include one or more general purpose microprocessors such as CPU or GPU. Programmable circuitry may also include special-purpose processors such as ASICs, PLDs, FPGAs, etc. In some embodiments, processor 402 may represent a single processing unit, while in other embodiments, processor 402 may represent a cluster of multiple processing units. In some embodiments, processor 402 includes network scanner 408. Network scanner 408 may include software and/or hardware for implementing network mapping system functionality.

In various embodiments, data storage 404 is configured for storing various types of data including instructions for processor 402, configuration information, or any other appropriate digital information. In various embodiments, data storage 404 comprises one or more of a volatile memory, a non-volatile memory, a magnetic memory, an optical memory, a phase-change memory, a semiconductor memory, a disc memory, a tape memory, or any other appropriate memory.

In the example shown, data storage 404 includes various databases of information associated with the introduced technique such as a fingerprint database 410, a client network database 412, a network information database 414, and an asset database 416. Note, the term "database" is used for illustrative simplicity; however, a person having ordinary skill in the art will recognize that the introduced technique is not limited to storing such information in a database structure.

The fingerprint database 410 may store fingerprints for identifying network systems. Fingerprints may include any type of information known to be associated with a client network. For example, a fingerprint may include one or more network identifying characteristics such as network communications information settings (e.g., a set of open ports, a set of services and associated ports, encryption information, host name information, domain name information, text information, etc.). The fingerprints stored in the fingerprint database 410 can be utilized by the network mapping system 300 as matching criteria for identifying network components that are associated with a client network.

The client network database 412 may store client network information (e.g., Internet addresses—e.g., IP addresses—associated with the client network, network system information associated with network systems associated with the client network, etc.). In some embodiments, after a network mapping process is executed, client network database 412 includes a set of client network information describing the extent of the client network (e.g., identifying all network systems found that are associated with the client network).

The network information database 414 may store network information. In some embodiments, network information includes network information received as a result of scanning a network. In some embodiments, network information includes responses compiled by scanning the Internet. In some embodiments, scanning the Internet includes providing a payload (e.g., a predetermined data packet or set of packets) to a set of Internet addresses. In some embodiments, scanning a network includes collecting network information from a set of network systems. In some embodiments, scanning a network includes collecting network information from all accessible network systems. In various embodiments, network information includes network communications information settings, network addresses, information received by interactively querying network systems (e.g., information received by performing a follow-up probe in response to an indication of an active service running on the network system). In some embodiments, network information is stored remotely (e.g., on a storage server, on a different network system, on cloud storage, etc.).

The asset database 416 may store asset data associated with various network assets identified as part of the network mapping process including various derivative properties associated with the assets. As previously mentioned, asset data may include the asset itself (e.g., a registration or a digital certificate), an asset identifier (e.g., an IP address, a domain name, etc.), an entity identifier (e.g., a name) associated with a related entity (e.g., an individual) that is responsible for the network asset, a resource identifier (e.g., a globally unique identifier (GUID) for a cloud instance) associated with the network asset, credentials needed to access the network asset, and any other such data or metadata associated with a network asset.

In the example shown, network interface 406 is a network interface for interacting with remote systems via a network. In some embodiments, network interface 306 is configured for high bandwidth communication.

Network Mapping

Figure 5A:
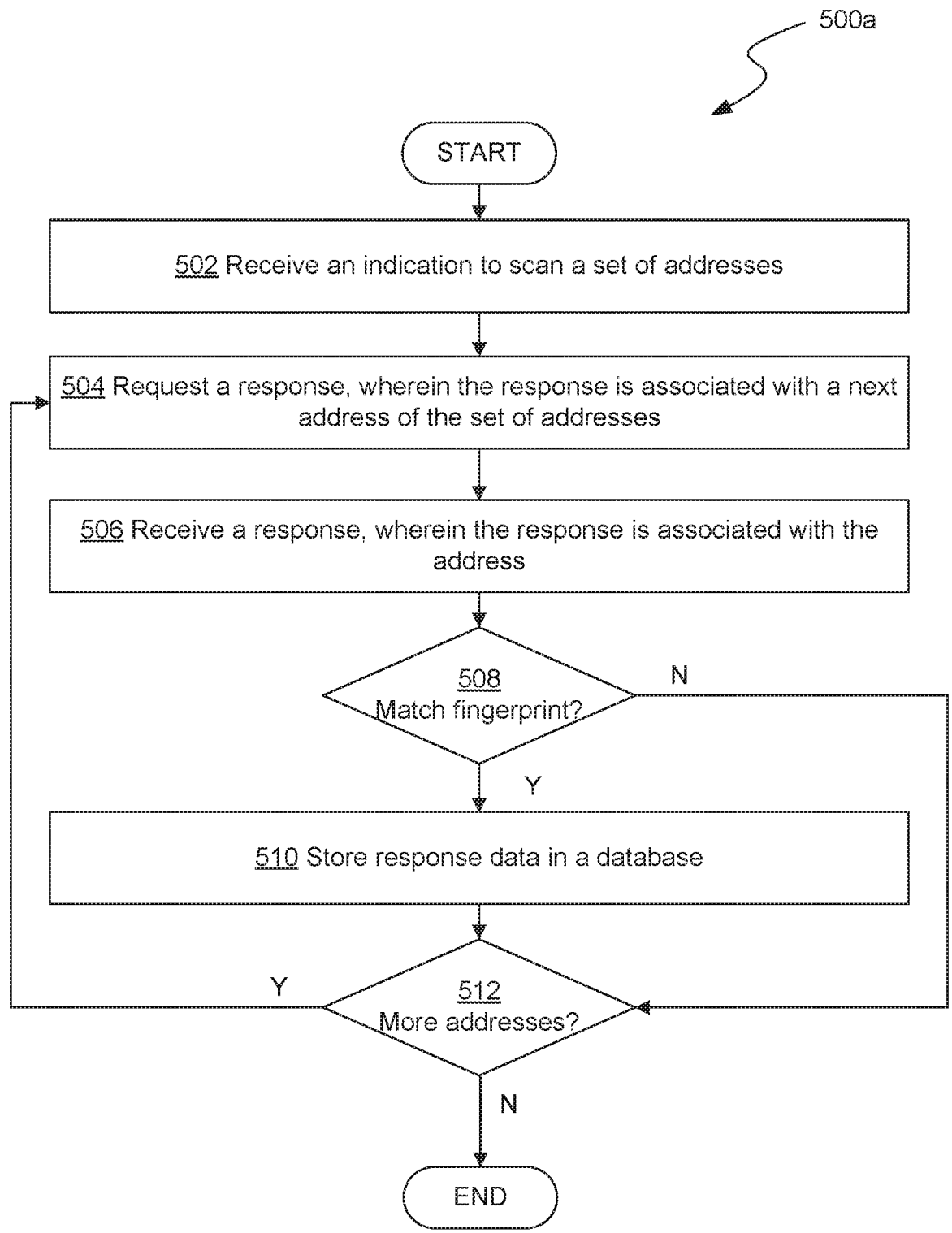
FIG. 5A is a flow diagram illustrating an example process for network mapping.

FIG. 5A is a flow diagram illustrating an example process 500a for network mapping. In some embodiments, example process 500a is executed by network mapping system 204 of FIG. 2. In some embodiments, the example process 500a depicted in FIG. 5A may be represented in instructions stored in memory that are then executed by a processor. The process 500 described with respect to FIG. 5A is an example provided for illustrative purposes and is not to be construed as limiting. Other processes may include more or fewer steps than depicted while remaining within the scope of the present disclosure. Further, the steps depicted in example process 500a may be performed in a different order than is shown.

The example process 500a begins at step 502 with receiving an indication to scan a set of addresses, for example, using a fingerprint as an identifying criterion. The set of addresses scanned as part of step 502 may include all addresses (e.g., all IP version 4 (IPv4) addresses, all IP version 6 (IPv6) addresses, etc.). In some embodiments, the addresses include all publicly routable IP addresses associated with a public network that is external to an entity (e.g., the Internet). In some embodiments, the set of addresses may include some predetermined subset of addresses, for example, associated with a specified network. In some embodiments, the indication to scan is received from an administrator system 202. The indication to scan may be based on a manual user input or may be based on an automatic process that is triggered periodically to update a network map or triggered in response to detected changes in a client network. In some embodiments, the fingerprint is received as part of the indication to scan. In some embodiments, the fingerprint is stored by the network mapping system.

At step 504, a response is requested, wherein the response is associated with a next address of the set of addresses. A response can be requested, for example, by transmitting some type of payload data to the next address in the set of addresses. In some embodiments, the next address of the set of addresses comprises the first address of the set of addresses. In some embodiments, the response is requested from a network system associated with the address (e.g., via a network interface and a network). In some embodiments, the response is requested from a network information database (e.g., network information database 414 of FIG. 4). In some embodiments, all available information is requested from the network system as part of requesting the response (e.g., network communications information settings, network addresses, information received by interactively querying the network system, etc.). In some embodiments, information requested is based at least in part on the fingerprint (e.g., only enough information is requested to determine whether the response matches the fingerprint— e.g., information that is not tested by the fingerprint is not requested).

At step 506, a response is received, wherein the response is associated with the address. The response received may include various data associated with the network system providing the response (e.g., a set of open ports, a set of services and associated ports, encryption information, host name information, domain name information, text information, etc.).

At step 508, it is determined whether the response matches the fingerprint. Determining whether the response matches the fingerprint may include comparing a fingerprint criterion or criteria with response data. In the event it is determined that the response does not match the fingerprint, control passes to step 512.

In the event it is determined that the response matches the fingerprint, control passes to step 510. At step 510, the address is stored in a client network database 412. In some embodiments, the response, including any information received from the network system as part of the response, is additionally stored in the client network database 412.

At step 512, it is determined whether there are more addresses (e.g., more addresses of the set of addresses). In the event it is determined that there are more addresses, control passes to 504. In the event it is determined that there are not more addresses, the process ends.

The flow chart depicted in FIG. 5A describes an example technique for scanning a network to perform network mapping and is not to be construed as limiting. Other techniques can similarly be implemented to scan a network. For example, in some embodiments hierarchical scanning can be applied when scanning a network. In some embodiments, hierarchical scanning includes probing network systems connected to a network for information and then using the information to probe more. For example, a system implementing hierarchical scanning (e.g., network mapping system 204) may transmit a payload to a set of Internet addresses and receive a set of responses. Using the information received in the responses, the system, can determine whether to execute a follow up probe for additional information. This process can be continually repeated to extract as much information regarding a network and the connected network systems as possible.

Figure 5B:
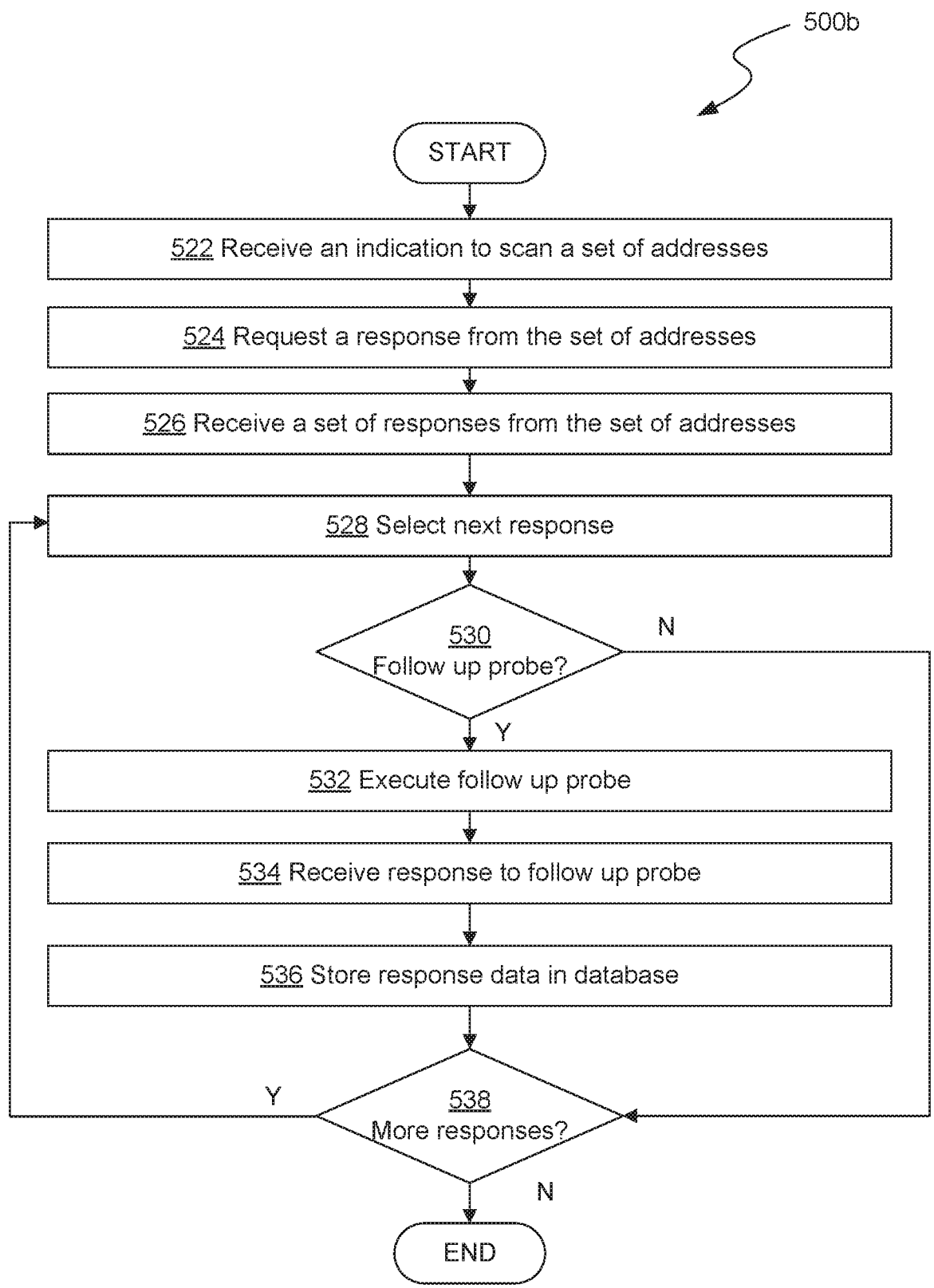
FIG. 5B is a flow diagram illustrating another example process for network mapping.

FIG. 5B is a flow diagram illustrating an example process 500b for network mapping that uses hierarchical scanning. As with example process 500a, process 500b can be executed by network mapping system 204 of FIG. 2. In some embodiments, the example process 500b depicted in FIG. 5B may be represented in instructions stored in memory that are then executed by a processor. The process 500b described with respect to FIG. 5B is an example provided for illustrative purposes and is not to be construed as limiting. Other processes may include more or fewer steps than depicted while remaining within the scope of the present disclosure. Further, the steps depicted in example process 500b may be performed in a different order than is shown.

Example process 500b starts at step 522 with receiving an indication to scan. In some embodiments, the indication is received from an administrator system 202. In some embodiments, indication to scan includes an indication to scan using a payload. In various embodiments, different payloads are capable of scanning different device types, scanning different networks, scanning for different information, or are different in any other appropriate way. In some embodiments, the indication includes a set of addresses to scan. In some embodiments, the addresses include all addresses (e.g., all IPv4 addresses, all IPv6 addresses, etc.). In some embodiments, the addresses include all publicly routable IP addresses associated with a public network that is external to an entity (e.g., the Internet). In some embodiments, the addresses include a set of addresses for a particular network of interest. In some embodiments, the indication comprises an indication of a set of ports at each address to scan. In some embodiments, the set of ports comprises all ports. In some embodiments, the set of ports comprises one or more ports determined to be associated with a service of interest. In some embodiments, the indication comprises an indication of a follow-up probe of interest (e.g., the indication comprises an indication to scan for information that can be gathered using the follow up probe of interest).

At step 524, a response is requested, for example, by transmitting or otherwise providing one or more payloads to a set of addresses on a set of ports. In various embodiments, the payload may include one or more of the following: a request for capabilities, a hello packet, a heartbeat packet request, a probing request, a request for any response, an existence response, or any other appropriate payload. In various embodiments, the payload comprises a user datagram protocol (UDP) packet (e.g., a wildcard netBios name request), a session initiation protocol (SIP) options request, a universal plug and play (UPNP) discovery message, a simple network management protocol (SNMP) community string, or any other appropriate payload.

At step 526, a set of responses are received. In some embodiments, each received response is associated with an address and a port. In some embodiments, the address and port associated with a response comprise the address and port to which the payload was sent provoking the response. In some embodiments, not all addresses and ports provide a response when provoked with the payload.

At step 528, a next response (e.g., of the set of responses) is selected. In some embodiments, the next response is the first response received.

At step 530, it is determined whether there is a follow-up probe associated with the response. In some embodiments, only a subset of all follow-up probes are considered (e.g., the scan is only for information that can be gathered using a predetermined follow-up probe). In the event it is determined that there is not a follow-up probe associated with the response, control passes to step 538. In the event it is determined that there is a follow-up probe associated with the response, control passes to step 532.

The decision regarding a follow up probe can be made based on various factors. Ins some embodiments, the decision is made based on any of the response data from the initial probe, the address that the response is received from, the port that the response is received from, whether there is a particular service associated with the address and/or port, whether there is encryption or any other access control associated with the address and/or port, etc.

At step 532, the follow-up probe (e.g., the follow-up probe associated with the response) is executed. In various embodiments, executing the follow-up probe may include transmitting or otherwise providing a follow-up payload and receiving a response, establishing an unencrypted connection, requesting unencrypted data, establishing an encrypted connection, requesting encrypted data, determining other addresses or ports to probe, or executing any other appropriate follow-up probe. In various embodiments, an unencrypted connection may include an HTTP connection, an FTP connection, a Modbus connection, a simple mail transfer protocol (SMTP) connection, a Telnet connection, or any other appropriate connection. In some embodiments, the follow-up probe uses an industrial system protocol for communications for systems/devices connected to the network (e.g., a probe asking who are you? using a protocol). In various embodiments, an unencrypted connection may use one of the following protocols: Windriver debug remote procedure call (WDBRPC), building automation and control networks (BacNet), EtherNet, EtherNet/IP, distributed network protocol (DNP3), Niagara Fox, General Equipment service request transport protocol (GE-SRTP), highway addressable remote transducer over internet protocol (HART-IP), ProConOS1M, Siemens S7, PCWorx, or any other appropriate protocol. In various embodiments, an encrypted connection may include an HTTPS connection, an FTPS connection, a secure shell file transfer protocol (SFTP) connection, an SSH connection, a simple mail transfer protocol secure (SMTPS) connection, or any other appropriate connection. In various embodiments, the follow-up probe comprises a follow-up probe for collecting universal plug and play (UPNP) information, for collection network basic input/output system (NetBIOS) information, for collecting domain name server (DNS) information, or for collecting any other appropriate information.

At step 534, a set of response data associated with the follow-up probe is received. At step 536, response data received at step 534 is stored in a database (e.g., a database of the network mapping system 204, etc.). At step 538, it is determined whether there are more responses (e.g., of the set of responses). In the event it is determined that there are more responses, control passes to step 528. In the event it is determined that there are not more responses, the process ends.

Network Asset Discovery

Figure 6:
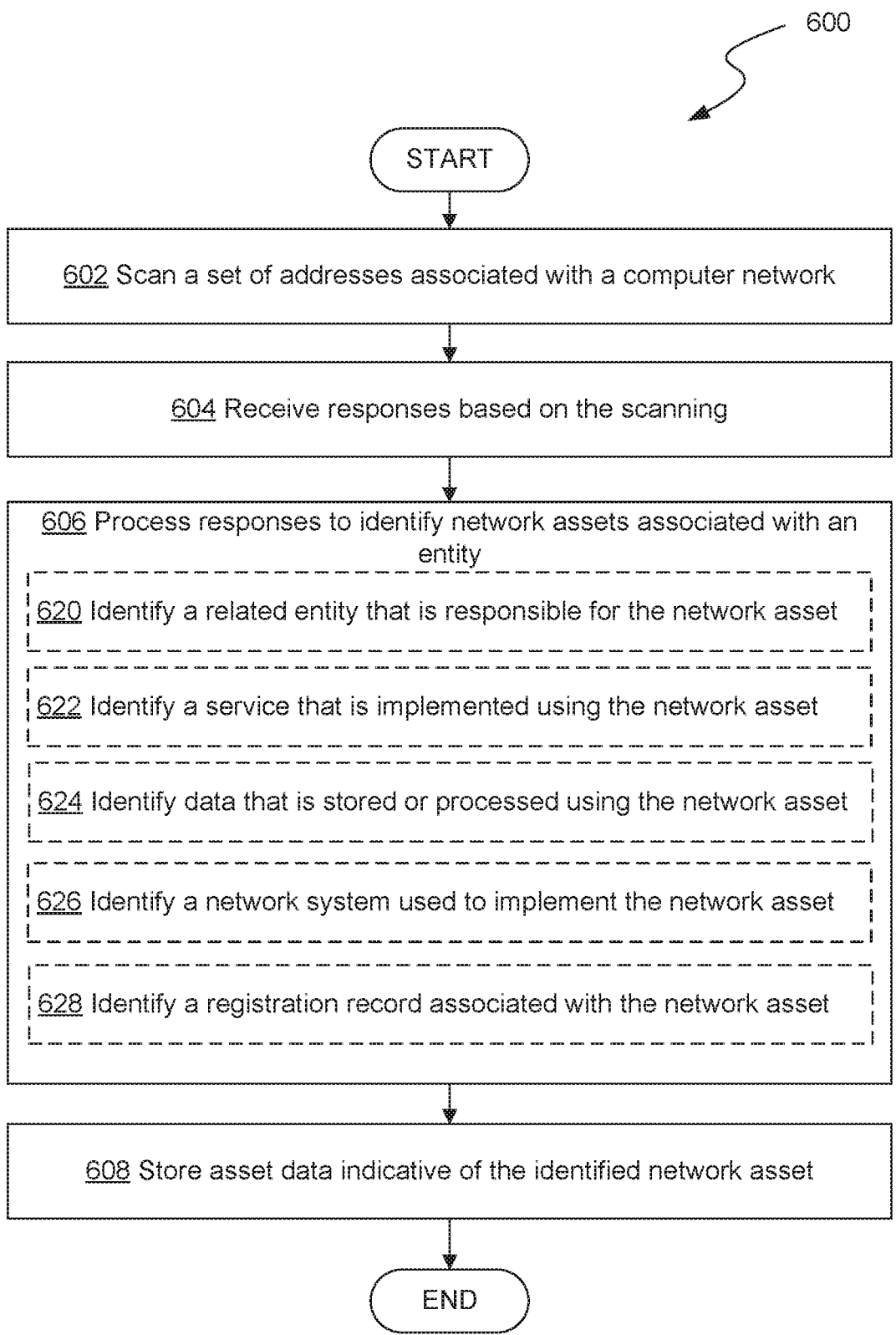
FIG. 6 is a flow diagram illustrating an example process for network asset discovery.

FIG. 6 is a flow diagram illustrating an example process 600 for network asset discovery. In some embodiments, example process 600 is executed by network mapping system 204 of FIG. 2. In some embodiments, the example process 600 depicted in FIG. 6 may be represented in instructions stored in memory that are then executed by a processor. The process 600 described with respect to FIG. 6 is an example provided for illustrative purposes and is not to be construed as limiting. Other processes may include more or fewer steps than depicted while remaining within the scope of the present disclosure. Further, the steps depicted in example process 600 may be performed in a different order than is shown.

The example process 600 begins at step 602 with scanning a set of addresses associated with a computer network and at step 604 receiving responses based on the scanning. For example, as described with respect to example processes 500a-b of FIGS. 5A-B, a network mapping system 204 may scan a set of addresses. The set of addresses may include all publicly routable addresses associated with a computer network that is external to the entity (e.g., the Internet) or may include some predetermined subset of addresses, for example, associated with a specified network. As part of the scanning process, the network mapping system may transmit requests to network systems connected to the network that are associated with the set of addresses.

In some embodiments, step 602 may include scanning a computer network (or set of computer networks) that include Internet-accessible systems that are external to a specified entity. For example, to scan the computer network, the network mapping system 204 may, for each Internet-accessible system: provide a payload to all accessible network systems on all accessible ports of the Internet-accessible system. Next, the network mapping system 204 may determine whether responses are received from one or more of the accessible network systems that were provided with payloads. Next, the network mapping system 204 may proceed with scanning each accessible network system from which a response to the payload was received, for example, by using a follow-up probe based at least in part on the response to the payload.

The information received in the responses based on the scanning is collectively referred to herein as "response data." The response data received in the responses may include, for example, any available information such as network communications information settings, network addresses, information regarding open ports, information regarding services implemented, encryption information, host name information, domain name information, text information, etc.

At step 606, the response data is processed to identify one or more network assets associated with an entity. Recall, an entity may include an individual, an enterprise organization, or any other type of organization. In some embodiments, and as previously described with respect to process 500a, fingerprints can be utilized to identify response data that is associated with a given entity. For example, if a particular response received includes a domain name and that response matches a fingerprint for the given entity, the network mapping system 204 may identify the domain name as a network asset associated with the entity. In some embodiments, and as previously discussed with regard to process 500b, hierarchical scanning can be applied. For example, the response data can be processed to determine whether to execute follow up probes. Responses to the follow up probes can then be processed to further identify network assets associated with an entity.

In some embodiments, data received in one or more responses is processed together to identify network assets associated with a particular entity. For example, if multiple responses that match an entity fingerprint include information that references a particular domain name, an inference can be made that the domain name is owned by, controlled by, or otherwise associated with the entity. In some embodiments, such inferences can be used to execute follow up probes for additional information. In some embodiments, machine learning may be applied to identify network assets associated with an entity. For example, data included in responses from multiple network systems can be input into and processed using one or more machine learning models to identify information included in the responses that is indicative of network assets associated with the entity.

As previously discussed, responsibility for a particular network asset may be attributed to another related entity. Accordingly, in some embodiments, the step of identifying the network assets may include a sub-step 620 of identifying a related entity that is responsible for the network asset. For example, a marketing department within an enterprise organization may acquire a registration for a particular domain name to use as part of a marketing campaign. Although the domain name registration is actually held by the enterprise organization, responsibility can be attributed to the marketing department and/or a particular individual within the marketing department. In this example, the entity would be the enterprise organization and the related entity would be a department or individual within the enterprise organization (i.e., a sub entity). Other types of related entities may include, for example, partner organizations, subsidiaries, suppliers/vendors, etc.

In some embodiments, step 620 may include processing the response data received at step 604 to identify a related entity. For example, an identifier associated with the related entity that is included in the response data may be parsed from the response data and attributed to the network asset. In other embodiments, step 620 may include accessing another data source for information regarding a related entity that is responsible for an identified network asset. For example, if a domain name registration is identified as a network asset, step 620 may include querying automatically an external registration database of a registration authority (e.g., a WHOIS lookup search). Identifying information regarding a related entity (e.g., a name, account identifier, email address, etc.) that registered the domain name may be returned in response to the registration database. Other similar processes may be performed to retrieve information indicative of a related entity that is responsible for the network asset.

In some cases, one or more services associated with the entity may be implemented using the network asset identified at step 606. For example, an enterprise organization may implement a web service using a particular domain name registration. Accordingly, in some embodiments, the step of identifying the network asset may include a sub-step 622 of identifying a service that is implemented using the network asset. In some embodiments, information indicative of the service (e.g., a service identifier) may be included in a response received at step 604. In other embodiments, step 622 may include querying automatically one or more network systems for information indicative of one or more services implemented using a network asset. For example, if an IP address registration is identified at step 606, at step 622, that IP address may be queried for a listing of services available over the IP address.

In some embodiments, data may be stored and/or processed using the network asset identified at step 606. For example, a network system associated with a particular IP address (the network asset) may store or process customer data associated with an enterprise organization. Accordingly, in some embodiments, the step of identifying the network asset may include a sub-step 624 of identifying data that is stored or processed using the network asset. In some embodiments, information indicative of the data (e.g., the data itself, listing of file identifiers, etc.) may be included in a response received at step 604. In other embodiments, step 624 may include querying automatically one or more network systems for information indicative of data that is stored or processed using the network asset. For example, if an IP address registration is identified at step 606, at step 624, that IP address may be queried for a listing of data available via the IP address.

As previously alluded to, one or more network systems (e.g., server computers) can be used to implement a particular network asset. For example, an IP address is assigned to each network system connected to the Internet. If an IP address registration is identified as a network asset at step 606, the network system that is associated with the IP address can be identified. Accordingly, in some embodiments, the step of identifying the network asset may include a sub-step 626 of identifying the network system used to implement the network asset.

Certain network assets may be associated with registrations or certificates that are issued by another party. For example, a publicly routable IP address will typically be associated with an IP address registration that is issued by a central registration authority. The entity that "owns" the IP address would actually own a registration for the IP address. Accordingly, in some embodiments, the step of identifying the network asset may include a sub-step 628 of identifying a registration record associated with the network asset. In some embodiments, step 628 may include using an identifier associated with the network asset (e.g., an IP address and/or domain name) to query an external registration database for the registration record associated with the network asset.

At step 608, asset data indicative of the network asset identified at step 606 is stored, for example, in network asset database 416. As previously mentioned, asset data may include the asset itself (e.g., a registration or a digital certificate), an asset identifier (e.g., an IP address, a domain name, etc.), an entity identifier (e.g., a name, email address, etc.) associated with a related entity (e.g., an individual) that is responsible for the network asset, a resource identifier (e.g., a cloud instance UID) associated with the network asset, credentials needed to access the network asset, and any other such data or metadata associated with a network asset. In other words, the asset data stored at step 608 may be further indicative of a related entity identified at sub-step 620, a service identified at sub-step 622, entity data identified at sub-step 624, a network system identified at sub-step 626, and/or a registration record identified at sub-step 628.

In some embodiments, process 600 is performed and re-performed continually to build and continually update a global record of the network assets associated with a given entity. In other words, the asset data stored in the network asset database 416 may be continually updated as new scans of the one or more addresses are performed. As discussed with respect to example processes 500*a-b*, new scans may be performed in response to received indications to scan. Such indications may be received from an administrator system 202 and may be based on manual user input or may be based on an automatic process that is triggered periodically to update the network asset database 416 or triggered in response to detected changes in a client network.

Although not depicted in the flow chart of FIG. 6, in some embodiments, the global record of network assets stored in the network asset database 416 may be supplemented with data that is input manually by a user. For example, an existing asset management system can be used to manually input asset data associated with a network asset. This asset data can then be stored in the network asset database 416 alongside asset data generated through the asset discovery process 600. In some embodiments, manually entered asset data may be processed before storing in the network asset database 416 to, for example, eliminate duplicate information, transform the data into a common format, aggregate the data, etc. In some embodiments, separate network asset databases may be maintained for manually entered asset data and discovered asset data. The separate network asset databases may be periodically synchronized to maintain a master global record of the network assets associated with an entity.

Network Asset Governance

Figure 7:
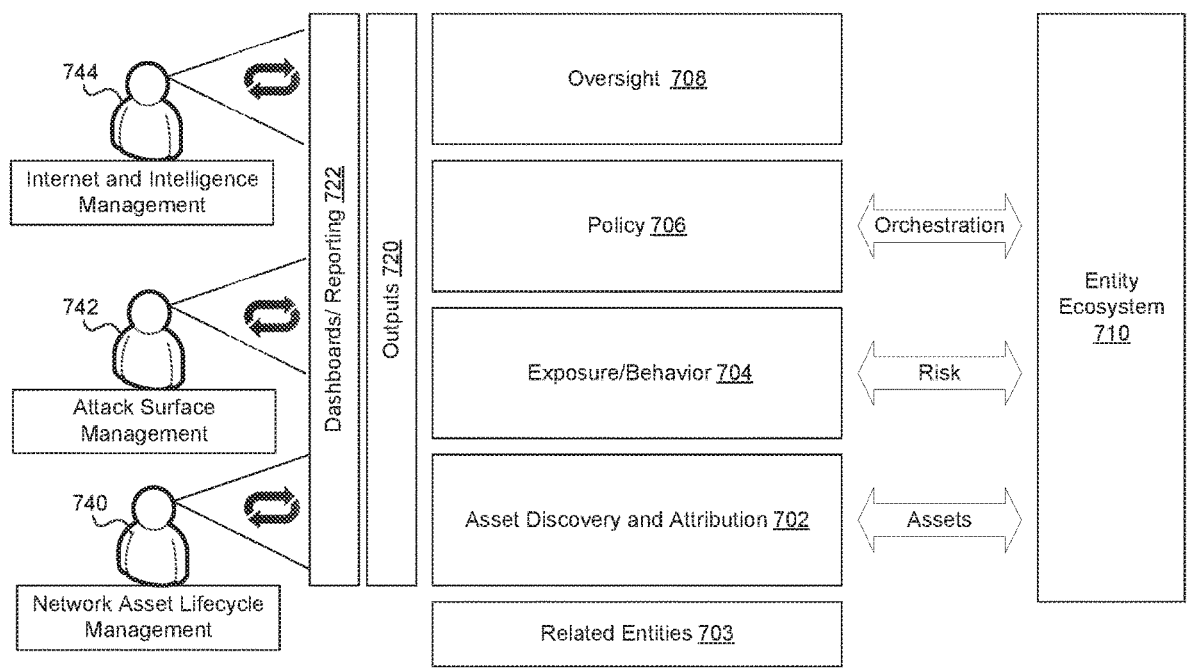
FIG. 7 shows a diagram of an example framework for network asset governance.

FIG. 7 shows a conceptual diagram of an example framework for network asset governance that incorporates the previously discussed technique for network asset discovery. As shown in FIG. 7, the example framework includes multiple layers such as asset discovery and attribution 702, exposure/behavior 704, policy 706, and oversight 708. Also, below asset discovery and attribution 702 is a related entities layer 703.

Asset discovery and attribution 702 refers to the process of discovering the one or more network assets associated with a given entity. For example, as described with respect to example process 600 shown in FIG. 6, asset discovery and attribution 702 may include scanning the Internet to discover the one or more network assets associated with the entity, attributing responsibility for and/or ownership of the identified network assets to certain related entities, and building a global record of the network assets based on the scanning.

Below the asset discovery and attribution layer 702 is a related entities layer 703 that refers to the ecosystem of related entities that a particular entity such as an enterprise organization may depend on. Related entities can include, for example, business partners, suppliers, vendors, potential acquisition targets, etc. Related entities may also include sub-entities within the overall entity ecosystem such as specific departments or individuals.

Above the asset discovery and attribution layer 702 is an exposure/behavior layer 704 in which certain properties and/or activity associated with the network assets of an entity are identified as potentially problematic. For example, properties that may be problematic may include a registration (e.g., for an IP address or domain name) that is about to expire, the fact that a particular network asset is even discoverable via a public network such as the Internet, or that a discovered network asset does not show up in a separate manually maintained network asset database. Activity that may be problematic may include the implementation of certain services using the network asset, the storage and/or processing of certain data using the network asset, etc. The types of properties and/or behavior that are identified as potentially problematic will depend on a number of factors such as the types of network assets in question, the type of entity associated with the network assets, etc. In some embodiments, this layer may include deducing certain properties and/or activities that are not necessarily apparent from the information discovered at layer 702.

Above the exposure/behavior layer 704 is a policy layer 706 in which policy rules specific to the enterprise are applied to the potentially problematic properties and/or behavior exposed at layer 704. It is generally understood that just because something is potentially problematic does not mean that it is important to the entity. For example, an entity such as an enterprise organization may maintain a public facing wireless network that is accessible, for example, to visitors or anyone else. Potentially problematic properties and/or behavior associated with network assets may exist in the publicly accessible wireless network; however, these issues may not be of concern to the enterprise organization. In contrast, the exact same properties and/or behavior may be of critical concern if observed over a network that handles credit card transactions or other customer data. In some embodiments, the policy layer 706 involves the application of one or more policy rules (e.g., set by the entity) to the properties and/or behavior exposed at lower levels to detect policy violations that are important to the entity. In some embodiments, the policy layer 706 may link the exposure/behavior layer 704 to other aspects of an entity's ecosystem 710. For example, detected policy violations may be raised to certain parties through generated alerts. In some embodiments, the policy layer 706 is linked to one or more virtual actuators associated with an entity's ecosystem 710 that are configured to automatically drive control actions (e.g., terminating instances, deleting data, configuring firewalls, etc.) to remedy or prevent policy violations.

Above the policy layer 706 is an oversight layer 708 in which high-level reporting is handled. For example, oversight layer 708 may include tracking entity policy violations over time and evaluating various metrics associated with the network assets of the entity.

As further depicted in FIG. 7, the multiple layers of the example framework can be linked to the entity ecosystem 710 through various views such as an asset view which provides visibility into the global record of network assets associated with the entity, a risk view which provides visibility into the potentially problematic properties and/or behaviors associated with the network assets, and an orchestration view that can drive certain information or commands (e.g., job tickets, automated actions, etc.) to remedy and/or prevent policy violations.

As also depicted in FIG. 7, processing at various layers of the framework can produce outputs 720 that are presentable via one or more dashboard/reporting interfaces 722. In some embodiments, the dashboard/reporting interface 722 may represent a common interface through which various users associated with an enterprise organization review information. In other embodiments, outputs 720 may be presented through multiple different dashboard/reporting interfaces 722 that are configured for different user groups. For example, IT operations users 740 may interact with the dashboard/reporting interface 722 as part of a network asset lifecycle management process, security operations users 742 may interact with interface 722 as part of an attack surface management process, and upper level information technology executives (e.g., CIO, CISO, etc.) 744 may interact with the dashboard/reporting interface 722 as part of an Internet and intelligence management process.

Figure 8:
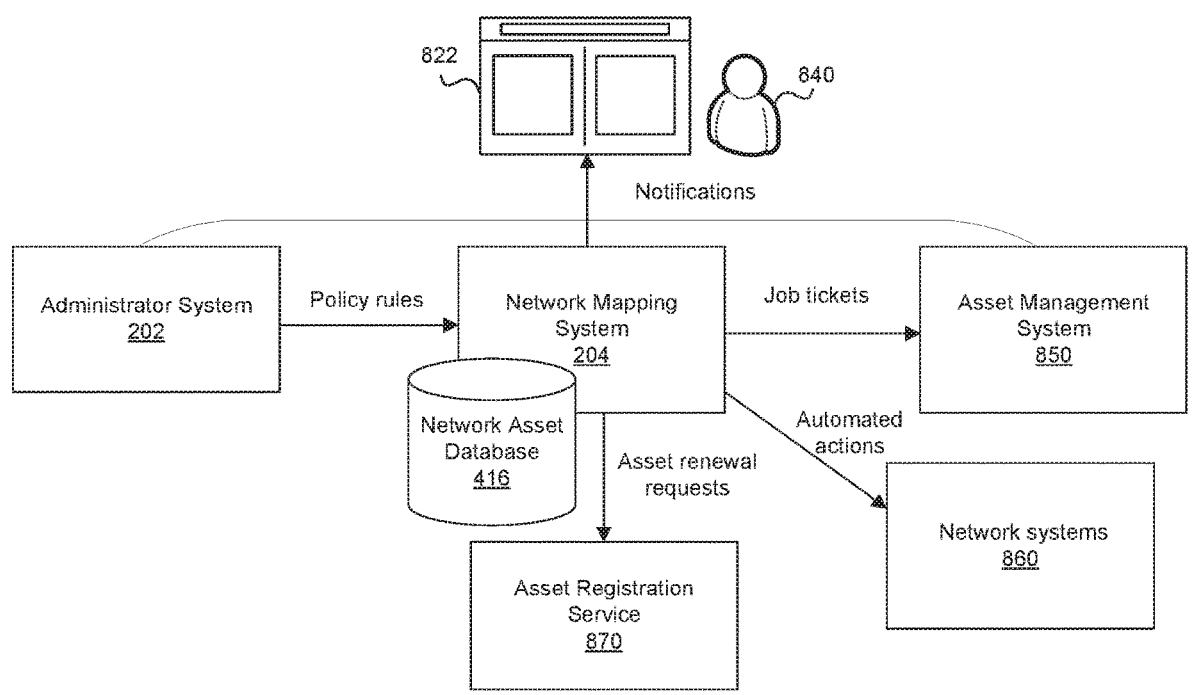
FIG. 8 shows a block diagram illustrating an embodiment of a networked computing environment in which network asset governance can be implemented.

FIG. 8 shows a block diagram illustrating an embodiment of a networked computing environment in which network asset governance can be implemented. Certain components of the example networked computing environment depicted in FIG. 8 may be explained in greater detail with respect to FIGS. 2-4. As shown in FIG. 8, a network mapping system 204 (e.g., as described with respect to FIG. 2) may maintain a database of network assets 416 that is created, for example, based on a network asset discovery process (e.g., as described with respect to process 600 of FIG. 6).

In some embodiments, policy rules associated with an entity can be received retrieved or otherwise accessed by the network mapping system 204 from an administrator system 202 (e.g., as described with respect to FIG. 2). The accessed policy rules can be applied to information included in the network asset database 416 to determine if certain properties or behavior associated with the network assets violate the policy rules (e.g., as described with respect to FIG. 7).

Various automated actions can be taken in response to policy violations. For example, in some situations, notifications indicative of the policy violation can be presented to a user 840 via a user interface 822. The user 840 may be associated with an IT operations department, a network security operations department, or any other group associated with the entity. The user interface 822 may be accessible via a web browser, desktop application, mobile application, or over-the-top (OTT) application. Accordingly, the user interface 822 may be viewed on a personal computer, tablet computer, mobile workstation, personal digital assistant (PDA), mobile phone, wearable electronic device, network-connected ("smart") electronic device, virtual/augmented reality system (e.g., a head-mounted display), or any other type of electronic device capable of presenting information.

In other situations, job tickets or other information can be transmitted to a separate asset management system 850 associated with the entity. In other situations, asset renewal requests may be transmitted to an external asset registration service 870 to prevent a network asset (e.g., a domain name registration) from expiring. The asset management system 850 may comprise one or more network systems (including processors, data storage, network interfaces, etc.) similar to network system 300 depicted in FIG. 3.

In other situations, other automated actions may be performed, for example, to adjust behavior by one or more network systems 860 associated with a network asset. Example automated actions may include blocking a service, de-provisioning a cloud computing instance, deleting or otherwise removing data, configuring a firewall, etc. Network systems 860 in this context may include any one or more of the network systems described with respect to FIGS. 2 and 3.

Figure 9:
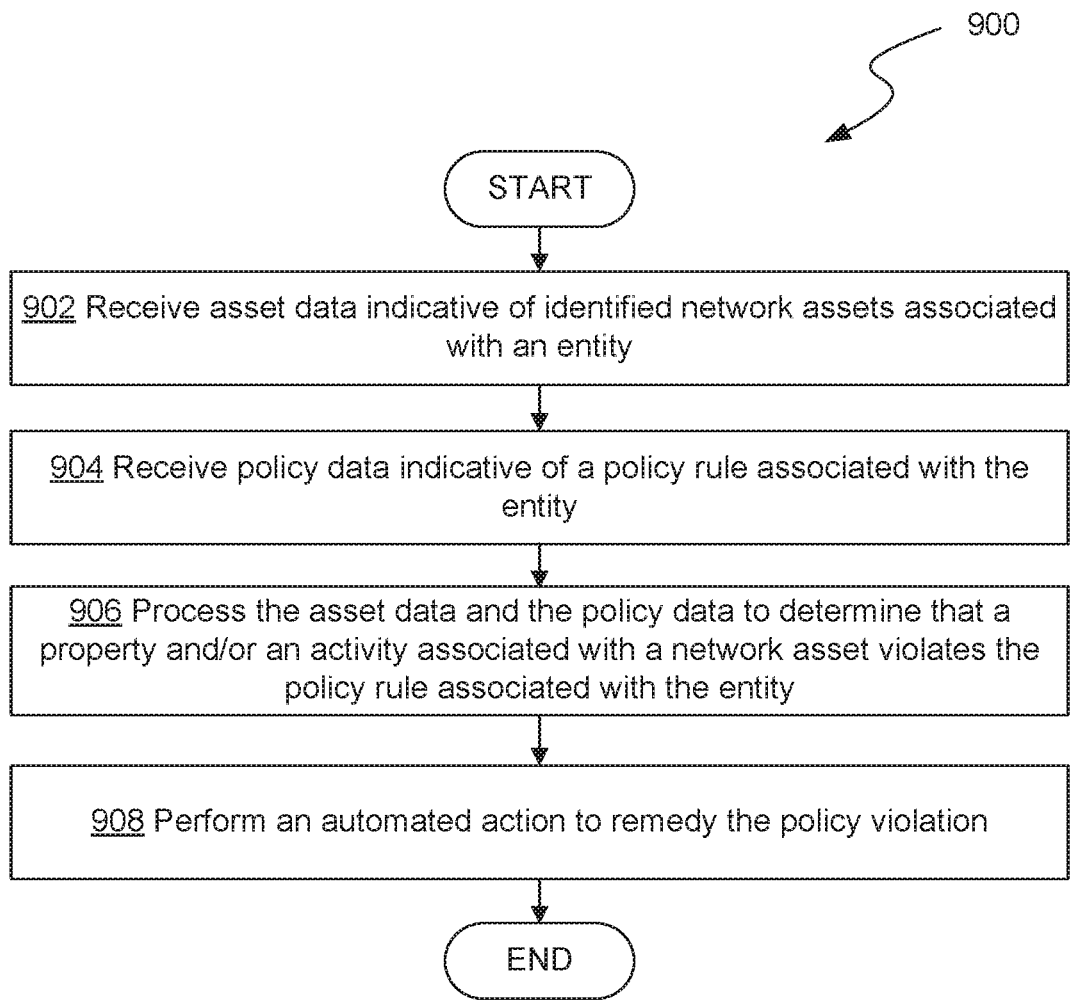
FIG. 9 is a flow diagram illustrating an example process for network asset governance.

FIG. 9 is a flow diagram illustrating an example process 900 for network asset governance. In some embodiments, example process 900 is executed by network mapping system 204 of FIG. 2, but may similarly be executed by other associated systems. In some embodiments, the example process 900 depicted in FIG. 9 may be represented in instructions stored in memory that are then executed by a processor. The process 900 described with respect to FIG. 9 is an example provided for illustrative purposes and is not to be construed as limiting. Other processes may include more or fewer steps than depicted while remaining within the scope of the present disclosure. Further, the steps depicted in example process 900 may be performed in a different order than is shown.

The example process 900 begins at step 902 with receiving asset data indicative of one or more identified network assets associated with an entity. For example, asset data may be received or retrieved from a network asset database 416 associated with a network mapping system 400. The asset data included in the network asset database 416 may be the result of one or more scans of a network associated with the entity that are performed as part of a network asset discovery process 600 as described with respect to FIG. 6.

At step 904, policy data indicative of one or more policy rules associated with the entity are received. In some embodiments, policy data may be received or retrieved from an administrator system 202 through which policy rules for the entity are set. For example, an administrator system 202 may receive user inputs to create a policy rule, configure a policy rule based on the user inputs, and store policy data indicative of the policy rule in a policy rule database that is accessible to other systems.

At step 906, the asset data received at step 902 and the policy data received at step 904 are processed to determine whether a property and/or activity associated with a network asset violates the policy rule associated with the entity.

In some embodiments, step 906 may include first processing the asset data to identify any potentially problematic properties and/or activities associated with the entity and then applying the one or more policy rules to these potentially problematic properties and/or activities to determine whether a policy rule is violated. As previously discussed, potentially problematic properties may include, for example, a registration (e.g., for an IP address or domain name) that is about to expire, the fact that a particular network asset is even discoverable via a public network such as the Internet, that a discovered network asset does not show up in a separate manually maintained network asset database, etc. Potentially problematic activity may include, for example, implementation of certain services using the network asset, the storage and/or processing of certain data using the network asset, etc. The types of properties and/or activities that are identified as potentially problematic will depend on a number of factors such as the types of network assets in question, the type of entity associated with the network assets, a type of related entity that is responsible for the network asset, a business context of the network asset, etc.

In some embodiments, machine learning may be applied to identify potentially problematic properties and/or activities associated with network assets. For example, one or more machine learning models may be trained to identify various types of properties and/or detect various types of activities based on input asset data. In such embodiments, the asset data received at step 902 is input into the one or more machine learning models to generate property/activity data indicative of one or more potentially problematic properties and/or activities associated with the network assets. This property/activity data can then be processed using the one or more policy rules indicated by the policy data received at step 904 to determine whether the properties and/or activities associated with the network assets violate a policy rule of the entity.

If a policy rule violation is detected at step 906, example process continues to step 908 where some type of automated action is performed to remedy the policy violation. The type of automated action performed at step 908 will depend on a number of factors such as a type of policy rule violated, a type of network asset associated with the policy rule violation, a type of related entity that is responsible for the network asset, etc. In some embodiments, automated actions are specified for each policy rule. For example, automated actions for a specific policy rule may be specified based on user inputs to the administer system 202. The user may specify various conditions for the policy rule that dictate the type of automated action to perform if a policy rule is violated. For example, a user may specify that violation of a particular policy rule by one department within an organization generates a notification while a similar violation of the policy rule by another department within the organization triggers a corrective action such as blocking a service, deleting data, etc.

Figure 10:
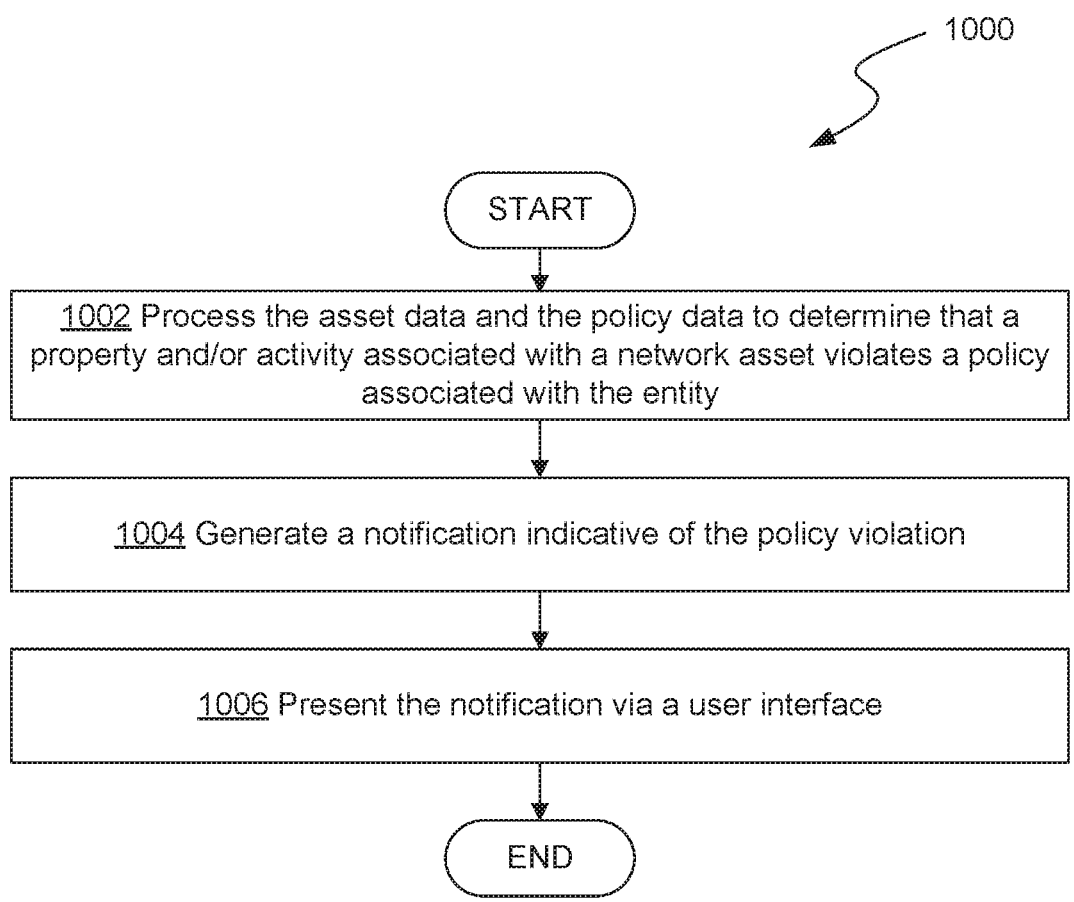
FIG. 10 shows a flow diagram illustrating an example process for generating a notification in response to detecting a policy rule violation.
Figure 11:
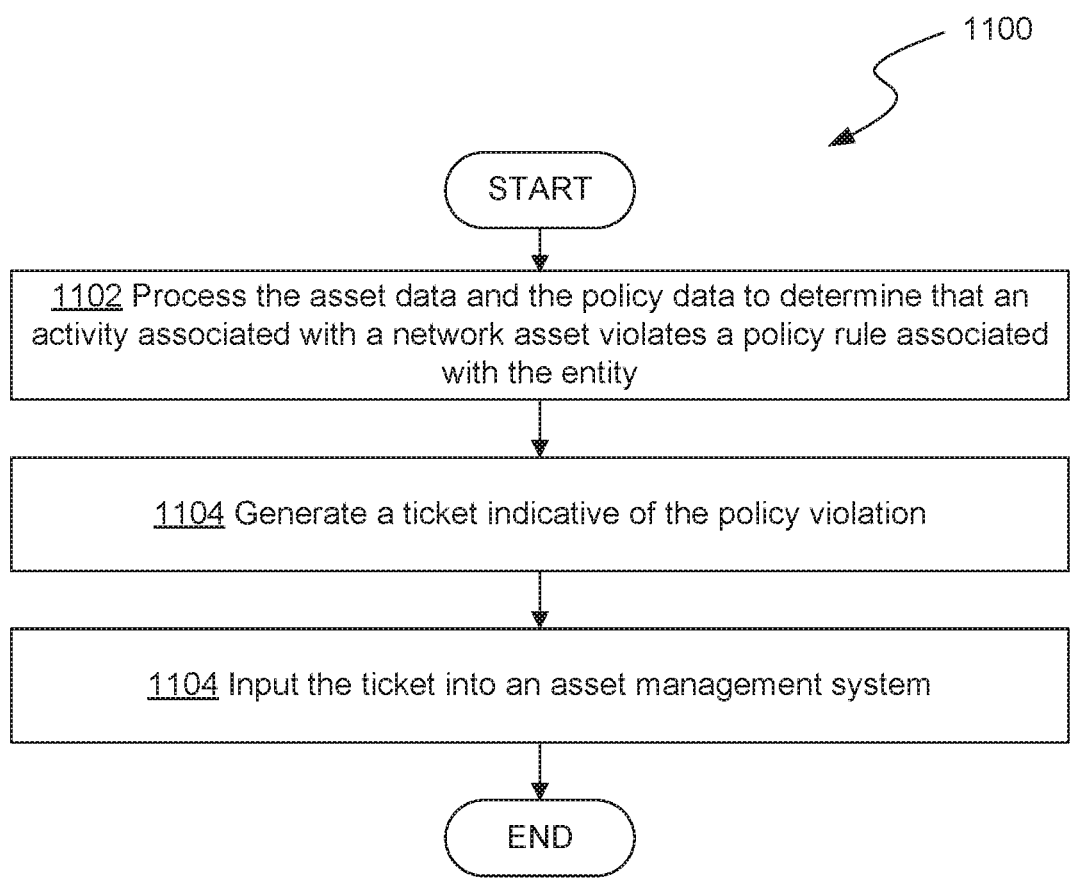
FIG. 11 shows a flow diagram illustrating an example process for generating a ticket in response to detecting a policy rule violation.
Figure 12:
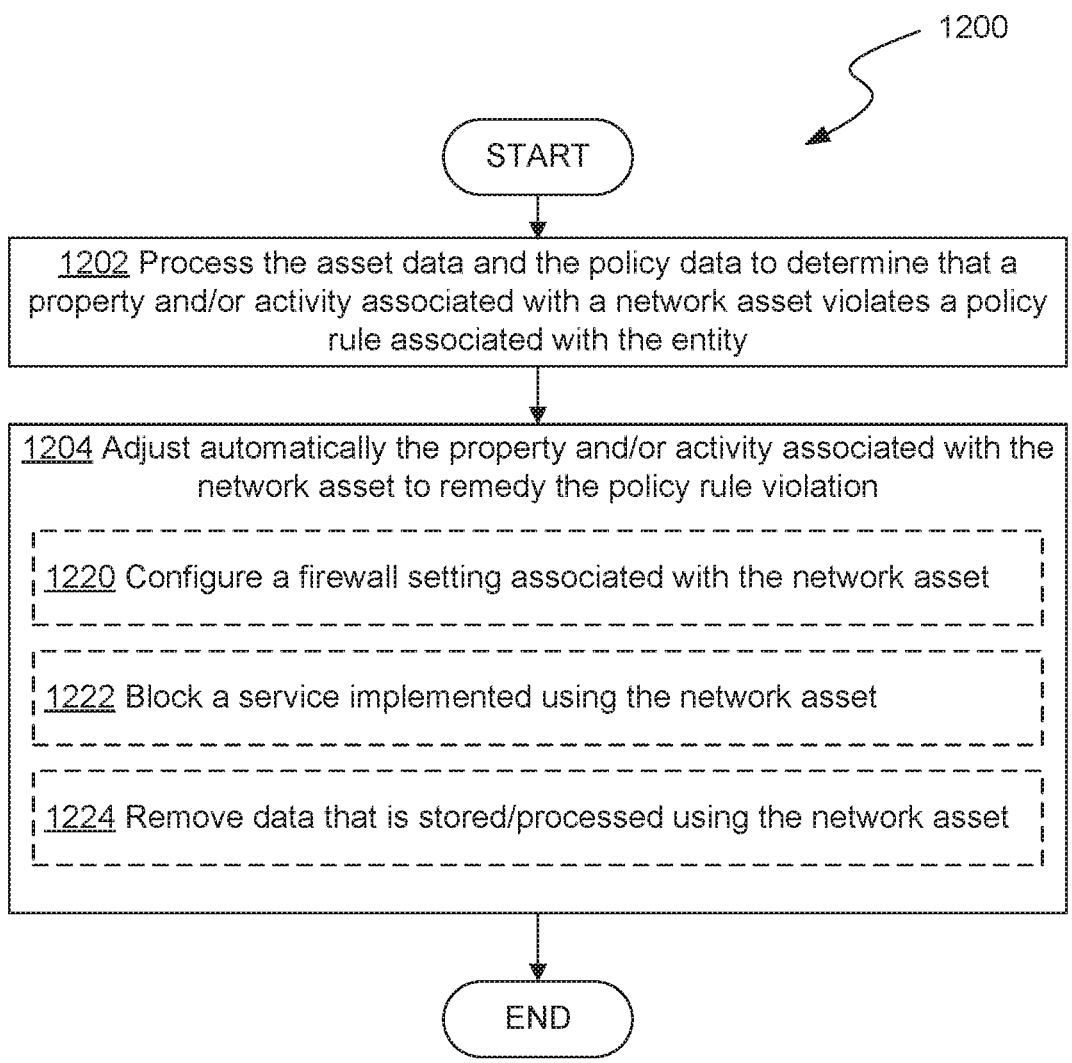
FIG. 12 shows a flow diagram illustrating an example process for adjusting automatically a property and/or activity associated with a network asset in response to detecting a policy rule violation.

FIGS. 10-12 are flow diagrams illustrating example processes for performing automated actions to remedy policy violations. In other words, the example processes of FIGS. 10-12 may be sub-processes to step 908 of process 900. In some embodiments, the example processes of FIGS. 10-12 may be represented in instructions stored in memory that are then executed by a processor. The processes described with respect to FIGS. 10-12 are examples provided for illustrative purposes and are not to be construed as limiting. Other processes may include more or fewer steps than depicted while remaining within the scope of the present disclosure. Further, the steps depicted in example processes of FIGS. 10-12 may be performed in a different order than is shown.

FIG. 10 shows a flow diagram illustrating an example process 1000 for generating a notification in response to detecting a policy rule violation.

The example process 1000 begins at step 1002 with processing asset data and policy data to determine that a property and/or activity associated with a network asset violates a policy rule associated with an entity, for example, as described with respect to step 906 of process 900.

At step 1004, a notification indicative of the policy violation is generated in response to detecting the policy violation. The notification generated may include, for example, an identifier associated with the network asset, a description of the policy rule violation, suggestions for actions to take to remedy the policy violation, and/or any other relevant information.

At step 1006, the notification is presented to a user via a user interface such as user interface 822 depicted in FIG. 8. In some embodiments, step 1006 may include transmitting the notification via email, short message service (SMS), or any other appropriate messaging protocol. In some embodiments, the notification may be presented via a dashboard interface associated with the administrator system 202 and/or network mapping system 204. In some embodiments, the notification may be presented via an interface of another system such as a separate asset management system 850, for example, by generating a call to an application programming interface (API) associated with the separate system. The manner and type of notification generated and presented will differ in various embodiments.

FIG. 11 shows a flow diagram illustrating an example process 1100 for generating a ticket in response to detecting a policy rule violation.

The example process 1100 begins at step 1102 with processing asset data and policy data to determine that a property and/or activity associated with a network asset violates a policy rule associated with an entity, for example, as described with respect to step 906 of process 900.

At step 1104, a ticket (e.g., a job ticket) is generated in response to detecting the policy violation. The generated ticket may include, for example, an identifier associated with the network asset, a description of the policy rule violation, suggestions for actions to take to remedy the policy violation, and/or any other relevant information.

At step 1106, the ticket generated at step 1104 is input into a separate asset management system such as asset management system 850 for further processing. For example, the separate asset management system 850 may be configured to track and manage multiple job tickets that describe actions to be manually performed or that include instructions that cause automated actions to be performed. In some embodiments, the job ticket generated at step 1104 is placed into a queue associated with the asset management system 850 for processing. In some embodiments, the ticket is generated and input into the separate asset management system 850 by generating a call to an API associated with the asset management system 850. The manner and type of ticket generated and input will differ in various embodiments.

FIG. 12 shows a flow diagram illustrating an example process 1200 for adjusting automatically a property and/or activity associated with a network asset to remedy a policy rule violation.

The example process 1200 begins at step 1202 with processing asset data and policy data to determine that a property and/or activity associated with a network asset violates a policy rule associated with an entity, for example, as described with respect to step 906 of process 900.

At step 1204, the property and/or activity associated with the network asset is adjusted automatically to remedy the policy rule violation. The type of property and/or activity adjusted may depend on a number of factors such as any of a type of policy rule violated, a type of network asset associated with the policy rule violation, a type of related entity that is responsible for the network asset, etc.

In some embodiments, adjusting automatically the property and/or activity associated with the network asset may include configuring a firewall setting associated with the network asset at step 1220. For example, if a policy rule specifies that certain communications not be transmitted over a particular IP address (in the case the network asset), step 1220 may include configuring automatically a firewall associated with the entity to block such communications using the IP address.

In some embodiments, adjusting automatically the property and/or activity associated with the network asset may include blocking a service implemented using the network asset at step 1222. For example, if a policy rule specifies that certain services should not be available at a particular domain, step 1222 may include configuring automatically a network system hosting the domain to block or otherwise shut down the services. In some embodiments, this may include configuring a firewall as described with respect to step 1220.

In some embodiments, adjusting automatically the property and/or activity associated with the network asset may include deleting or otherwise removing data from a network system associated with network asset at step 1224. For example, if a policy rule specifies that certain data (e.g., personally identifiable customer data) should not be stored at a network system associated with a publicly accessible IP address, step 1224 may include deleting automatically such data from a network system associated with a publicly accessible IP address and/or migrating automatically such data to a different system or device that is not associated with a publicly accessible IP address.

Steps 1220-1224 describe some examples of how to adjust automatically a property and/or activity associated with a network asset to remedy a policy violation, but this is not to be construed as an exhaustive list. Other types of automatic actions may similarly be taken such as upgrading or patching software implemented using the network asset, replacing the network asset with a different network asset, decommissioning the network asset, reconfiguring a network system (e.g., a server computer) associated with the network asset, etc.

Figure 13:
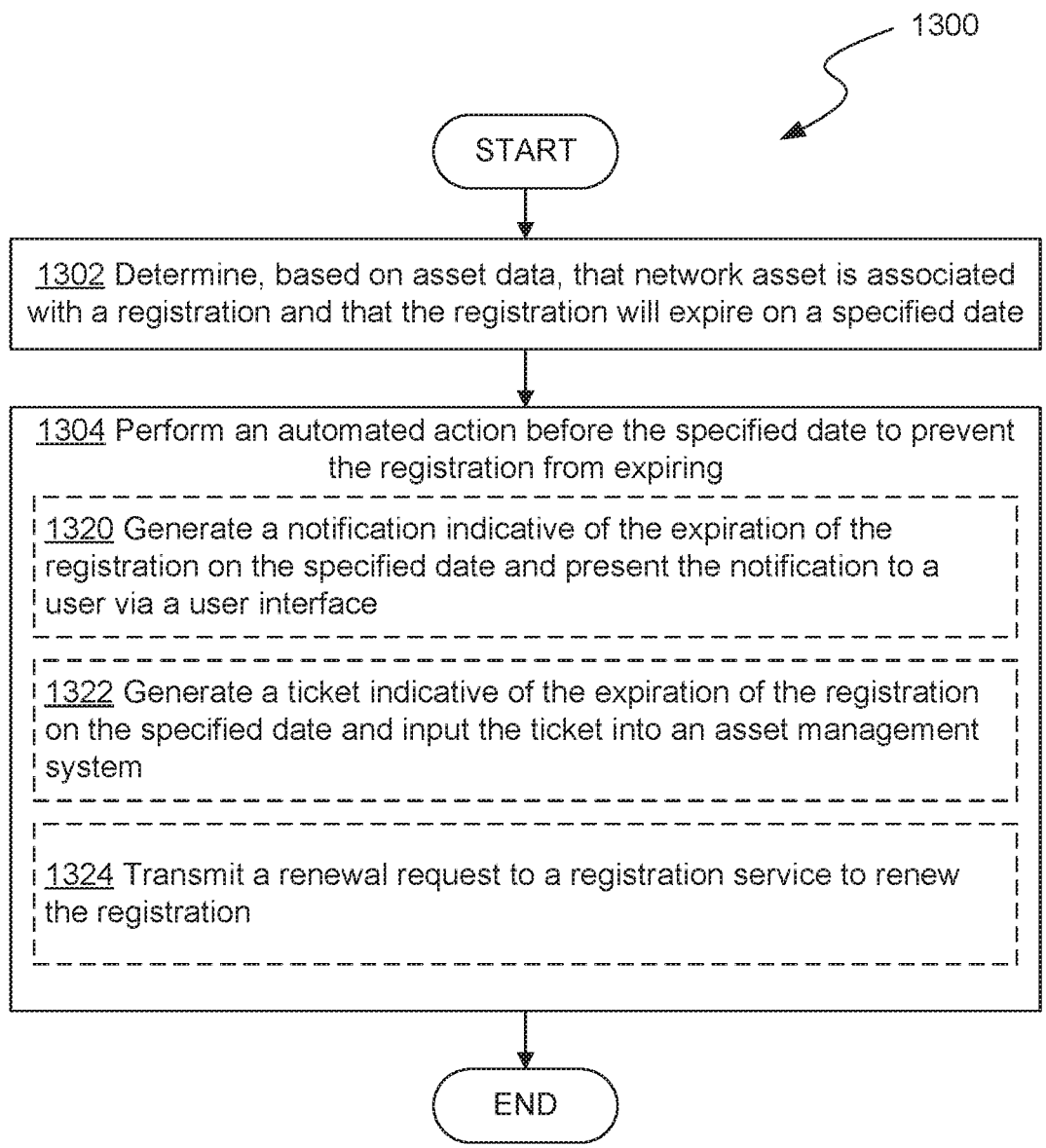
FIG. 13 shows a flow diagram illustrating an example process for causing a registration associated with a network asset to be renewed before an expiration date.

FIG. 13 shows a flow diagram illustrating an example process 1300 for causing a registration associated with a network asset to be renewed before an expiration date. As previously discussed, certain network assets such as IP addresses and/or domain names may be associated with a registration that is issued by a third-party registration service. In some embodiments, a system in accordance with the introduced technique can be configured to renew a registration before the registration expires or at least present a notification of the impending expiration.

In some embodiments, the example process 1300 depicted in FIG. 13 may be represented in instructions stored in memory that are then executed by a processor. The process 1300 described with respect to FIG. 13 is an example provided for illustrative purposes and is not to be construed as limiting. Other processes may include more or fewer steps than depicted while remaining within the scope of the present disclosure. Further, the steps depicted in example process 1300 may be performed in a different order than is shown.

The example process 1300 begins at step 1202 with processing asset data to determine that a network asset is associated with a registration (e.g., a domain name registration) and that the registration will expire on a specified date. In some embodiments, this information can be extracted or at least inferred based on information included in the asset data. For example, as part of an asset discovery process (e.g., as described with respect to FIG. 6), data indicative of the registration may be received from a network system as part of a scan and stored in a network asset database 416 as asset data. In some embodiments, step 1202 may include querying automatically an external registration database of a registration authority for information indicative of a registration (e.g., associated with a domain name) and a registration expiration date.

At step 1304 an automated action is performed prior to the specified expiration date to prevent the registration from expiring.

In some embodiments, step 1304 may include generating a notification indicative of the expiration of the registration on the specified date and presenting the notification to a user via a user interface 822 at step 1320. In some embodiments, presenting the notification may include transmitting the notification via email, short message service (SMS), or any other appropriate messaging protocol to a user computing device. In some embodiments, the notification may be presented via a dashboard interface associated with the administrator system 202 and/or network mapping system 204. In some embodiments, the notification may be presented via an interface of another system such as a separate asset management system 850, for example, by generating a call to an application programming interface (API) associated with the separate system. The manner and type of notification generated and presented will differ in various embodiments.

In some embodiments, step 1304 may include generating a ticket indicative of the expiration of the registration on the specified date and inputting the ticket into an asset management system 850. In some embodiments, the ticket is generated and input into the asset management system 850 by generating a call to an API associated with the asset management system 850. The manner and type of ticket generated and input will differ in various embodiments.

In some embodiments, step 1304 may include transmitting automatically a renewal request to a registration service 870 to renew the registration before the registration expires at step 1324. For example, the renewal request may be transmitted over a network to the registration service 870 along with a payment to renew the registration before the registration expires.

Figure 14:
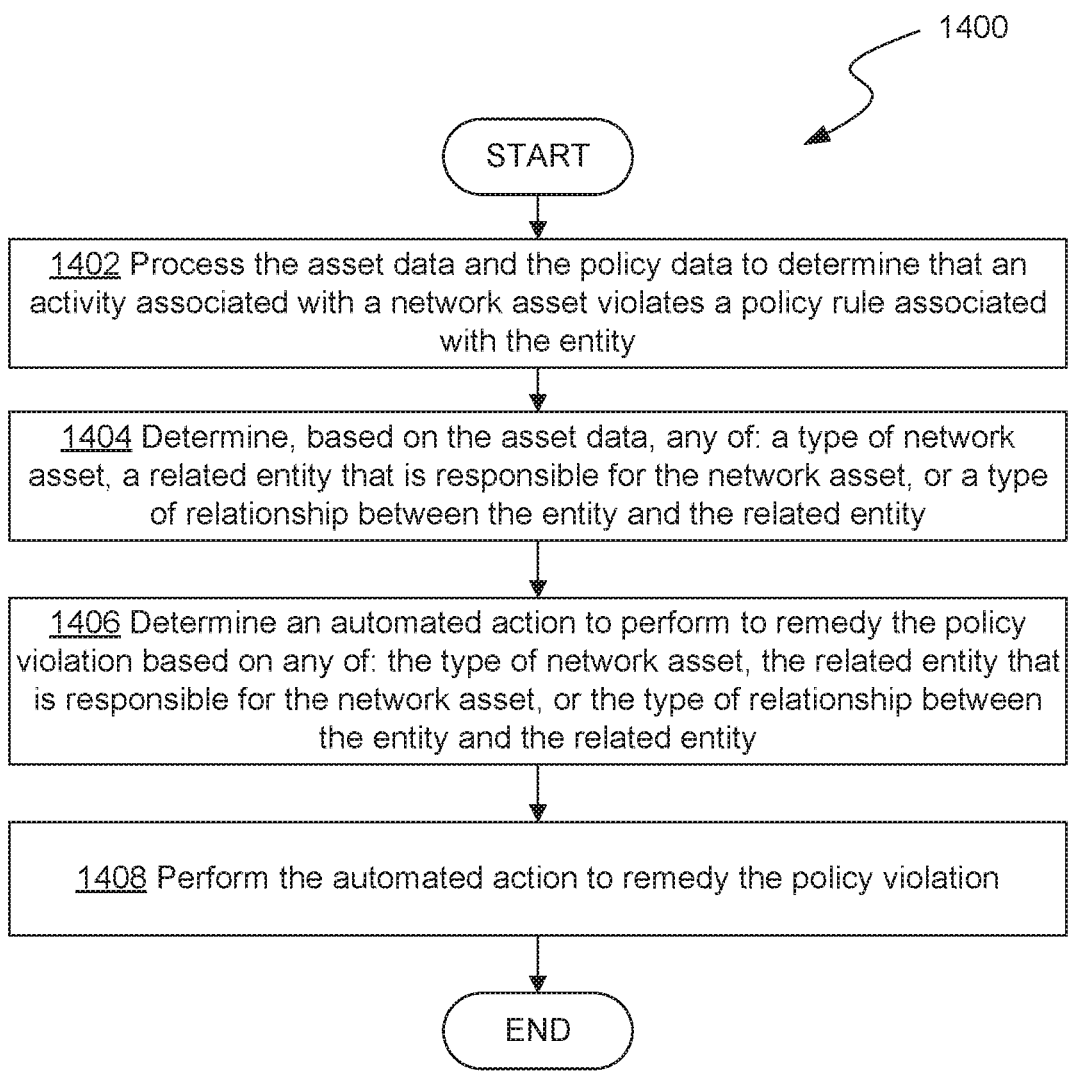
FIG. 14 shows a flow diagram illustrating an example process for determining what type of automated action to perform in response to detecting a policy rule violation.

FIG. 14 shows a flow diagram illustrating an example process 1400 for determining what type of automated action to perform to remedy a policy violation. As previously discussed, the type of action performed as part of an asset governance workflow can depend on a number of different factors. In some embodiments, the example process 1400 depicted in FIG. 14 may be represented in instructions stored in memory that are then executed by a processor. The process 1400 described with respect to FIG. 14 is an example provided for illustrative purposes and is not to be construed as limiting. Other processes may include more or fewer steps than depicted while remaining within the scope of the present disclosure. Further, the steps depicted in example process 1400 may be performed in a different order than is shown.

Example process 1400 begins at step 1402 with processing asset data and policy data to determine that a property and/or activity associated with a network asset violates a policy rule associated with an entity, for example, as described with respect to step 906 of process 900.

At step 1404, the asset data is processed to determine one or more characteristics associated with the network asset such as a type of network asset (e.g., IP address, domain name, digital certificate, cloud infrastructure account, etc.), a related entity that is responsible for the asset (e.g., enterprise organization, department, employee, etc.), or a relationship between the entity and the related entity (e.g., business partner, vendor, supplier, acquisition target, etc.).

At step 1406, one or more of the characteristics determined at step 1404 are used to determine the type of automated action to perform to remedy the policy violation (e.g., notification, input ticket into asset management system, configure firewall, block service, etc.). The type of action performed may also depend on the nature of the policy rule violation (i.e., what types of properties and/or activities caused the violation).

In some embodiments, various characteristics are weighted differently in determining which automated action to perform. For example, the type of network asset may be weighted more heavily than the relationship between the entity and the related entity when determining which automated action to perform. In some embodiments, machine learning may be applied to determine which automated action to perform. For example, one or more of the characteristics determined at step 1404 may be input into and processed using one or more machine learning models to determine what type of automated action to perform to remedy a policy violation. As previously discussed, in some embodiments, a user may specify various conditions for the policy rule that dictate the type of automated action to perform if the policy rule is violated. For example, a user may specify various combinations of network asset characteristics as conditions and define a particular automated action to be performed when the conditions are met.

Finally, at step 1408 the automated action determined at step 1406 is performed to remedy the policy rule violation.

Supply Chain Security

Figure 15:
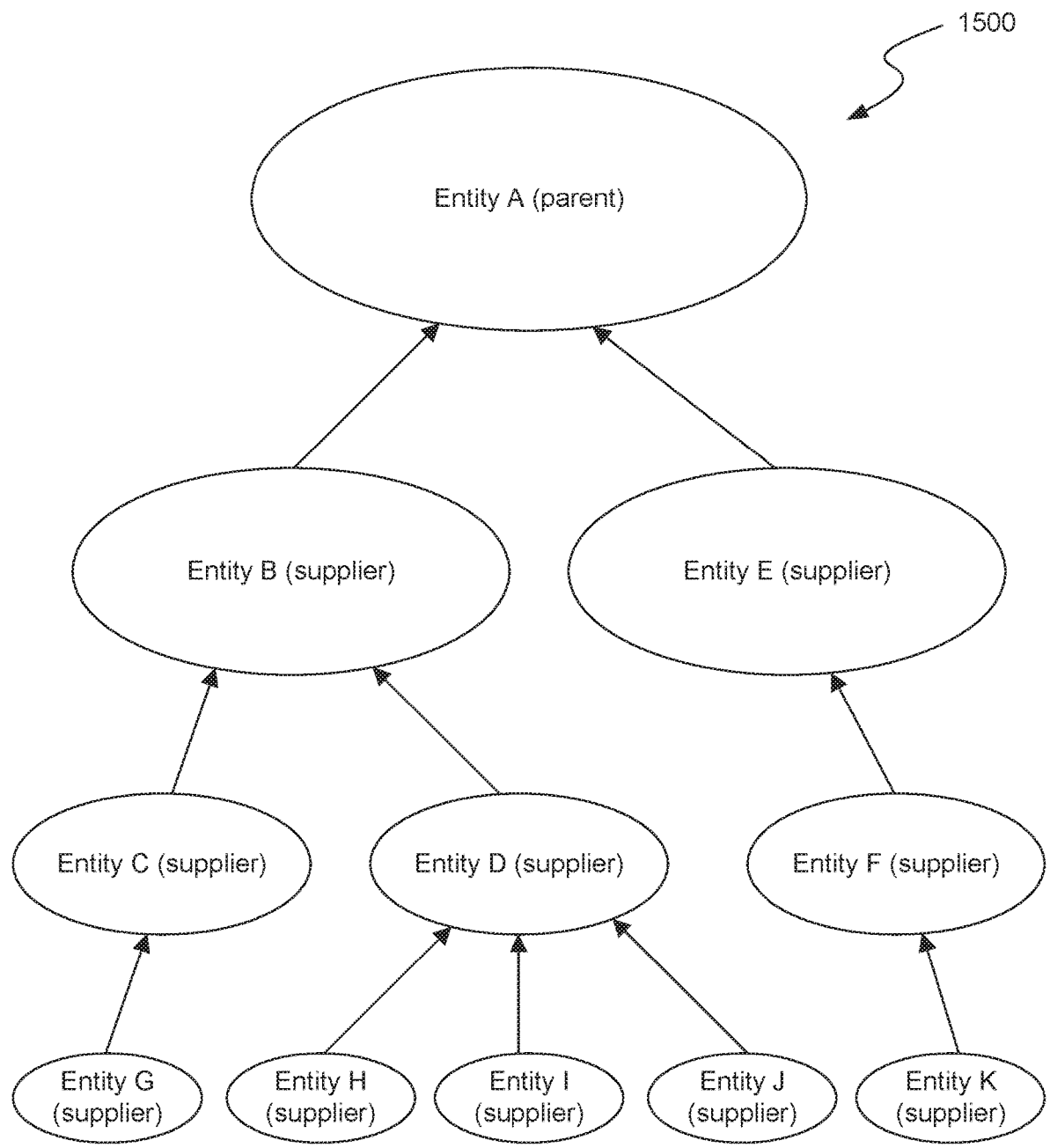
FIG. 15 is diagram of an example supply chain involving multiple entities.

Modern supply chains can involve multiple different entities. For example, FIG. 15 shows an example supply chain 1500 that includes first entity A that is supplied by multiple other supplier entities B through K. For example, entity A may design, assembly, and sell consumer devices such as mobile phones. To do so, entity A contracts with multiple suppliers, such as integrated circuit suppliers, communications device suppliers, software developers, other material suppliers, etc. As depicted in FIG. 15, in some cases a supplier may contract with its own suppliers to provide certain goods and services up the supply chain. For example, entity B is supplied by entities C and D, which are themselves supplied by other entities down the supply chain. As an illustrative example, an integrated circuit supplier may contract with an integrated circuit designer and/or integrated circuit fabricator in order to supply integrated circuits for use in a mobile phone sold by Entity A.

FIG. 15 shows an example supply chain that is simplified for illustrative purposes; however, modern supply chains in certain industries can be significantly more complex, involving dozens, if not hundreds or thousands, of different entities. Further, the example supply chain shown in FIG. 15 is depicted as having a one-way path up the hierarchy. In some embodiments, a supply chain may include paths that traverse in various directions between entities. For example, entity B may supply certain components to entity D which allow entity D to supply products of those components to entity B (or other entities in the supply chain). Also, entity A is designated as a "parent" to indicate its position in the supply chain 1500 depicted in FIG. 15; however, entity A may not own, manage, control, or otherwise be affiliated with any of the supplier entities (other than a supply contract relationship). In some cases, entity A may also be a supplier to another entity in a different supply chain not depicted in FIG. 15. In other words, in the context of a supply chain, a "parent" may refer to an entity at the top or end state of an organization of interests in the supply chain.

Figure 16:
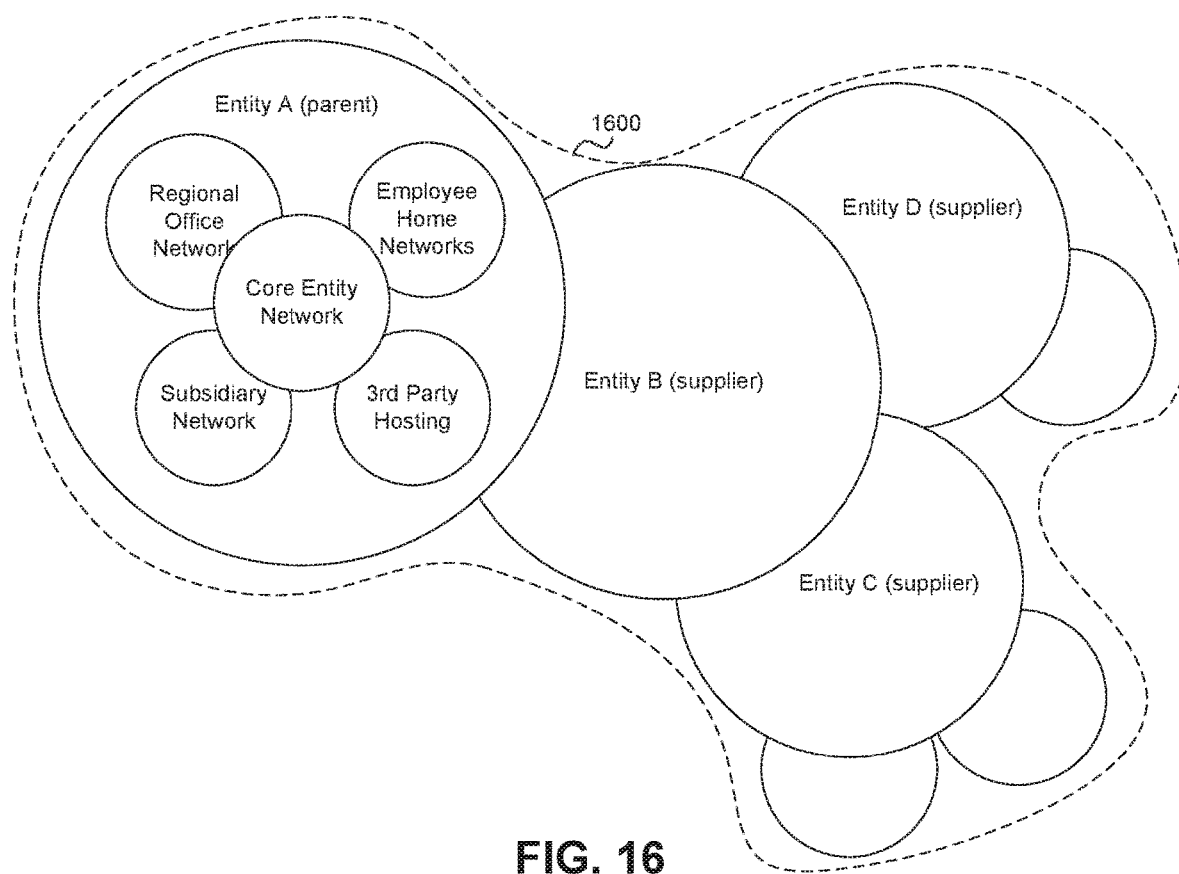
FIG. 16 is a diagram representing a combined attack surface of a supply chain

The interdependency of the multiple entities in a supply chain and lack of control or visibility can create significant cyber security and other business risks for the various entities. FIG. 16 shows a conceptual diagram of an attack surface 1600 associated with a given entity A that is expanded to include the attack surfaces of the various suppliers to the entity A. In other words, attack surface 1600 represented in FIG. 16 may be conceptualized as a "combined attack surface" for the entity A and the various supplier entities in a supply chain. The "attack surface" of a given entity refers to the inventory of various points where an unauthorized actor can gain access to a given network. Accordingly, the "combined attack surface" refers to the inventory of various points where an unauthorized actor can gain access to any one or more internal networks associated with multiple entities in a supply chain. The points of access can include, for example, various Internet-facing network systems (also referred to as "edge devices") through which access to internal networks can be gained. As indicated in FIG. 16, more traditional areas of an entity's attack surface, such as the edges of the core entity network, regional office networks, subsidiary networks, employee home networks, etc., do not effectively capture the exposure to risk for the entity.

The exposure to risk may include, for example, exposure to an attack on entity A's core network but can also include exposure to business risk, for example, where an attack on a supplier's core network impacts the ability of the supplier to meet a supply obligation to entity A. Consider, for example, a scenario in which entity B supplies integrated circuits to entity A. In the example scenario, entity B suffers a ransomware attack on its core network which causes its integrated circuit production facilities to shut down. Although the ransomware attack on entity B's network does not directly impact the security of entity A's network, the shutdown of entity B's integrated circuit production facilities may significantly impact the supply chain and prevent entity A from fulfilling orders for the mobile phone it produces. Even a shutdown of entity B's production facilities for a few hours can result in millions of dollars in losses for both entity B and entity A. In other words, the cyber security risks of entity B are also cyber security risks for entity A.

Figure 17:
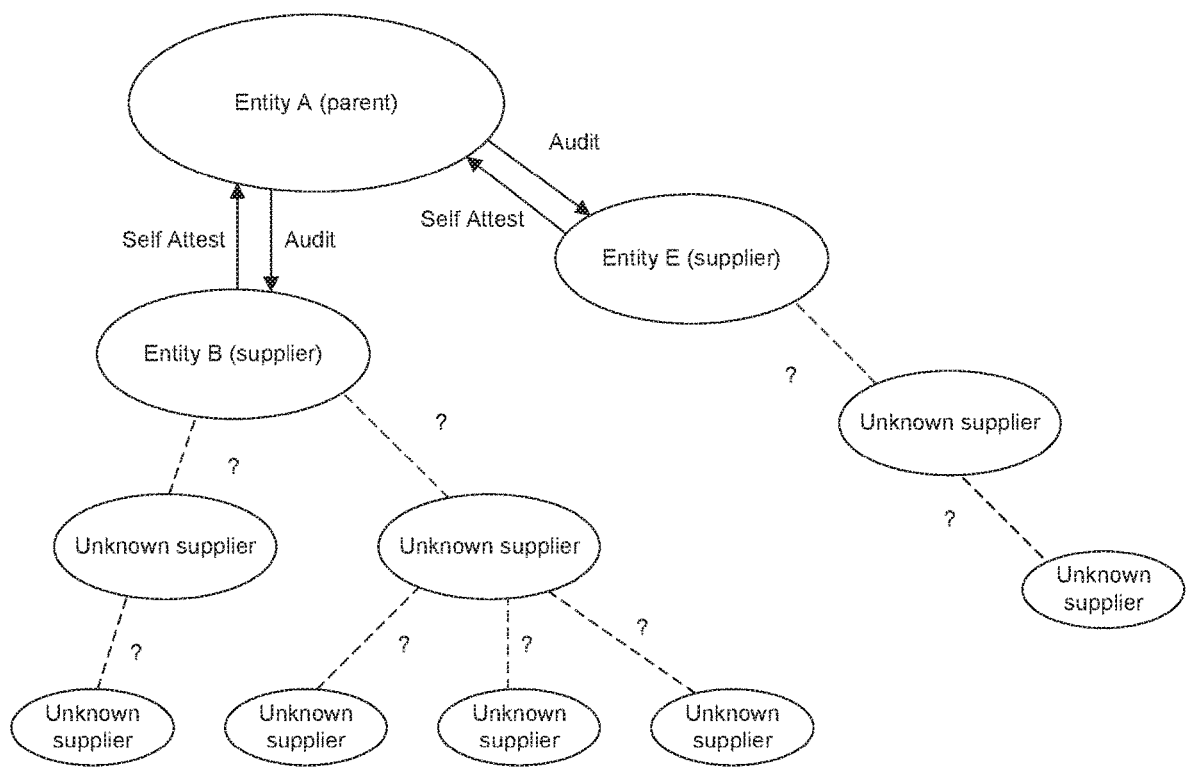
FIG. 17 is a diagram illustrating various limitations of an existing technique of audit and self-attestation for managing risk in a supply chain.

Currently, entities attempt to manage risk associated with suppliers through a process of audit and self-attestation. For example, a service-level agreement (SLA) between a parent and supplier will typically include terms that allow the parent to audit the supplier (e.g., yearly) to check that the supplier is taking certain measures to manage their own cyber security risk. However, such audits typically only require that the supplier self-attest that they are taking the measures defined by SLA. Such an audit process is ineffective at actually managing risk, particularly in complex supply chains, for several reasons. FIG. 17 shows a diagram that illustrates the various limitations of a process that includes audit and self-attestation for managing risk in a supply chain. First, even if a supplier attests truthfully to the best of their knowledge, that supplier may not actually have a comprehensive understanding of their own risk exposure. For example, with reference to FIG. 17, both entities B and E have obligations to self-attest in response to audits from entity A. If entities B or E do not actually have knowledge of their own risk exposure, the self-attestation to entity A provides little value to entity A, from a risk mitigation standpoint. Second, even if a supplier attests accurately to their own risks and measures taken to mitigate risk, that supplier may not have knowledge or understanding of risks introduced by their own suppliers further down the supply chain. For example, entity B may not have a similar audit regime set up with its suppliers further down the chain. Again, this means that the self-attestation by entity B to entity A provides little value to entity A. Third, an attempt by an entity to audit all of its suppliers in the supply chain (including suppliers of suppliers) would be impractical due to the number of suppliers, as well as complexity of any contractual agreements that would enable this. In some cases, auditing lower level suppliers may be impossible, particularly where those lower level suppliers are unknown to the parent for competitiveness reasons. For example, entity A may know that it is supplied by entities B and E, but for competitiveness reasons may have no knowledge of the lower level suppliers that supply entities B and E.

To address the challenges discussed above, a network-connected platform that is configured to scan a computer network such as the Internet (e.g., similar to platform 203 of FIG. 2 can be implemented to identify a combined attack surface associated with the supply chain. The platform can provide real-time or near real-time views of the combined attack surface to one or more of the entities in the supply chain to facilitate expanded oversight of the combined attack surface. In some embodiments, the platform can also facilitate workflows between the entities that allow each to, for example, share views of the combined attack surface, receive notifications of security events and other notable events, identify breaches of contractual obligations, take actions to remediate breaches and/or otherwise enforce the contractual obligations.

Figure 18:
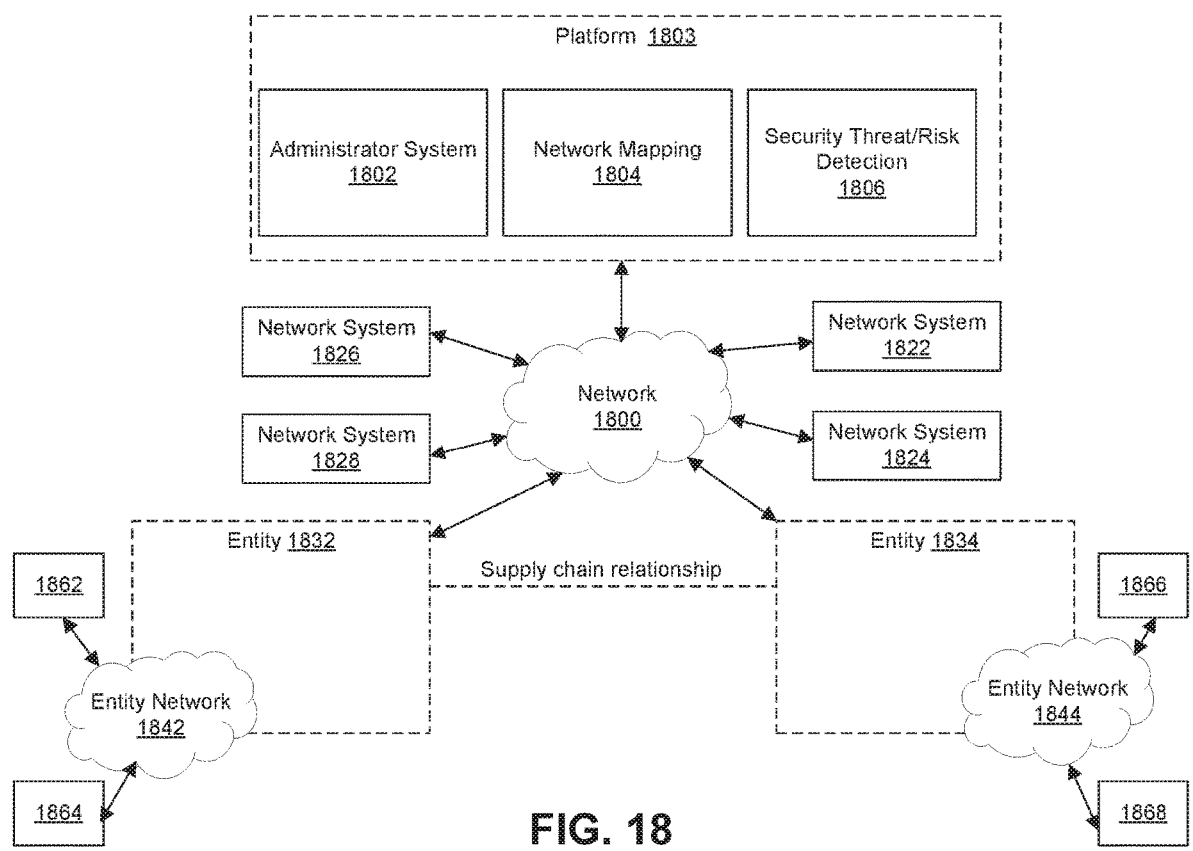
FIG. 18 is a block diagram illustrating an embodiment of a networked computing environment in which certain embodiments of the introduced technique can be implemented.

FIG. 18 is a block diagram illustrating an embodiment of a networked computing environment in which supply chain security can be implemented. Certain components of the networked computing environment of FIG. 18 are described in greater detail with respect to the networked security environment depicted in FIG. 2. In some embodiments, the networked computing environment of FIG. 18 includes a platform 1803 for scanning a network such as the Internet and implementing the introduced technique for supply chain security. Platform 1803 may be the same or similar as platform 203 of FIG. 2.

The example networked computing environment depicted in FIG. 18 includes a network 1800 (e.g., the same or similar as network 200 of FIG. 2) over which various network-connected computing systems are capable of communicating.

A platform 1803 configured to perform one or more functions associated with the introduced technique for supply chain security can include various systems, such as an administrator system 1802 (e.g., the same or similar as administrator system 202), network mapping system 1804

(e.g., the same or similar as network mapping system 204), and a security threat/risk assessment system 406 that are communicatively coupled to network 400.

As with network mapping system 204, the network mapping system 1804 may be configured to scan data associated with a set of network systems (e.g., network system 1822, network system 1824, network system 1826, and network system 1828) that are connected to network 1800. Network systems 1822, 1824, 1826, and/or 1828 may be the same as, or similar to, any of network systems 206-219 described with respect to FIG. 2 an/or network system 300 described with respect to FIG. 3.

The network mapping system 1804 can be implemented to scan the network 1800 to discover network assets that are associated with various entities, such as entity 1832 or entity 1834. Entities 1832 and 1834 may represent enterprise organizations as well as other types of entities, such as government organizations, educational organizations, network service providers, individuals, or any other types of entities. Further, as depicted in FIG. 18, in some cases, one or more entities may have supply chain relationships. For example, entity 1832 may correspond with entity A of FIGS. 15-17 (i.e., a parent entity) and entity 1834 may correspond with entity B of FIGS. 15-17 (i.e., a supplier entity). Only two entities are depicted in FIG. 18 for illustrative simplicity; however, it shall be understood that any other entity (including those associated with a supply chain for entity 1832) may similarly communicate over network 1800.

The security threat/risk detection system 1806 can be implemented to similarly scan the network 1800 and analyze network system characteristics, network traffic (e.g., between various network systems), etc. to detect security events that represent threats and/or detect conditions that represented elevated risk of a security threat.

In some embodiments, one or more entities may employ the services of platform 1803, for example, to gain an understanding of their supply chain attack surface, receive notifications of security events or risks, and/or to take active measures to remediate or otherwise manage such risks. For example, entity 1832 may employ the services of platform 1803 to gain a better understanding of the risks introduced by a supplier (entity 1834). Similarly, supplier 1834 may employ the services of platform 1803 to gain a better understanding of the risks introduced by its own suppliers (not shown in FIG. 18). In other words, in some embodiments, platform 1803 may represent a service provider that provides various services, such as network mapping and security threat/risk detection, to multiple clients including entities 1832 and 1834. Accordingly, although not depicted in FIG. 18, multiple other entities may similarly connect to network 1800 to access services provided by platform 1803.

Notably, platform 1803 can perform various functions, such as network mapping and/or security threat/risk detection, by scanning a network 1800 that is external to the various entities 1832, 1834. In other words, network mapping and/or security threat/risk detection can be performed by accessing one or more network systems that are connected to and face an external network 1800 (e.g., network systems 1822, 1824, 1826, 1828, and various edge devices associated with entities 1832, 1834) as opposed to scanning network systems that are connected to internal private entity networks, such as entity networks 1842 and 1844 (e.g., network systems 1862, 1864, 1866, 1868). Network systems 1862, 1864, 1866, and 1868 may be the same as, or similar to, any of network systems 1822-1828. In this example, network 1800 may represent the Internet, while entity networks 1842 and 1844 may represent an internal core network associated with entities 1823 and 1834 (respectively). In some embodiments, the entity networks 1842, 1844 may be communicatively coupled to external network 1800, but may be protected from external access by firewalls. In some embodiments, access can be provided to the platform 1803 to also scan one or more internal private networks, such as entity network 1842; however, the introduced technique does not rely on this access. Accordingly, the functionality provided by platform 1803 can be performed without requiring access to internal entity networks, without requiring software be installed on network systems associated with the various entities (e.g., 1832, 1834), and without requiring hardware to be connected to internal networks of the various entities. As a result, the introduced technique provides better coverage than traditional on-premises solutions and avoids visibility gaps.

The number of network systems depicted in FIG. 18 is an example provided for illustrative purposes and is not to be construed as limiting. In various embodiments, the number of network systems that can be scanned by the platform 1803 may range from as few as 1 to in the billions. In some embodiments, the number of networks systems that can be scanned by the platform 1803 is only limited by the total number of systems and/or devices connected to a publicly accessible network, such as the Internet, at any given moment.

Further, although depicted in FIG. 18 as a unitary system, the platform 1803 may actually comprise multiple different computing systems that are distributed in multiple physical locations. For example, in order to scan addresses more efficiently, a plurality of network scanners distributed across network 1800 can be instructed to scan the addresses of the various network systems connected to network 1800.

Figure 19:
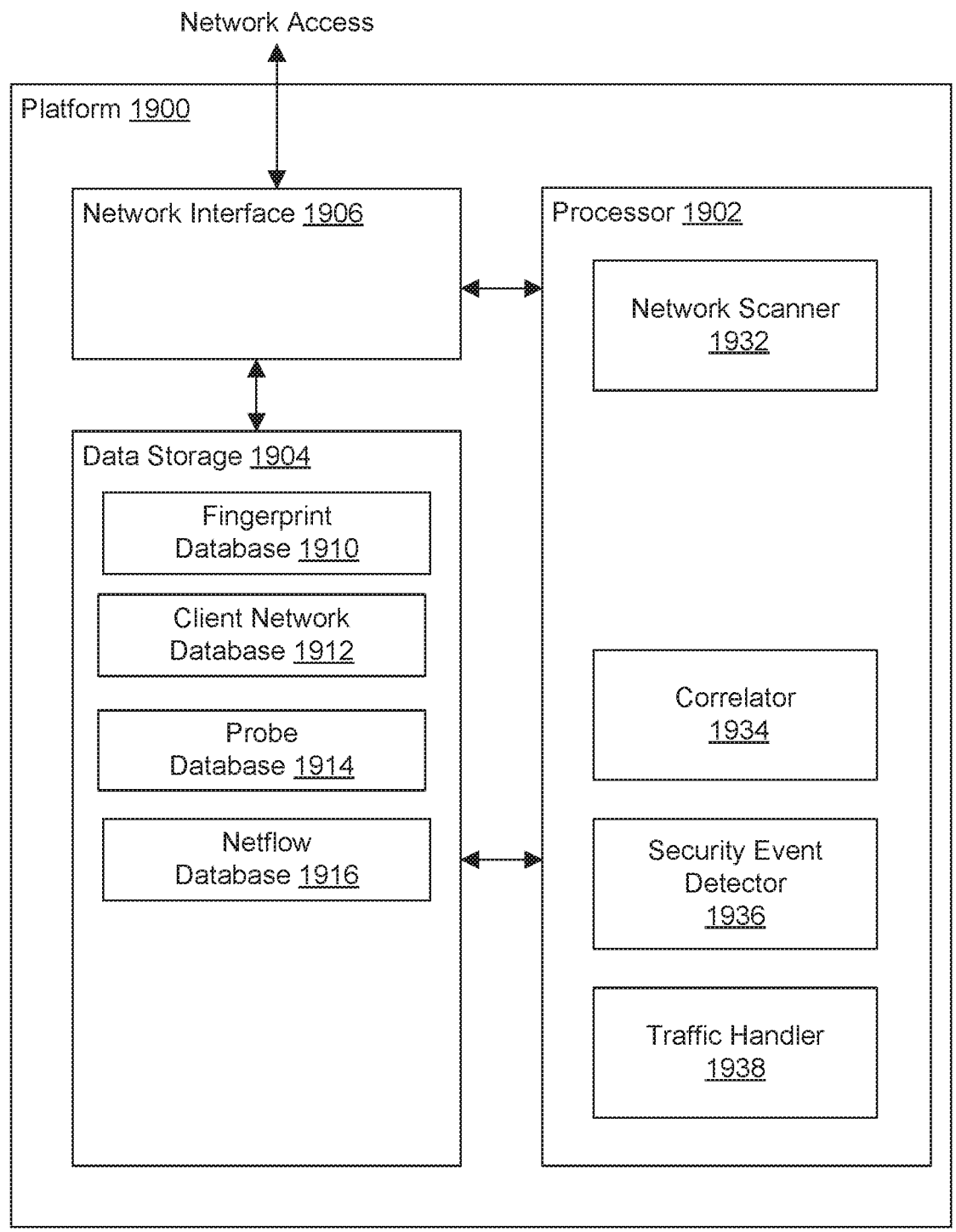
FIG. 19 is a block diagram illustrating an embodiment of a platform in which certain embodiments of the introduced technique can be implemented.

FIG. 19 is a block diagram illustrating an embodiment of a platform 1900 configured to implement supply chain security. In some embodiments, platform 1900 is the same as, or similar to, platform 1803 of FIG. 18. Further, although not explicitly depicted in FIG. 19, the various components of platform 1900 may comprise both a network mapping system and a security threat/risk detection system, for example, as described with respect to platform 1803. In other words, a network mapping system and security threat/risk detection system may share common computing components, as depicted in FIG. 19. In some embodiments, platform 1900 is a server computer or server computer system. In the example shown, platform 1900 includes a processor 1902, data storage 1904, and network interface 1906. Platform 1900 is depicted in FIG. 19 as having a single processor 1902, data storage 1904, and network interface 1906, for illustrative simplicity; however, this is not to be construed as limiting. In some embodiments, the components of platform 1900 may be distributed across multiple physical and/or virtual computing devices. Further, while certain functionalities executed by processor 1902 (e.g., network scanner 1932) are depicted as part of processor 1902, such functionalities may actually be stored as instructions in a computer readable media, such as data storage 1904 or a separate memory (not shown).

In various embodiments, processor 1902 of platform 1900 is configured to execute instructions, for example, to receive data, process data, transmit data, respond to commands, etc. Processor 1902 may include programmable circuitry and/or hardwired non-programmable circuitry. For example, programmable circuitry may include one or more general purpose microprocessors, such as CPU or GPU. Programmable circuitry may also include special-purpose processors, such as ASICs, PLDs, FPGAs, etc. In some embodiments, processor 1902 may represent a single processing unit, while in other embodiments, processor 1902 may represent a cluster of multiple processing units.

In some embodiments, processor 1902 includes a network scanner 1932. Network scanner 1932 may include software and/or hardware for implementing various functionality related to network mapping and/or security threat/risk detection. For example, the network scanner 1932 can be configured to scan a network (e.g., network 1800) by probing addresses (e.g., IP addresses) associated with the network. Probing addresses can include transmitting, via network interface 1906, some type of payload (e.g., a predetermined data packet or set of packets) to one or more IP addresses associated and receiving responses to the transmitted payloads. In some embodiments, scanning a network includes collecting the responses (i.e., response data) from a set of network systems based on the probes. In some embodiments, scanning a network includes collecting response data from all accessible network systems (e.g., those network systems accessible via a public network such as the Internet).

In various embodiments, data storage 1904 is configured for storing various types of data including instructions for processor 1902, configuration information, or any other appropriate digital information. In various embodiments, data storage 1904 comprises one or more of a volatile memory, a non-volatile memory, a magnetic memory, an optical memory, a phase-change memory, a semiconductor memory, a disc memory, a tape memory, or any other appropriate memory.

In the example shown, data storage 1904 includes various databases of information associated with the introduced technique such as a fingerprint database 1910, a client network database 1912, a probe database 1914, and a netflow database 1916. Certain databases depicted in FIG. 19 are described in more detail with respect to the example network mapping system 400 of FIG. 4. For example, the fingerprint database 1910 may be the same as, or similar to fingerprint database 410. Similarly, the client network database 1912 may be the same as, or similar to, the client network database 1912.

The probe database 1914 may store data included in responses (i.e., response data) from one or more network systems. For example, this response data may include network information received as a result of the network scanner 1932 probing the one or more network systems when scanning a network. Such response data may also be referred to as "probe data" as it results from active probes of addresses accessible on a given compute network. In some embodiments, response data includes responses compiled by scanning the Internet. In various embodiments, response data includes network communications information settings, network addresses, information received by interactively querying network systems (e.g., information received by performing a follow-up probe in response to an indication of an active service running on the network system). In some embodiments, response data is stored remotely (e.g., on a storage server, on a different network system, on cloud storage, etc.). In some embodiments, multiple probes of a single network system are performed at different times over a certain time interval. Such action may allow the platform 1803 to readily discover changes in security risk over time. Moreover, multiple probes of different network systems can be simultaneously performed at a single point in time. In some embodiments, the probe database may be part of a greater network information database such as network information database 414 described with respect to FIG. 4.

Netflow data can also be received by the platform 1900 via the interface 1906. In this context, "netflow data" includes information related to traffic traversing one or more computer networks (e.g., an internal network and/or the Internet). Examples include the source information and destination information for packet(s), the time of transmission and/or reception of the packet(s), hop data along the path(s) from the source to the destination, etc. Netflow data could come from a network administrator, an organization, an ISP, a routing device, a firewall device, a security information and event management (SIEM) system, or any other appropriate collection source or storage for traffic information. The netflow data can then be handled by a traffic handler 538, which may be configured to parse, filter, and/or format traffic as necessary to be stored in a netflow database 1916.

Security events (e.g., actual attacks, threats, or conditions indicative of heightened risk) can be detected by a security event detector 1936 of the processor 1902. More specifically, the security even detector 1936 can examine correlations between data stored in the probe database 1914 and data stored in the netflow database 1916 as determined by a correlator 1932 of the processor 1902. An entity can be alerted of detected security events by notifications transmitted via the network interface 1906. These notifications may prompt the entity to perform some remediation action. Examples of remediation actions include filtering traffic associated with a security event, adding IP address(es) and/or computing device(s) to a blacklist, alerting an administrator about the security event and/or the network systems(s) involved in the security event, etc. In some embodiments, the correlator 1934 further examines the data stored in the probe database 1914 and the netflow database 1916 to assist the security event detector 1936 in predicting what security events are most likely to occur in the future. Predicted security events may also prompt performance of any of the remediation actions described above.

There are many varieties of active probes, and each variety can be used to collect information about the state of a particular IP address and its corresponding network system. Active probes may also be used to gain information about the state of all IP addresses and their corresponding network systems that are connected to a given computer network (e.g., an internal network or the Internet). For example, for a given port, a probe could check whether that port is open across all IP addresses available on the Internet. In other embodiments, a probe may attempt a handshake in accordance with the Transport Layer Security (TLS) or Secure Sockets Layer (SSL) Handshake Protocol on a given port. Such action could check for the presence of deprecated protocols allowed in the exchange (e.g., SSL Version 3), as well as analyze characteristics of any certificate(s) that are returned (e.g., short key lengths or self-signed certificates). Probes can also look for the presence of standard services/protocols on standard and non-standard ports associated with those services/protocols, as well as over TCP- and UDP-based connections. For example, the network scanner 1932 may probe the presence of FTP on ports 21 and 2121, SSH on ports 22 and 2222, Telnet on ports 23 and 2323, SMTP on ports 22, 465, and 587, Domain Name System (DNS) on ports 53 and 5353, HTTP on ports 80 and 8080, POP3 on ports 110 and 993, NTP on port 123, NetBIOS on ports 137, 138, and 139, IMAP on ports 143 and 995, SNMP on ports 161, 162, and 199, LDAP on ports 389 and 636, HTTPS on ports 443 and 8443, SMB on port 445, Kerberos on ports 464, 543, 544, 749, 750, 751, 752, 753, 754, and 760, RPC on port 530, MSSQL on port 1433 and 1434, OracleDB on ports 1521, 2483, and 2484, MySQL on port 3306, RDP on port 3389, SIP on ports 5060 and 5061, PostgreSQL on port 5432, VNC on port 5800, Redis on port 6379, MongoDB on port 27017, UPnP on port 1900, etc. The network scanner 1932 can examine whether any of the aforementioned protocols (as well as other protocols not mentioned here) are running on any combination of one or more ports. Each probe can return information about the presence or absence of a given service on a given port, in addition to information about the service itself, such as the software version, manufacturer, etc. This information can be analyzed to assess the vulnerability of the given service to exploitation to an unauthorized entity or a hostile actor.

The netflow database 1916 can include details about all communications involving the IP addresses of interest. These IP address may include those that are statically or dynamically allocated to a particular entity or another entity of interest to the particular entity (e.g., a division, subsidiary, or supplier), as well as those that have historically been associated with malicious activity by the implementer of the platform 1900, the particular entity, an open source database, or any other source. These details can include information about the source or destination of the communications, such as the IP addresses involved, the port number of a source computing device, the ASN used for routing, location information about the source computing device (e.g., the country within which the source computing device resides), etc. These details can also include information about the communication itself, such as the time of transmission/reception, the protocol used, the number of packets, the size of the transmission, information regarding sampling performed by a listening mechanism (e.g., a flow collector or a scanner) that recorded the traffic, etc.

As noted above, the correlator 1934 can use data from the probe database 1914 and the netflow database 1916 to detect potential security events. Examples of security events include communications with new or ephemeral services, communications involving vulnerable internal network systems (e.g., a computing device managed by an organization that resides within an internal network), communications involving vulnerable external network systems (e.g., a computing device that resides outside of an internal network), and communications with non-gateway network systems.

Communications with new or ephemeral services can be detected whenever an IP address that is statically or dynamically allocated to, or otherwise owned, managed, or operated by or on behalf of, an entity, a subsidiary of the entity, a supplier of the entity, or of general interest to the entity, communicates with a service that was not detected by the network scanner 1932 despite recent historical probe(s) of the IP address. These IP addresses are often referred to as "entity IP addresses," "customer IP addresses," or "internal IP addresses." The time interval over which prior probe(s) discovered no corresponding service detection can be various lengths (e.g., 5 minutes, 3 hours, 8 days, 3 months, etc.). Moreover, the time between consecutive prior probes may vary. For example, a first prior probe and a second prior probe may be separated by several days, while the second prior probe and a third prior probe may be separated by several weeks.

Generally, risk to an entity network is greatly heightened if an inbound communication to an internal IP address is accompanied by a corresponding outbound communication from the internal IP address. In such instances, the internal IP address may represent the source as seen in the network traffic datum, or the port associated with the internal IP address may be a high number, while the port associated with the external IP address is associated with a common service. Examples of common services include FTP on ports 21 and 2121, SSH on ports 22 and 2222, Telnet on ports 23 and 2323, SMTP on ports 25, 465, and 587, DNS on ports 53 and 5353, HTTP on ports 80 and 8080, POP3 on ports 110 and 993, NTP on port 123, NetBIOS on ports 137, 138, and 139, IMAP on ports 143 and 995, SNMP on ports 161, 162, and 199, LDAP on ports 389 and 636, HTTPS on ports 443 and 8443, SMB on port 445, Kerberos on ports 464, 543, 544, 749, 750, 751, 752, 753, 754, and 760, RPC on port 530, MSSQL on port 1433 and 1434, OracleDB on ports 1521, 2483, and 2484, MySQL on port 3306, RDP on port 3389, SIP on ports 5060 and 5061, PostgreSQL on port 5432, VNC on port 5800, Redis on port 6379, MongoDB on port 27017, UPnP on port 1900, any of the aforementioned protocols running on another port, or any other service running on another port.

If the port number is at least 1024 and all of the above conditions are met, then the platform 1900 can conclude that a communication with a new or ephemeral service occurred with low confidence. However, if the port number is at least 10000 and all of the above conditions are met, then the platform 1900 can conclude that a communication with a new or ephemeral service occurred with high confidence. The three potential conclusions from this correlation are (1) the external IP address is configured to not respond to probes by the network scanner 1932; (2) the external IP address began responding very recently; or (3) the external IP address was stood up very briefly to communicate with the internal IP address. Because the latter two potential conclusions are consistent with the attack patterns typically employed by unauthorized entities, each of these could be flagged as a potential security event.

Communications with a vulnerable network system can be identified whenever a communication is detected that involves an internal IP address running a non-HTTP, non-HTTPS, or non-DNS service. Examples of such services include FTP on ports 21 and 2121, SSH on port 22 and 2222, Telnet on ports 23 and 2323, NTP on port 123, NetBIOS on ports 137, 138, and 139, SNMP on ports 161, 162, and 199, LDAP on ports 389 and 636, SMB on port 445, Kerberos on ports 464, 543, 544, 749, 750, 751, 752, 753, 754, and 760, RPC on port 530, MSSQL on ports 1433 and 1434, OracleDB on ports 1521, 2483, and 2484, MySQL on port 3306, RDP on port 3389, SIP on ports 5060 and 5061, PostgreSQL on port 5432, VNC on port 5800, Redis on port 6379, MongoDB on port 27017, UPnP on port 1900, any of the aforementioned protocols running on another port, and any other non-HTTP, non-HTTPS, or non-DNS service that is not designed to be accessible on the public Internet by its authors (and thus has less security hardening put in during the programming of the service). Communications involving a vulnerable network system can also occur whenever a communication is detected that involves an internal IP address having known vulnerabilities, such as running an end-of-life HTTP or HTTPS service, poor cryptographic health on an HTTPS service, such as a self-signed certificate or manufacturer's default certificate, an old DNS service with publicly disclosed vulnerabilities, etc. Any of the aforementioned services running on a network system can make that network system vulnerable to compromise by an unauthorized entity. Any communication from a vulnerable external network system to an internal network system or from an external network system to a vulnerable internal network system may represent a security event.

Communications with a vulnerable external network system can be identified whenever a communication involving an internal IP address is detected, where the internal network system corresponding to the internal IP address is running a common service. Examples of common services include FTP on ports 21 and 2121, SSH on port 22 and 2222, Telnet on ports 23 and 2323, SMTP on ports 25, 465, and 587, DNS on ports 53 and 5353, HTTP on port 80, POP3 on ports 110 and 993, NTP on port 123, NetBIOS on ports 137, 138, and 139, IMAP on ports 143 and 995, SNMP on ports 161, 162, and 199, LDAP on ports 389 and 636, HTTPS on port 443, SMB on port 445, Kerberos on ports 464, 543, 544, 749, 750, 751, 752, 753, 754, and 760, RPC on port 530, MSSQL on ports 1433 and 1434, OracleDB on ports 1521, 2483, and 2484, MySQL on port 3306, RDP on port 3389, SIP on ports 5060 and 5061, PostgreSQL on port 5432, VNC on port 5800, Redis on port 6379, MongoDB on port 27017, UPnP on port 1900, or any other ports associated with commonly used protocols/services on the Internet. The platform 1900 may also look for certificates used for public key cryptography returned for a successful SSL/TLS handshake that are self-signed or use deprecated ciphers or signing algorithms. These services are often considered vulnerable for several reasons, so there is an increased probability that an internal computing device running one of these services has been compromised by a malicious actor for use as a proxy for malicious traffic. For this reason, communications between a vulnerable external computing device and an internal IP address has a higher probability of being malicious in nature, and thus can be classified as a security event.

Communications transmitted from a non-gateway network system can be identified whenever a communication is detected involving an internal IP address that has not recently responded to any scans performed by the network scanner 1932 and has not historically been involved in external communications. Organizations are less likely to monitor traffic for security events on network systems that do not normally communicate with the Internet, so malicious actors may try to access the internal network using internal IP addresses of this nature. Accordingly, communications involving these internal IP addresses could represent security events.

Figure 20:
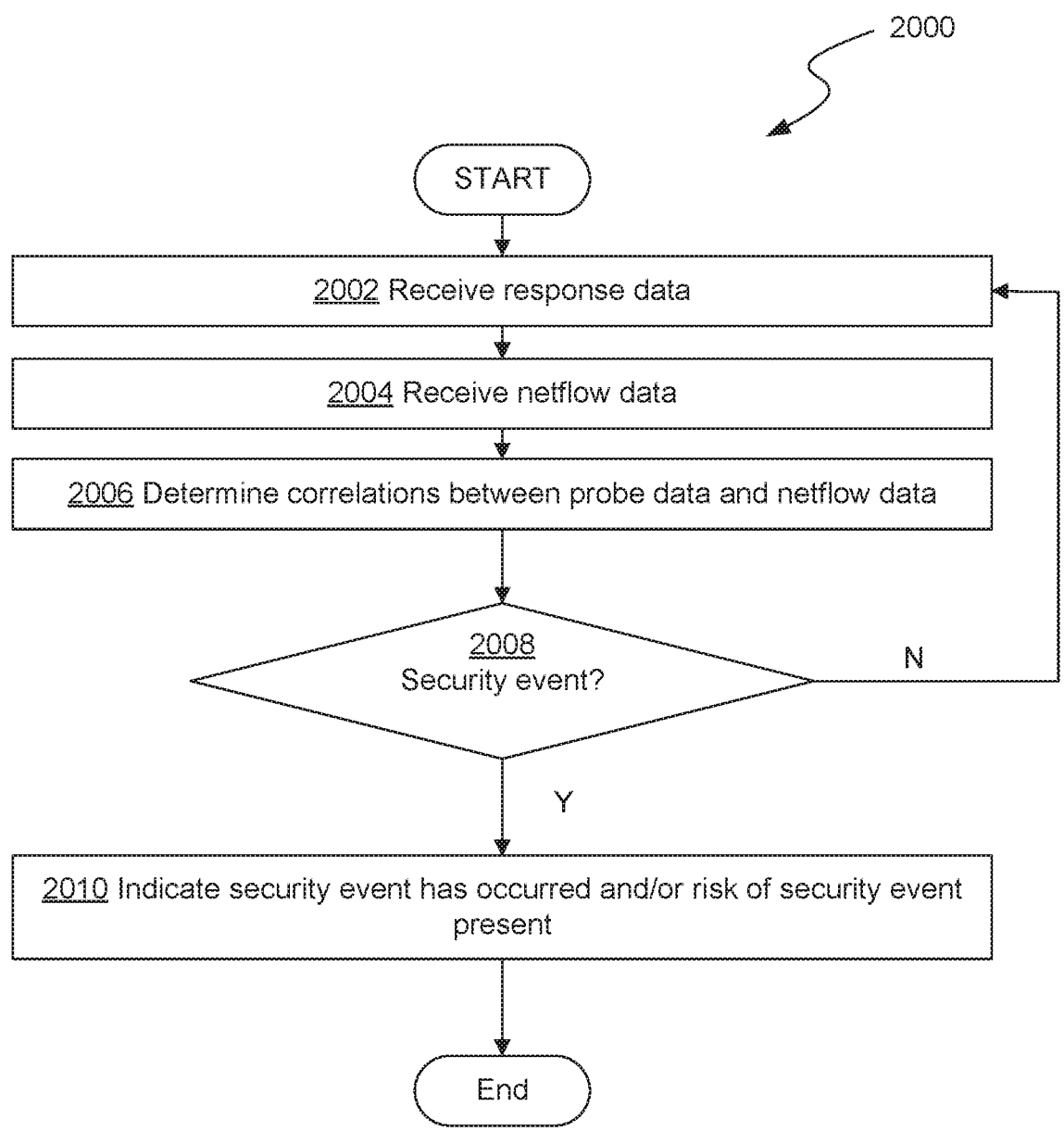
FIG. 20 is a flow diagram illustrating an example process for detecting network security events.

FIG. 20 is a flow diagram of an example process 2000 for detecting a security event (e.g., an actual attack, threat, or condition indicative of heightened risk) associated with a particular entity or another entity of interest to the particular entity (e.g., a supplier entity). Example process 2000 can be executed by a security threat/risk detection system 1806 associated with platform 1803. In some embodiments, the example process 2000 depicted in FIG. 20 may be represented in instructions stored in memory that are then executed by a processor. The process 2000 described with respect to FIG. 20 is an example provided for illustrative purposes and is not to be construed as limiting. Other processes may include more or fewer steps than depicted while remaining within the scope of the present disclosure. Further, the steps depicted in example process 800 may be performed in a different order than is shown.

At step 2002, the processor receives response data. For example, as previously discussed, a network scanner 1932 may actively probe a network system connected to a network by sending a signal to a corresponding IP address that is intended to elicit a response. Upon receiving a response to the probe, the platform 1803 may store data indicative of the response (i.e., response data) in data storage 1904. In some cases, the response data may include probe data that is stored in a probe database 1914. Probes of network systems may be periodically performed to detect changes in the state of the network systems based on stored historical network information.

At step 2004, the processor receives netflow data. The netflow data describes traffic traversing a computer network (e.g., an internal network or the Internet). Thus, in some embodiments the netflow data is acquired from an organization, while in other embodiments the netflow data is acquired from one or more ISPs.

Other embodiments of the process 2000 may reverse the order of receiving response data and netflow data. Moreover, either type of data could be received on a periodic basis (e.g., hourly, daily, or weekly) or a continual basis.

At step 2006, the processor can determine whether correlation(s) exist between the response data and the netflow data. Said another way, the processor may parse the response and the netflow data to discover certain risk filters indicative of security threats.

At step 2008, the processor can determine whether correlation(s) indicate that a security event occurred. If it is determined that a security event occurred, then, at step 2010, the processor can generate an output or otherwise indicate that the security event has occurred. For example, the processor may cause a notification to be generated that alerts an administrator associated with an entity (or another entity of interest such as a supplier) to take appropriate action. In some cases, the indication may be configured to cause another system to perform an automated remedial action to address the security event. If it is determined that a security event occurred, the processor can indicate that no security event has occurred and/or return to step 2002 to repeat the process, as indicated in FIG. 20.

A platform 1803, applying the aforementioned techniques for network mapping and security event detection, can be implemented to identify a combined attack surface associated with a supply chain that involves multiple entities and to take certain actions to improve the overall security of the supply chain and facilitate enforcement of contractual obligations between entities. The manner in which this is implemented can vary in different embodiments.

In some embodiments, platform 1803 may be configured to provide expanded oversight to a parent entity over a combined attack surface that includes entities in a supply chain that supplies the parent entity. In an example embodiment, security events and/or other notable events (e.g., policy and/or contract violations) can be surfaced by the platform and presented to the parent entity. For example, as depicted in FIG. 21, platform 1803 may probe one or more network systems associated with entity A and entities B and C (suppliers to entity A) as part of a process of network mapping and present various information to a user 2140 associated with entity A, such as a view of the combined attack surface (i.e., that includes entities B and C) and/or notifications of detected security events and/or other notable events involving the network systems of entities A, B, and/or C.

In this context, a "view" of the combined attack surface may refer to any information that is indicative of the combined attack surface. In some embodiments, a view may include a displayed listing of network-facing assets representing access points of the combined attack surface. The listing may include details associated with each asset including asset identifier, asset type, asset behavioral characteristics, asset risk assessment, asset security/risk history, communications logs associated with the asset, ownership/responsibility for the asset (e.g., an entity identifier), etc. In some embodiments, the view of the combined attack surface may include one or more visualizations of the combined attack surface. For example, a visualization of the combined attack surface may depict visual representations of the various assets associated with the multiple entities in the supply chain and how they are interrelated. In some embodiments, a visualization of the combined attack surface may depict a supply chain hierarchy (e.g., as depicted in FIG. 15) with additional information regarding vulnerabilities and risks associated with each of the entities in the supply chain. In some embodiments, a visualization of the combined attack surface may depict a global boundary of the combined attack surface, for example, as depicted in FIG. 16. A person having ordinary skill will recognize that an attack surface can be visually depicted in many different ways.

In some embodiments, information may be presented by platform 1803 to user 2140 via an interface 2142. The user 2140 may be associated with an IT operations department, a network security operations department, or any other group associated with the entity A. The user interface 2142 may be accessible via a web browser, desktop application, mobile application, OTT application. Accordingly, the user interface 2142 may be viewed on a personal computer, tablet computer, mobile workstation, PDA, mobile phone, wearable electronic device, network-connected smart electronic device, virtual/augmented reality system (e.g., a head-mounted display), or any other type of electronic device capable of presenting information.

Figure 21:
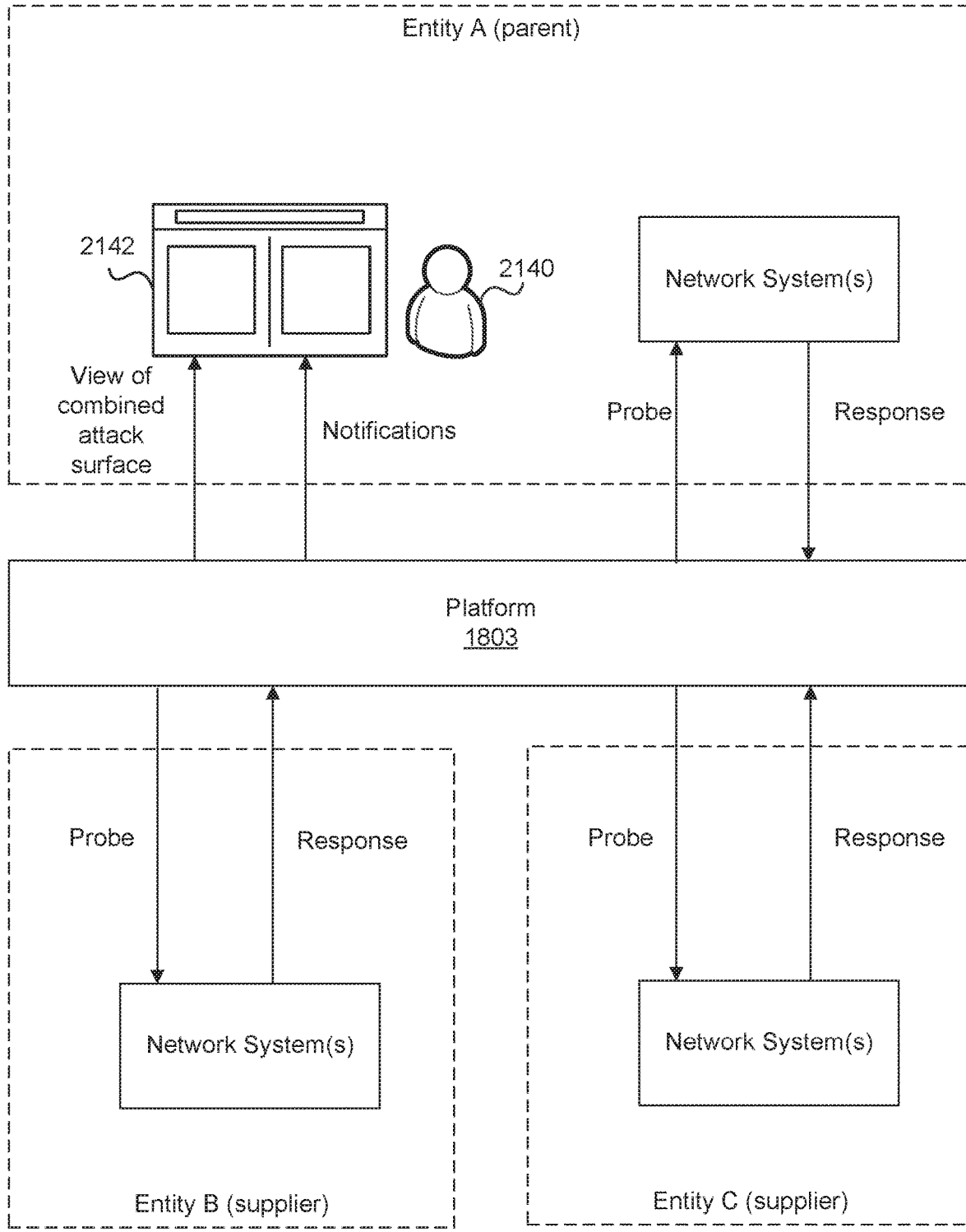
FIG. 21 is a diagram illustrating an example scenario for providing a view of a combined attack surface to one of the entities in a supply chain.
Figure 22:
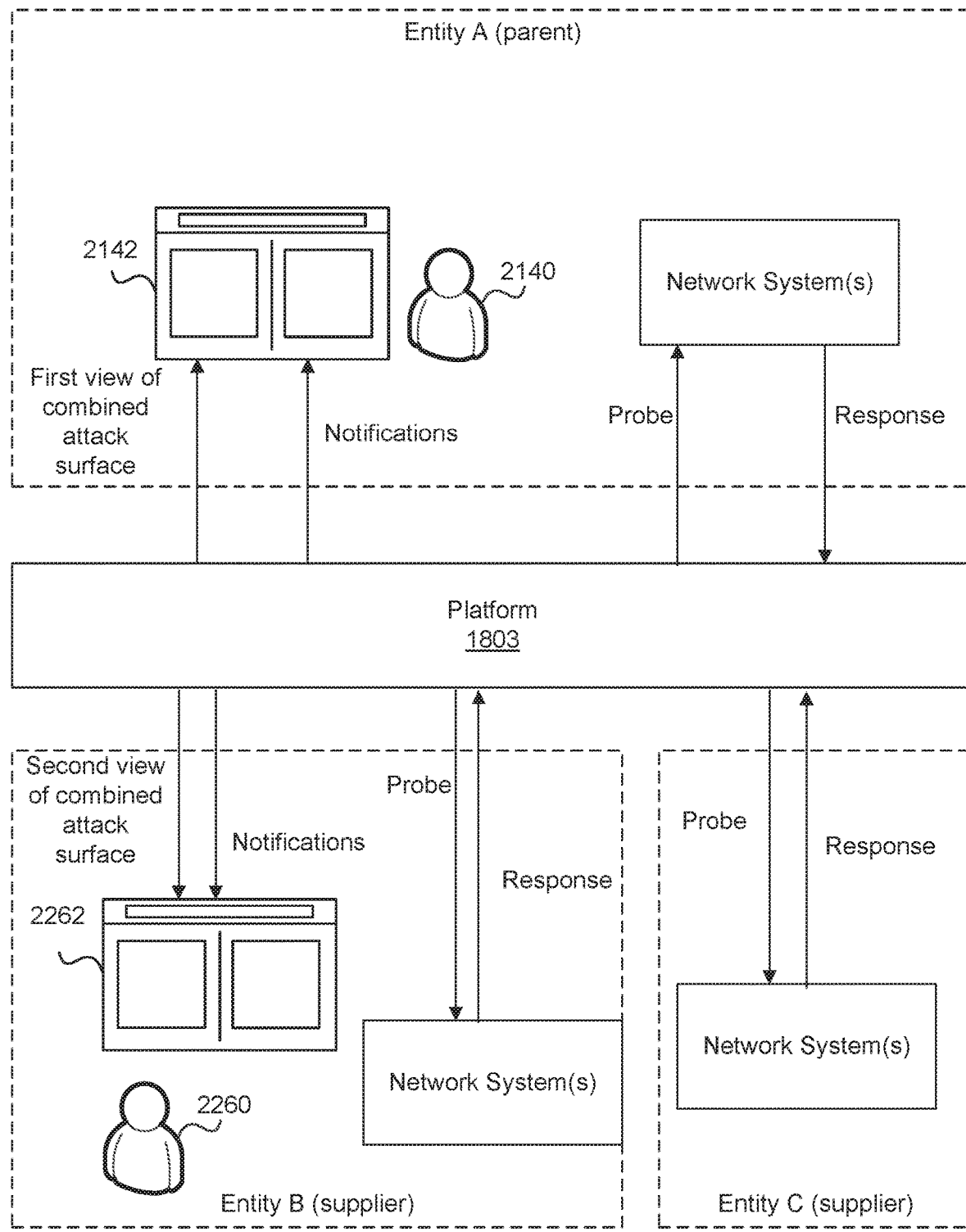
FIG. 22 is a diagram illustrating an example scenario for providing multiple views of a combined attack surface to multiple entities in a supply chain.

The example scenario depicted in FIG. 21 assumes that entity A is a customer to a provider of platform 1803 and therefore has access to services provided by platform 1803. In some embodiments, one or more supplier entities in a supply chain may also be customers of the provider of platform 1803 and may therefore have access to similar services. For example, FIG. 22 shows a scenario similar to that depicted in FIG. 921, except other entities in the supply chain are able to access views of the combined attack surface and/or notifications. Specifically, in the example scenario depicted in FIG. 21, entity B is also customer of platform 1803.

In this example, platform 1803 may present information to a first user 2140 associated with entity A and a second user 2260 associated with entity B via interfaces 2142 and 2262 (respectively). User interface 2262 may be similar to interface 2142, which is described with respect to FIG. 21. In some embodiments, a first view of the combined attack surface may be presented to entity A via interface 2142, and a second view of the attack surface may be presented to entity B via interface 2262. Notably, the first view presented via interface 2142 may be different than the second view presented via interface 2260. For example, the first view may include additional details regarding network systems of entity A, while obfuscating certain details regarding the network systems of entity B. Similarly, the second view may include additional details regarding the network systems of entity B, while obfuscating certain details regarding the network systems of entity A. As another example, if entity B (a supplier to entity A) has its own supplier (e.g., entity C), the second view may present certain information (e.g., a name of entity C) that is known to entity B, while obfuscating that same information in the first view presented to entity A.

Figure 23:
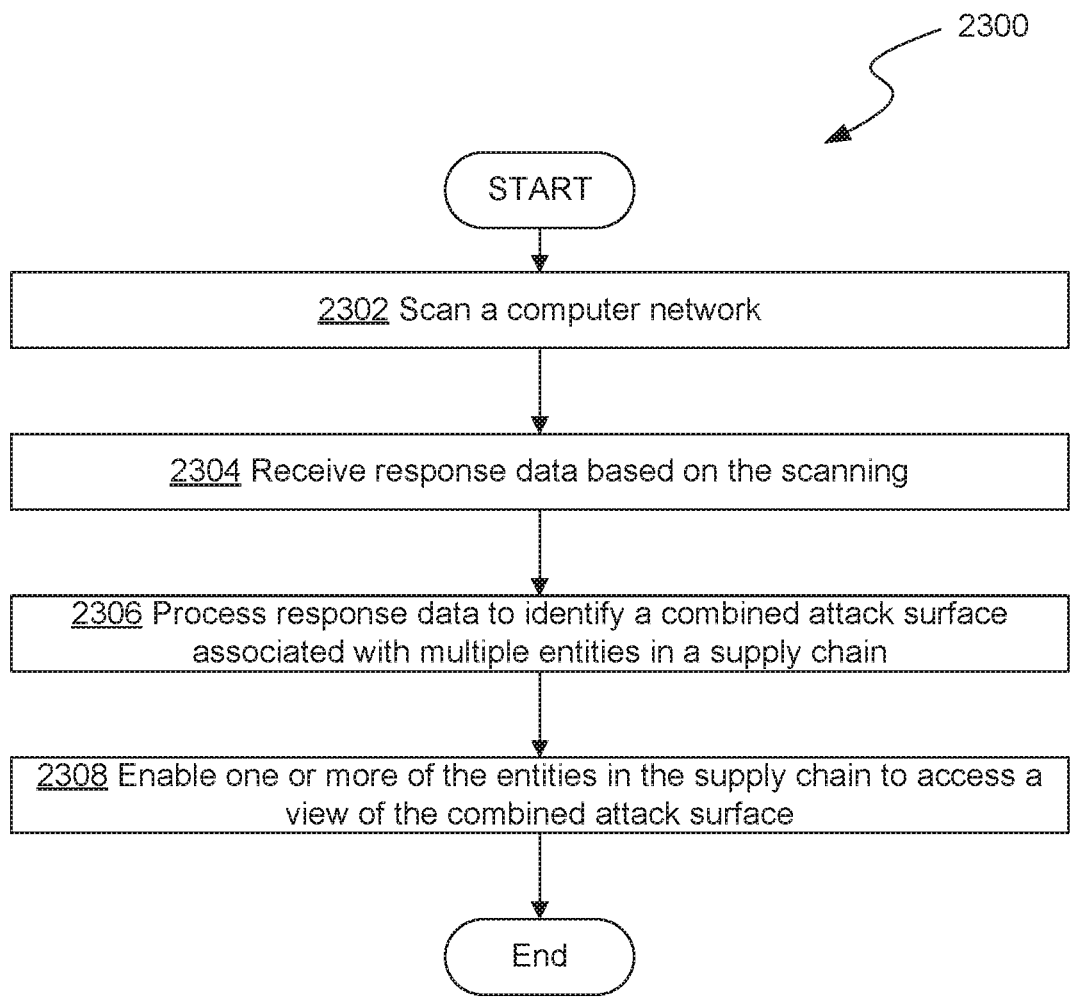
FIG. 23 is a flow diagram of an example process for identifying a combined attack surface for multiple entities in a supply chain and enabling one or more of those entities to access a view of the combined attack surface.

FIG. 23 is a flow diagram of an example process 2300 for identifying a combined attack surface for multiple entities in a supply chain and enabling one or more of those entities to access a view of the combined attack surface. Example process 2300 can be executed by a network mapping system 1804 associated with platform 1803. In some embodiments, the example process 2300 depicted in FIG. 23 may be represented in instructions stored in memory that are then executed by a processor. The process 2300 described with respect to FIG. 23 is an example provided for illustrative purposes and is not to be construed as limiting. Other processes may include more or fewer steps than depicted while remaining within the scope of the present disclosure. Further, the steps depicted in example process 2300 may be performed in a different order than is shown.

Example process 2300 begins at step 2302 with scanning a set of addresses associated with a computer network and at step 2304 receiving responses based on the scanning. For example, as described with respect to example processes 500*a* and 500*b* of FIGS. 5A and 5B (respectively), a network scanner 1932 may scan a set of addresses. The set of addresses may include all publicly routable addresses associated with a computer network. In some embodiments, the computer network may be a publicly-accessible network such as the Internet that is external to any specific entity networks associated the multiple entities in the supply chain. In some embodiments, the computer network may additionally include the internal entity networks associated with one or more of the multiple entities. As part of the scanning process, a network scanner 1932 may transmit requests (i.e., probes) to network systems connected to the network that are associated with the set of addresses. The platform 1803 may then receive responses from one or more of the network systems based on the requests.

In some embodiments, the scanning of the computer network is initiated in response to a request from one of the multiple entities in the supply chain. For example, a particular entity of the multiple entities in the supply chain may be a client of a provider of platform 1803 and submit a request, for example, via a network communication, to initiate the network scan. In some embodiments, the request to initiate the network scan may include additional information that can be utilized by platform 1803 to perform the scan. Such additional information may include, for example, identifiers associated with one or more of the other entities in the supply chain that are known to the particular entity, sets of known addresses to scan, contract information (e.g., SLA terms) associated with a contract between the particular entity and one or more of the other entities in the supply chain, etc. As an illustrative example, and with reference to FIG. 18, entity 1832 may access platform 1803 to determine a combined attack surface associated with a supply chain involving entity 1832. To do so, entity 1832 may submit a request to scan to platform 1803 that includes an identifier associated with entity 1834, but that does not necessarily include identifiers associated with all of the multiple entities in the supply chain. Again, one or more of those other entities in the supply chain may be unknown to entity 1832, for example, due to competitiveness reasons.

Example process 2300 continues at step 2306 with processing at least some of the response data received at step 2304 to identify a combined attack surface associated with the multiple entities in the supply chain. As described with respect to FIG. 16, the combined attack surface may refer to an inventory of various points where an unauthorized actor can gain access to any one or more internal networks associated with the multiple entities in the supply chain. The points of access can include, for example, various Internet-facing network systems (also referred to as "edge devices") and other assets through which access to internal networks can be gained. Accordingly, in some embodiments, step 2306 may include identifying, based on response data, multiple Internet-facing network systems associated with any of the multiple entities in the supply chain. In some embodiments, and as previously described with respect to process 500a, fingerprints can be utilized to identify response data from network systems associated with any of the entities in the supply chain. For example, if a particular response received includes a domain name and that response matches a fingerprint for a given entity in the supply chain, a network mapping system 1804 may identify the domain name as a network asset associated with the given entity. In some embodiments, and as previously discussed with regard to process 500b, hierarchical scanning can be applied. For example, the response data can be processed to determine whether to execute follow-up probes. Responses to the follow-up probes can then be processed to further identify network assets associated with a given entity and/or a supplier to that entity.

In some embodiments, the processing of the received response data to identify the combined attack surface associated with the multiple entities is based, at least in part, on an identifier received from one of the entities that identifies another entity. For example, entity A may submit a request to scan that includes an identifier for entity B. In such a situation, platform 1803 may use the identifier of entity B to carry out the scanning, as well as identifying the combined attack surface.

Example process 2300 concludes at step 2308 with enabling one or more of the entities to access a view of the combined attack surface. For example, various views of the identified combined attack surface associated with the supply chain can be presented via respective interfaces associated with one or more of the multiple entities in the supply chain. As described with respect to FIG. 21, in some embodiments, each view may include a set of information tailored for a specific one of the multiple entities and may therefore differ from views presented to other entities.

In some embodiments, the various steps of example process 2300 can be performed continually to provide a user with a continually updated view of the combined attack surface. For example, an inventory of assets associated with the attack surface can be continually updated as new response data is received and processed. In other words, the view of the combined attack surface presented may represent a real-time or near real-time (i.e., within seconds of detected changes) representation of a state of a combined attack surface associated with a supply chain.

Figure 24:
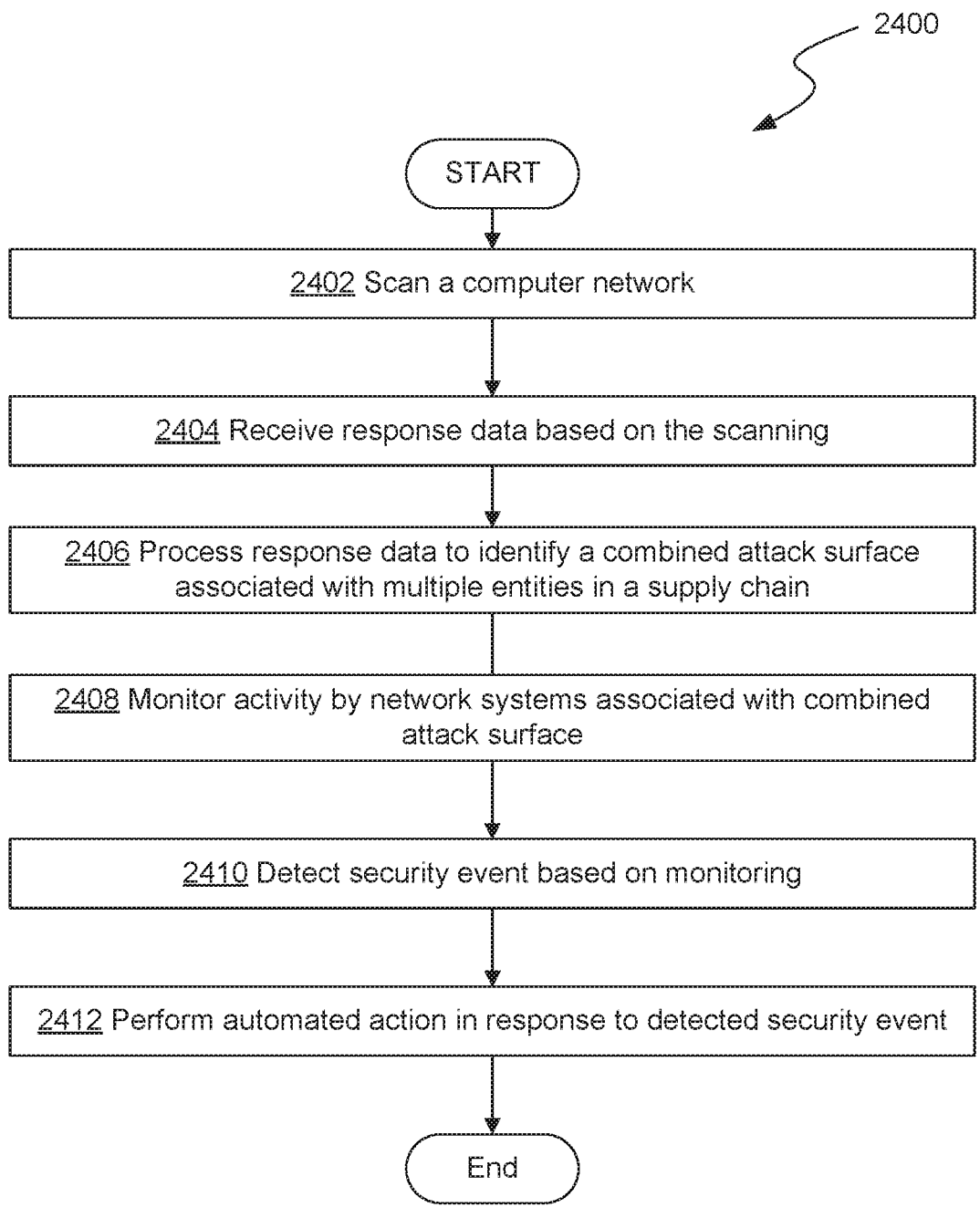
FIG. 24 is a flow diagram of an example process for monitoring the activity of network assets associated with a combined attack surface of a supply chain to detect security events.

In some embodiments, the security threat/risk detection functionality of platform 1803 can be leveraged to detect security events across the combined attack surface of a supply chain. FIG. 24 shows a flow diagram of an example process 2400 for monitoring the activity of network assets associated with a combined attack surface of a supply chain and detecting security events. Example process 2400 can be executed by a network mapping system 1804 and/or security threat/risk detection system 1806 associated with platform 1803. In some embodiments, the example process 2400 depicted in FIG. 24 may be represented in instructions stored in memory that are then executed by a processor. The process 2400 described with respect to FIG. 24 is an example provided for illustrative purposes and is not to be construed as limiting. Other processes may include more or fewer steps than depicted, while remaining within the scope of the present disclosure. Further, the steps depicted in example process 2400 may be performed in a different order than is shown.

Example process 2400 begins at step 2402 with scanning a set of addresses associated with a computer network, at step 2404 with receiving responses based on the scanning, and at step 2406 with identifying a combined attack surface associated with multiple entities in a supply chain, for example, as described with respect to steps 2302, 2304, and 2306 in example process 2300.

Example process 2400 continues at step 2408 with monitoring activity by network systems (or other assets) associated with the combined attack surface. In some embodiments, monitoring the activity by network systems associated with the combined attack surface can include receiving netflow data indicative of network traffic communicated over the computer network. This network traffic can include communications by or to network system associated with the combined attack surface of the supply chain.

In some embodiments, monitoring the activity by network systems associated with the combined attack surface can include monitoring for changes in response data that indicate, for example, changed configurations at a network system, new software installed at a network system, etc. In such embodiments, changes can be detected by comparing new responses received from network systems (e.g., in response to active probes) to historical response data that is stored, for example, in probe database 1914.

Example process 2400 continues at step 2410 with detecting a security event based on the monitoring. As previously discussed, a security event may include an actual attack, a threat of threat, or some other type of condition that indicates a heightened risk of attack. Examples of security events include: detection of a vulnerable network system residing on an internal computer network associated with any of the multiple entities in the supply chain, a communication by a network system residing on an internal computer network associated with any of the multiple entities to a vulnerable network system that resides outside the internal computer network, a communication by a network system residing on an internal computer network associated with any of the multiple entities that has not been involved in any communications for a specified period of time, a communication by a network system residing on an internal computer network associated with any of the multiple entities with a new and/or ephemeral service, etc. Vulnerable network systems may include, for example, network systems with out-of-date software, network systems manufactured by banned or otherwise compromised manufacturers (e.g., Chinese-manufactured computing devices made by Huawei Technologies Co. are banned from internal networks related to the Federal Government of the United States), network systems with vulnerable computer software (e.g., software known to beacon information about devices on which they are installed), network systems with known malware installed, etc.

In some embodiments, a policy rule may be applied to detect a security event. For example, platform 1803 may be configured to detect a security event by applying a policy rule that specifies that such an event is detected whenever a network system with out-of-date software residing on an internal network of an entity in a supply chain communicates with an external network system. In some embodiments, this process of detecting a security event can include receiving netflow data indicative of network traffic communicated over the computer network, processing response data with the netflow data to determine correlations between the response data and the netflow data, and detecting a security event based on the correlations.

Example process 2400 concludes at step 2412 with performing an automated action in response to the detected security event. The automated action performed at step 2412 may be configured to alert an entity of the security event or otherwise mitigate the risk presented to the entity by the security event.

In some embodiments, performing the automated action includes transmitting a notification indicative of the security event for delivery to one or more entities of the multiple entities in the supply chain. For example, with reference to FIG. 22, a notification may be presented via interface 2142 associated with entity A in response to detecting a security event associated with a network system of any of entities A, B, or C. If entity B is also a customer of the provider of platform 1803, a similar notification can be presented via interface 2262.

Notifications and other information presented to individual entities in the supply chain can be configured based on the relationships between the entities of the supply chain. For example, a security event originating from entity C may be presented differently to entity A than a similar security event originating from entity B. The difference can depend on whether entity A has a direct contractual relationship with entity B and/or C. Consider, for example, a scenario in which entity A has an SLA with entity B, but does not have an SLA with entity C (e.g., because entity C is a lower level supplier to entity B). In this scenario, a notification regarding a security event originating at entity B may expressly identify entity B when presented to entity A. In contrast, a security event originating at entity C may obfuscate the identity of entity C when presented to entity A. For example, the notification may read, "security event detected at a network system of one of entity B's suppliers." As another example, a notification regarding a security event originating at entity A may expressly identify a network system associated with entity A when presented to entity A. In contrast, a notification regarding a security event originating at entity B may obfuscate the identity of the network system associated with entity B when presented to entity A. For example, the notification may read, "security event detected in entity B's network."

In some embodiments, performing the automated action may include performing a remedial action, such as reconfiguring a network system associated with the detected security event or otherwise causing the network system to be reconfigured. As an illustrative example, in response to detecting that software is out-of-date at a particular network system, platform 1803 may cause the software to be updated, for example, by actively updating the software or by submitting a job ticket into an IT management system that flags the software for updating. As another illustrative example, in response to detecting that an internal network system associated with an entity is communicating with a vulnerable external system, platform 1803 may configure the internal network system and/or some other network system (e.g., a firewall) to block such communications.

In any case, the specific type of remedial action taken will depend on a number of factors including, for example, the type of security event, access to the network system causing the security event, relationships between the various entities in the supply chain, relationship between the platform 1803 and the various entities in the supply chain, etc. As an illustrative example, in response to detecting a security event originating at a network system associated with entity A, platform 1803 may automatically reconfigure that network system assuming entity A has provided such access to platform 1803. Conversely, if entity A has not provided such access, platform 1803 may just input a job ticket to an IT system associated with entity A and/or simply transmit a notification via interface 2142.

In some embodiments, platform 1803 may be configured to establish a workflow between entities in a supply chain to enable shared governance of contractual terms between entities. For example, an SLA between entities in a supply chain may include terms that dictate, for example, network security measures to be taken by each party, notifications to be made by each party when network security events occur, software and/or hardware to be utilized by each party, data integrity and retention measures to be taken by each party, data privacy measures to be taken by each party, etc.

As previously discussed, the platform 1803 can provide various views of a combined attack surface for the supply chain to various entities in the supply chain. The platform 1803 can then facilitate a workflow, automated or mediated, between the entities that allow each to, for example, share views of the combined attack surface, receive notifications of security events and other notable events, identify breaches of contractual obligations, take actions to remediate breaches and/or otherwise enforce the contractual obligations, etc. In the context of a supply chain involving multiple parties, the platform 1803 can be conceptually understood as a quantitatively informed third-party. The network mapping and security event detection capabilities of the platform 1803 enable the platform 1803 to generate an independent ground truth that can be used as evidence for oversight by one party or that has binding weight for governance of contractual obligations between parties in a supply chain.

Figure 25:
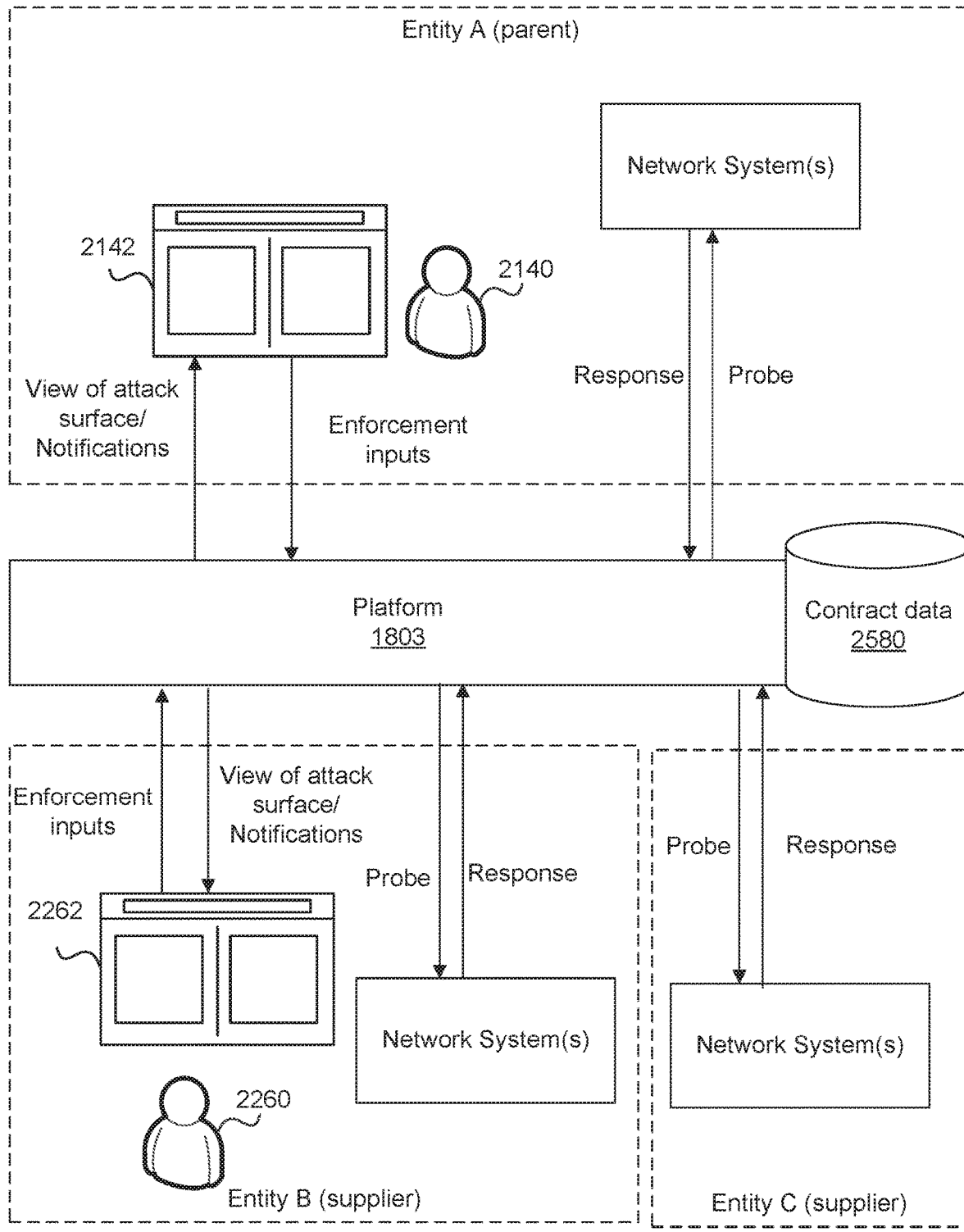
FIG. 25 is a diagram illustrating an example scenario for facilitating enforcement of contractual obligations between entities in a supply chain.

FIG. 25 depicts an example scenario for facilitating enforcement of contractual obligations between entities in a supply chain. As shown in FIG. 25, a parent entity A and a supplier entity B have access to platform 1803. Specifically, a first user 2140 associated with entity A can access platform 1803 via a first user interface 2142 and a second user 2260 associated with entity B can access platform 1803 via a second user interface 2262. As previously discussed with respect to FIGS. 21 and 22, platform 1803 can scan a computer network which may include probing one or more network systems associated entities in a supply chain, including entities A and B. The platform 1803 can then present various views of a combined attack surface for the supply chain to one or more of the entities in the supply chain, including entities A and B.

In some embodiments, the two entities A and B can share respective views of the combined attack surface, communicate with each other via platform 1803 (or other communication channels) to self-identify breaches of contractual obligations related to network security, and communicate with each other via platform 1803 (or other communication channels) to remedy such breaches. For example, user 2140 may analyze a view of the combined attack surface using interface 2142 and identify a breach, by entity B, of a contractual obligation to entity A. In response to identifying the breach by entity B, user 2140 can provide an enforcement input (e.g., via interface 2142) to platform 1803. The enforcement input may include, for example, information identifying the activity (or inactivity) by entity B causing the breach, links to provisions in a contract (e.g., stored as contract data 2580) related to the breach, requested actions to be performed by entity B to remedy the breach, a timetable for entity B to perform the requested actions, etc. The enforcement inputs by user 2140 can be processed by platform 1803 and presented to user 2260 of entity B via interface 2262. For example, a notification can be presented to user 2260 via interface 2262 that includes information based on the enforcement input by user 2140. User 2260 can review the notification, determine actions to remedy the breach (if necessary), and provide their own enforcement input via interface 2262 that, for example, disputes the alleged breach, specifies actions that entity B will take to remedy the breach, seeks waiver of the breach, etc. Enforcement inputs by user 2262 can then be presented, by platform 1803, as notifications via interface 2142. This workflow for addressing breaches of contractual obligations related to network security can continue back and forth between entities A and B, while being facilitated by platform 1803 as a trusted intermediary.

In some embodiments, platform 1803 can take a more active role in the enforcement of contractual obligations related to network security. For example, instead of merely providing baseline truth information (e.g., the combined attack surface and/or monitored activity) to the various entities in the supply chain, platform 1803 can actively identify breaches of certain contractual obligations and perform certain automated actions to remedy the violations. As depicted in FIG. 25, platform 1803 may access contract data 2580 that is indicative of contractual obligations between two or more of the entities in a supply chain. This contract data 2580 may be uploaded or otherwise input by the respective entities to facilitate such functionality. In some embodiments, the platform 1803 may utilize this contract data in conjunction with the aforementioned network mapping and security event detection capabilities to automatically detect breaches of contractual obligations between entities in a supply chain and perform automated actions to remedy the breaches.

Figure 26:
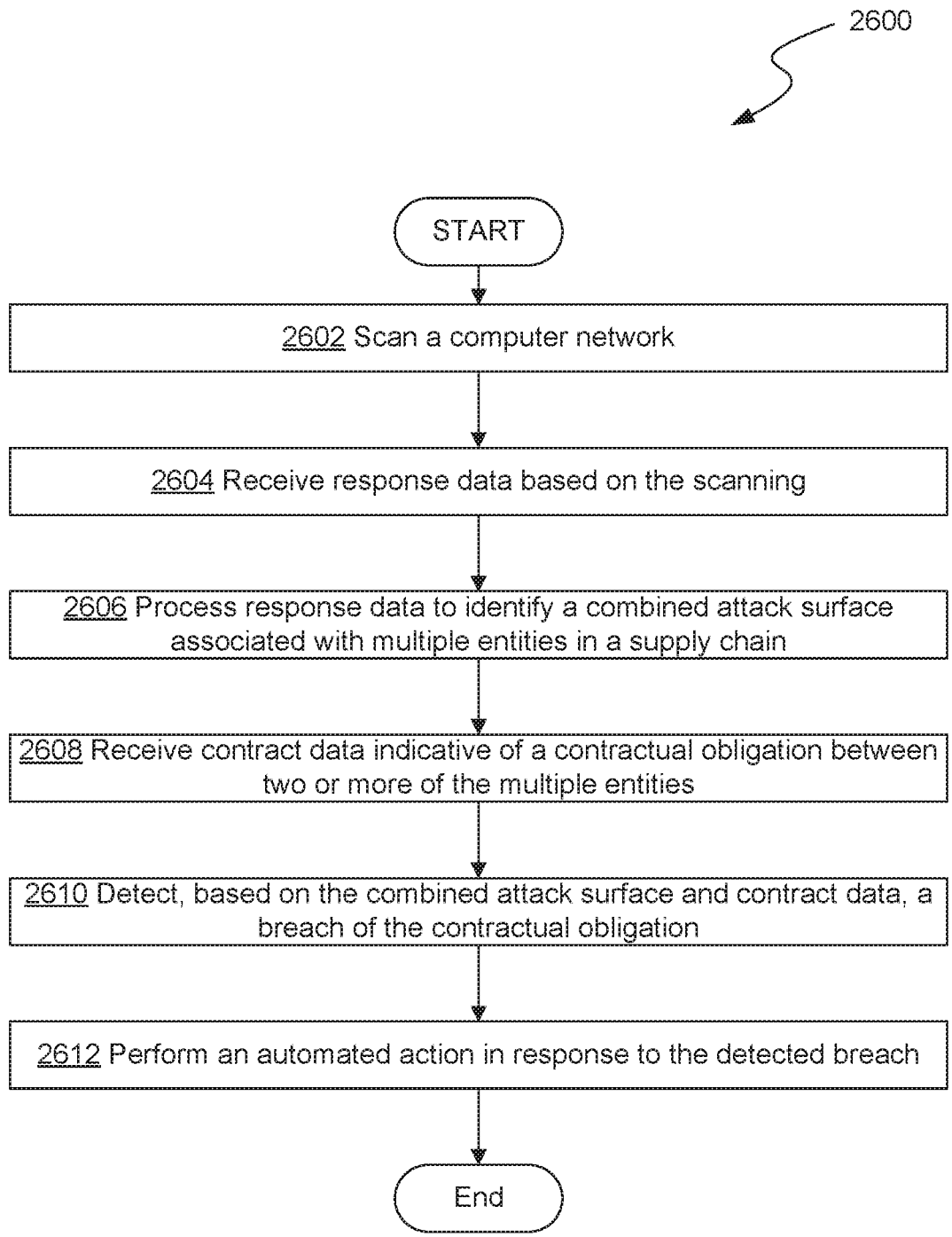
FIG. 26 is a flow diagram of an example process for facilitating enforcement of contractual obligations between entities in a supply chain.

FIG. 26 is a flow diagram of an example process 2600 for enforcing a contractual obligation related to network security between entities in a supply chain. Example process 2600 can be executed by a network mapping system 1804 and/or security threat/risk detection system 1806 associated with platform 1803. In some embodiments, the example process 2600 depicted in FIG. 26 may be represented in instructions stored in memory that are then executed by a processor. The process 2600 described with respect to FIG. 26 is an example provided for illustrative purposes and is not to be construed as limiting. Other processes may include more or fewer steps than depicted while remaining within the scope of the present disclosure. Further, the steps depicted in example process 2600 may be performed in a different order than is shown.

Example process 2600 begins at step 2602 with scanning a set of addresses associated with a computer network, at step 2604 with receiving responses based on the scanning, and at step 2606 with identifying a combined attack surface associated with multiple entities in a supply chain, for example, as described with respect to steps 2302, 2304, and 2306 example process 1100.

Example process 2600 continues at step 2608 with receiving contract data indicative of a contractual obligation between two or more of the entities associated with the supply chain. As previously mentioned, in some embodiments, one or more of the parties to a contract may upload or otherwise input the contract data which may be stored by platform 1803. The contract data may include the entire contract (e.g., an SLA between entities) or may include just specific portions of a contract that define obligations of one or more of the parties that are related to network security.

Example process 2600 continues at step 2610 with detecting, based on the combined attack surface and the contract data, a breach of a contractual obligation by one or more of the parties to the contract. For example, in some embodiments, platform 1803 may observe conditions of one or more network systems associated with the entities in the supply chain and compare those conditions to relevant provisions in the contract data to determine if a breach has occurred. In some embodiments, platform 1803 may additionally monitor activity by such network systems, for example, by processing netflow data to determine if a breach has occurred. In some embodiments, platform 1803 may analyze characteristics of a security event (e.g., detected based on response data and/or netflow data) to determine if the security event represents a breach of the contractual obligation.

In some embodiments, contract data can be processed to define rules that are useable by platform 1803 for detecting breaches. For example, contractual terms can be processed using natural language processing to generate a rule that defines specific conditions for detecting a breach. In some embodiments, platform 1803 may solicit input from the respective parties to the contract to assist in generating such rules. For example, platform 1803 may process contract data to generate a first rule, present the first rule to each party for input, receive inputs from each party, and generate a second revised rule based on the input. Eventually, a set of rules for identifying breaches can be established that are agreeable to each party to the contract. Such rules can be stored by platform 1803 as contract data and applied by platform 1803 to detect breaches across the combined attack surface. In some embodiments, platform 1803 may rely on the parties to specify the set of rules that are based on a contract between the parties and to input those rules to be stored as contract data by platform 1803.

Example process 2600 concludes at step 2612 with performing an automated action in response to the detected breach. The automated action performed at step 2612 may be configured to alert one or more of the entities that are party to the contract of the detected breach or otherwise mitigate the risk presented to the detected breach.

In some embodiments, performing the automated action includes transmitting a notification indicative of the detected breach for delivery to one or more entities in the supply chain that are party to the contract. For example, with reference to FIG. 25, a notification may be presented via interface 2142 associated with entity A and/or interface 2262 associated with entity B in response to detecting a breach of a contractual obligation between the two parties.

Further, as previously alluded to, notifications and other information presented to entities can be configured based on the nature of the detected breach and the relationships between the entities of the supply chain. For example, a detected security event associated with a lower level supplier to entity B (e.g., entity C) may constitute a breach of a contractual obligation by entity B to entity A. In some embodiments, a notification to entity A regarding the breach may obfuscate the identity of the lower level supplier since that lower level supplier does not have a contractual relationship with entity A. Conversely, a notification to entity B may expressly identify the lower level supplier so that entity B can take action to remedy the breach.

In some embodiments, performing the automated action can further include facilitating a workflow between multiple entities to address the breach and tracking progress and performance of measures by each of the entities to remedy the breach. For example, in response to detecting the breach, platform 1803 may transmit notifications to each entity regarding the breach, as discussed above. The platform 1803 may then solicit input from one or more of the parties regarding actions that will be taken to remedy the breach. For example, platform 1803 may prompt a beneficiary of a breached obligation to define steps to be taken to remedy the breach. In the context of the scenario depicted in FIG. 25, platform 1803 may present a prompt to user 2140 via interface 2142 to provide an enforcement input that defines steps to be performed by entity B to remedy the breach. Platform 1803 may then present these steps to entity B (e.g., via interface 2262), receive enforcement inputs from entity B attesting to steps taken to remedy the breach, and internally track the performance of such steps, for example, by monitoring for changes in the combined attack surface and/or netflow data, until entity A provides an enforcement input acknowledging that the breach has been remedied.

In some embodiments, performing the automated action may include performing a remedial action such as reconfiguring a network system associated with the detected breach or otherwise causing the network system to be reconfigured. As an illustrative example, in response to detecting that software is out of date at a particular network system and determining that this constitutes a breach of a contractual obligation, platform 1803 may cause the software to be updated, for example, by actively updating the software or by submitting a job ticket into an IT management system that flags the software for updating. As another illustrative example, in response to detecting that an internal network system associated with an entity is communicating with a vulnerable external system and determining that such activity constitutes a breach of a contractual obligation, platform 1803 may configure the internal network system and/or some other network system (e.g., a firewall) to block such communications.

In any case, the specific type of remedial action taken will depend on a number of factors including, for example, the type of breach detected, access to the network system causing the breach, relationships between the entities in the supply chain that are party to the contract, relationship between the platform 1803 and the various entities in the supply chain that are party to the contract, etc. As an illustrative example, in response to detecting a breach of a contractual obligation by entity B to entity A that is caused by a network system associated with entity B, platform 1803 may automatically reconfigure that network system, assuming entity B has provided such access to platform 1803. Conversely, if entity B has not provided such access, platform 1803 may just input a job ticket to an IT system associated with entity B and/or transmit a notification to entity A and/or B.

Processing System

Figure 27:
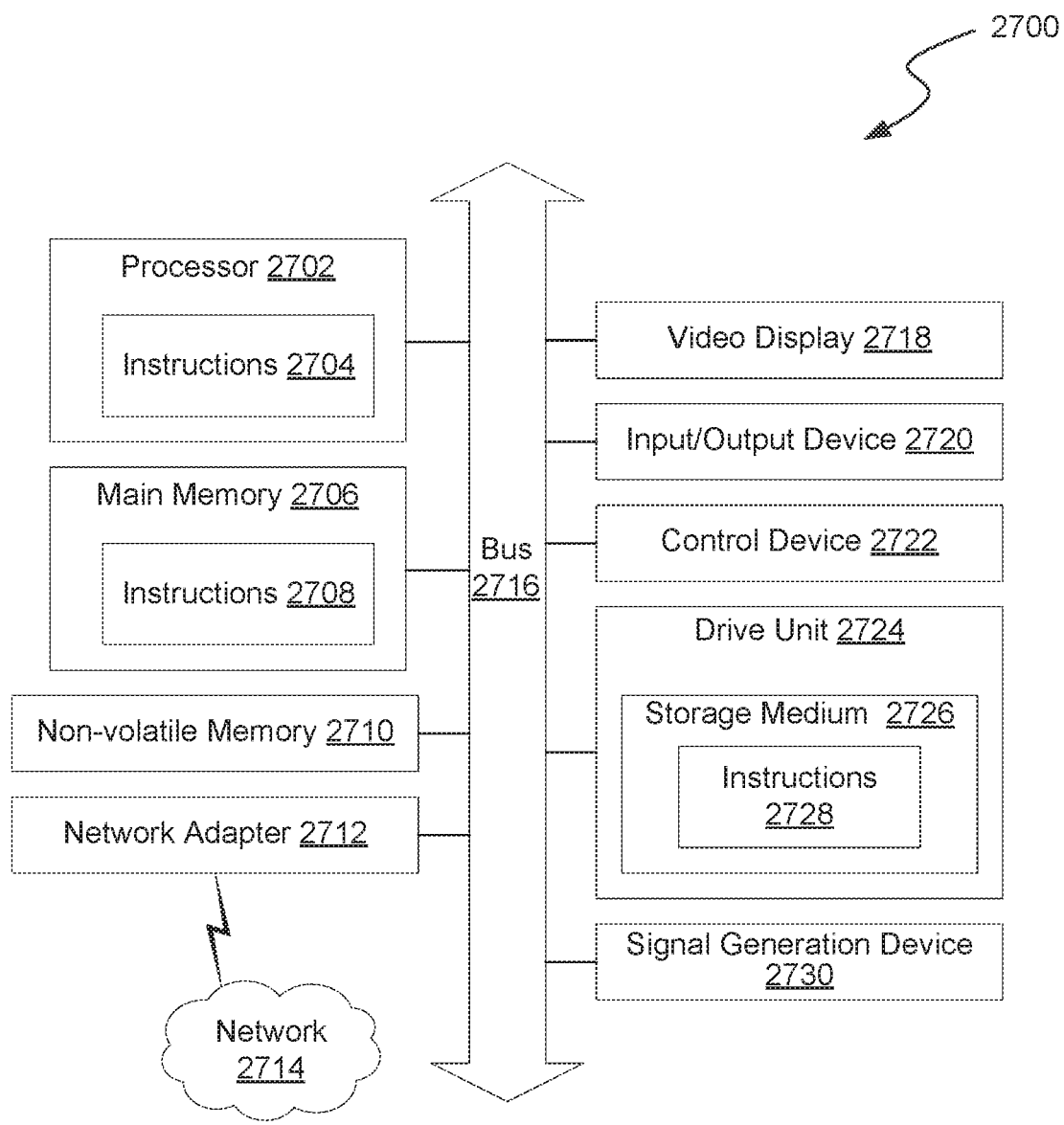
FIG. 27 is a block diagram illustrating an example of a processing system in which at least some operations described herein can be implemented.

FIG. 27 is a block diagram illustrating an example of a processing system 2700 in which at least some operations described herein can be implemented. For example, some components of the processing system 2700 may be hosted on a computing device that is associated with platform 204/1803 (including any of the administrator system 202/1802, network mapping system 204/1804, security threat/risk detection system 1806) or any of the other aforementioned network systems.

The processing system 2700 may include one or more central processing units ("processors") 2702, main memory 2706, non-volatile memory 2710, network adapter 2712 (e.g., network interface), video display 2718, input/output devices 2720, control device 2722 (e.g., keyboard and pointing devices), drive unit 2724 including a storage medium 2726, and signal generation device 2730 that are communicatively connected to a bus 2716. The bus 2716 is illustrated as an abstraction that represents one or more physical buses and/or point-to-point connections that are connected by appropriate bridges, adapters, or controllers. The bus 2716, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 2700 may share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality system (e.g., a head-mounted display), or another electronic device capable of executing a set of instructions (sequential or otherwise) that specify action(s) to be taken by the processing system 2700.

While the main memory 2706, non-volatile memory 2710, and storage medium 2726 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 2728. The term "machine-readable medium" and "storage medium" shall also be taken to include any medium that is capable of storing, encoding, or carrying a set of instructions for execution by the processing system 2700.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 2704, 2708, 2728) set at various times in various memory and storage devices in a computing device. When read and executed by the one or more processors 2702, the instruction(s) cause the processing system 2700 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 2710, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 2712 enables the processing system 2700 to mediate data in a network 2714 with an entity that is external to the processing system 2700 through any communication protocol supported by the processing system 2700 and the external entity. The network adapter 2712 can include a network adaptor card, a wireless network interface card, a router, an access point, a wireless router, a switch, a multilayer switch, a protocol converter, a gateway, a bridge, a bridge router, a hub, a digital media receiver, and/or a repeater.

The network adapter 2712 may include a firewall that governs and/or manages permission to access/proxy data in a computer network, as well as tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method comprising:
   scanning a computer network that includes Internet-accessible systems by, for each Internet-accessible system:
      providing a payload to all accessible network systems on all accessible ports of the Internet-accessible system;
      scanning each accessible network system from which a response to the payload is received;
   receiving response data from one or more of the accessible network systems based on the scanning;
   processing the response data to identify a combined attack surface associated with a plurality of entities associated with a supply chain; and
   enabling a first entity of the plurality of entities to access a first view of the combined attack surface.

2. The method of claim 1, wherein the first view of the combined attack surface obfuscates the identities of any of the plurality of entities associated with the supply chain that do not have a contractual relationship with the first entity.

3. The method of claim 1, further comprising:
   receiving netflow data indicative of network traffic communicated over the computer network;
   processing the response data with the netflow data to detect a security event associated with one or more of the plurality of entities; and
   performing an automated action to mitigate a risk presented by the security event.

4. The method of claim 3, wherein the detected security event includes any one or more of:
   detection of a vulnerable network system residing on an internal computer network associated with any of the plurality of entities;
   a communication by a network system residing on an internal computer network associated with any of the plurality of entities to a vulnerable network system that resides outside the internal computer network;
   a communication by a network system residing on an internal computer network associated with any of the plurality of entities that has not been involved in any communications for a specified period of time; or
   a communication by a network system residing on an internal computer network associated with any of the plurality of entities with a new and/or ephemeral service.

5. The method of claim 3, wherein performing the automated action includes:
   causing a network system associated with the detected security event to be reconfigured; and/or
   transmitting a notification indicative of the security event for delivery to the first entity.

6. The method of claim 5, further comprising:
   determining that the security event is associated with a second entity of the plurality of entities, wherein the second entity is a supplier to the first entity and wherein the second entity has a contractual relationship with the first entity; and
   configuring the notification to indicate that the security event is associated with the second entity.

7. The method of claim 5, further comprising:
   determining that the security event is associated with a second entity of the plurality of entities, wherein the second entity is a supplier to a third entity of the plurality of entities, wherein the third entity is a supplier to the first entity, wherein the third entity has a contractual relationship with the first entity, and wherein the second entity does not have a contractual relationship with the first entity; and
   configuring the notification to indicate that the security event is associated with a supplier to the third entity while obfuscating the identity of the second entity.

8. The method of claim 1, further comprising:
  receiving contract data indicative of a contractual obligation of a second entity of the plurality of entities to the first entity, wherein the second entity is a supplier to the first entity;
  detecting based on the combined attack surface and contract data, a breach of the contractual obligation; and
  performing an automated action to remedy the breach of the contractual obligation.

9. The method of claim 8, wherein detecting the breach of the contractual obligation includes:
  detecting, based on the combined attack surface, a security event associated with the second entity or a third entity that supplies the second entity; and
  determining, based on the contract data, that the detected security event represents a breach of the contractual obligation.

10. The method of claim 8, wherein detecting the breach of the contractual obligation includes:
  monitoring, based on the combined attack surface, a network system associated with the second entity;
  comparing the activity of the network system to a condition specified by the contractual obligation; and
  determining, based on the comparing, that the condition is satisfied;
  wherein the breach is detected in response to determining that the condition is satisfied.

11. The method of claim 8, wherein performing the automated action to remedy the breach of the contractual obligation includes:
  causing a network system associated with second entity to be reconfigured to remedy the breach of the contractual obligation;
  transmitting a first notification indicative of the detected breach for delivery to the first entity; and/or
  transmitting a second notification indicative of the detected breach for delivery to the second entity.

12. The method of claim 1, further comprising:
  enabling a second entity of the plurality of entities to access a second view of the combined attack surface, the second view of the combined attack surface different than the first view of the combined attack surface.

13. One or more non-transitory machine-readable media having stored therein a program product comprising instructions to:
  scan a computer network that includes Internet-accessible systems, wherein the instructions to scan the computer network comprise instructions to, for each Internet-accessible system:
    provide a payload to all accessible network systems on all accessible ports of the Internet-accessible system;
    scan each accessible network system from which a response to the payload is received;
  receive response data from one or more of the accessible network systems based on the scanning;
  process the response data to identify a combined attack surface associated with a plurality of entities associated with a supply chain; and
  enable a first entity of the plurality of entities to access a first view of the combined attack surface.

14. The machine-readable media of claim 13, wherein the first view of the combined attack surface obfuscates the identities of any of the plurality of entities associated with the supply chain that do not have a contractual relationship with the first entity.

15. The machine-readable media of claim 13, wherein the program product further comprises instructions to:
  receive netflow data indicative of network traffic communicated over the computer network;
  process the response data with the netflow data to detect a security event associated with one or more of the plurality of entities; and
  perform an automated action to mitigate a risk presented by the security event.

16. The machine-readable media of claim 15, wherein the detected security event includes any one or more of:
  detection of a vulnerable network system residing on an internal computer network associated with any of the plurality of entities;
  a communication by a network system residing on an internal computer network associated with any of the plurality of entities to a vulnerable network system that resides outside the internal computer network;
  a communication by a network system residing on an internal computer network associated with any of the plurality of entities that has not been involved in any communications for a specified period of time; or
  a communication by a network system residing on an internal computer network associated with any of the plurality of entities with a new and/or ephemeral service.

17. The machine-readable media of claim 15, wherein the instructions to perform the automated action comprise instructions to:
  cause a network system associated with the detected security event to be reconfigured; and/or
  transmit a notification indicative of the security event for delivery to the first entity.

18. The machine-readable media of claim 15, wherein the program code further comprises instructions to:
  determine that the security event is associated with a second entity of the plurality of entities, wherein the second entity is a supplier to the first entity and wherein the second entity has a contractual relationship with the first entity; and
  configure the notification to indicate that the security event is associated with the second entity.

19. The machine-readable media of claim 15, wherein the program code further comprises instructions to:
  determine that the security event is associated with a second entity of the plurality of entities, wherein the second entity is a supplier to a third entity of the plurality of entities, wherein the third entity is a supplier to the first entity, wherein the third entity has a contractual relationship with the first entity, and wherein the second entity does not have a contractual relationship with the first entity; and
  configure the notification to indicate that the security event is associated with a supplier to the third entity while obfuscating the identity of the second entity.

20. The machine-readable media of claim 13, wherein the program product further comprises instructions to:
  receive contract data indicative of a contractual obligation of a second entity of the plurality of entities to the first entity, wherein the second entity is a supplier to the first entity;
  detect based on the combined attack surface and contract data, a breach of the contractual obligation; and
  perform an automated action to remedy the breach of the contractual obligation.

21. The machine-readable media of claim 20, wherein the instructions to detect the breach of the contractual obligation comprise instructions to:
   detect, based on the combined attack surface, a security event associated with the second entity or a third entity that supplies the second entity; and
   determine, based on the contract data, whether the detected security event represents a breach of the contractual obligation.

22. The machine-readable media of claim 20, wherein the instructions to detect the breach of the contractual obligation comprise instructions to:
   monitor, based on the combined attack surface, a network system associated with the second entity;
   compare the activity of the network system to a condition specified by the contractual obligation; and
   determine, based on the comparing, whether the condition is satisfied;
   wherein the breach is detected in response to determining that the condition is satisfied.

23. The machine-readable media of claim 20, wherein the instructions to perform the automated action to remedy the breach of the contractual obligation comprise instructions to:
   cause a network system associated with second entity to be reconfigured to remedy the breach of the contractual obligation;
   transmit a first notification indicative of the detected breach for delivery to the first entity; and/or
   transmit a second notification indicative of the detected breach for delivery to the second entity.

24. The machine-readable media of claim 13, wherein the program product further comprises instructions to:
   enable a second entity of the plurality of entities to access a second view of the combined attack surface, the second view of the combined attack surface different than the first view of the combined attack surface.

25. An apparatus comprising:
   a processor; and
   a machine-readable medium having a program stored thereon, the program executable by the processor to cause the apparatus to,
   scan a computer network that includes Internet-accessible systems, wherein the program executable to scan the computer network comprises the program being executable by the processor to cause the apparatus to, for each Internet-accessible system:
      provide a payload to all accessible network systems on all accessible ports of the Internet-accessible system;
      scan each accessible network system from which a response to the payload is received;
   receive response data from one or more of the accessible network systems based on the scanning;
   process the response data to identify a combined attack surface associated with a plurality of entities associated with a supply chain; and
   enable a first entity of the plurality of entities to access a first view of the combined attack surface.

26. The apparatus of claim 25, wherein the first view of the combined attack surface obfuscates the identities of any of the plurality of entities associated with the supply chain that do not have a contractual relationship with the first entity.

27. The apparatus of claim 25, wherein the program is further executable by the processor to cause the apparatus to:
   receive netflow data indicative of network traffic communicated over the computer network;
   process the response data with the netflow data to detect a security event associated with one or more of the plurality of entities; and
   perform an automated action to mitigate a risk presented by the security event.

28. The apparatus of claim 27, wherein the detected security event includes any one or more of:
   detection of a vulnerable network system residing on an internal computer network associated with any of the plurality of entities;
   a communication by a network system residing on an internal computer network associated with any of the plurality of entities to a vulnerable network system that resides outside the internal computer network;
   a communication by a network system residing on an internal computer network associated with any of the plurality of entities that has not been involved in any communications for a specified period of time; or
   a communication by a network system residing on an internal computer network associated with any of the plurality of entities with a new and/or ephemeral service.

29. The apparatus of claim 27, wherein the program executable to perform the automated action comprises the program executable by the processor to cause the apparatus to:
   cause a network system associated with the detected security event to be reconfigured; and/or
   transmit a notification indicative of the security event for delivery to the first entity.

30. The apparatus of claim 27, wherein the program is further executable by the processor to cause the apparatus to:
   determine that the security event is associated with a second entity of the plurality of entities, wherein the second entity is a supplier to the first entity and wherein the second entity has a contractual relationship with the first entity; and
   configure the notification to indicate that the security event is associated with the second entity.

31. The apparatus of claim 27, wherein the program is further executable by the processor to cause the apparatus to:
   determine that the security event is associated with a second entity of the plurality of entities, wherein the second entity is a supplier to a third entity of the plurality of entities, wherein the third entity is a supplier to the first entity, wherein the third entity has a contractual relationship with the first entity, and wherein the second entity does not have a contractual relationship with the first entity; and
   configure the notification to indicate that the security event is associated with a supplier to the third entity while obfuscating the identity of the second entity.

32. The apparatus of claim 25, wherein the program is further executable by the processor to cause the apparatus to:
   receive contract data indicative of a contractual obligation of a second entity of the plurality of entities to the first entity, wherein the second entity is a supplier to the first entity;
   detect based on the combined attack surface and contract data, a breach of the contractual obligation; and
   perform an automated action to remedy the breach of the contractual obligation.

* * * * *